United States Patent
Conrad

(10) Patent No.: US 10,849,478 B2
(45) Date of Patent: Dec. 1, 2020

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 250 days.

(21) Appl. No.: 15/616,705

(22) Filed: Jun. 7, 2017

(65) Prior Publication Data

US 2017/0265697 A1   Sep. 21, 2017

Related U.S. Application Data

(63) Continuation of application No. 13/781,559, filed on Feb. 28, 2013, now abandoned.

(51) Int. Cl.
| | |
|---|---|
| *A47L 9/20* | (2006.01) |
| *A47L 9/10* | (2006.01) |
| *A47L 9/12* | (2006.01) |
| *B01D 46/00* | (2006.01) |
| *A47L 9/16* | (2006.01) |

(52) U.S. Cl.
CPC ............ *A47L 9/20* (2013.01); *A47L 9/106* (2013.01); *A47L 9/122* (2013.01); *A47L 9/1608* (2013.01); *A47L 9/1666* (2013.01); *B01D 46/0057* (2013.01)

(58) Field of Classification Search
CPC ....... A47L 9/20; A47L 9/106; B01D 46/0075; B01D 46/0057
See application file for complete search history.

(56) References Cited

U.S. PATENT DOCUMENTS

| | | | | |
|---|---|---|---|---|
| 4,704,144 A | * | 11/1987 | LeBlanc | B01D 46/521 55/300 |
| 4,787,923 A | * | 11/1988 | Fleigle | A47L 9/20 55/304 |
| 5,194,077 A | * | 3/1993 | Bargiel | E01H 1/0854 15/352 |

(Continued)

FOREIGN PATENT DOCUMENTS

| | | |
|---|---|---|
| CN | 101095604 A | 1/2008 |
| CN | 201131706 Y | 10/2008 |

(Continued)

OTHER PUBLICATIONS

English machine translation of KR1020060112420A, published on Nov. 1, 2006.

(Continued)

*Primary Examiner* — Bryan R Muller
(74) *Attorney, Agent, or Firm* — Philip C. Mendes da Costa; Bereskin & Parr LLP/S.E.N.C.R.L., s.r.l.

(57) ABSTRACT

A surface cleaning apparatus comprises an air treatment member having a first end, a longitudinally spaced apart second end, an air inlet and an air outlet comprising an outlet conduit; an air flow path extending from a dirty air inlet to a clean air outlet and including a suction motor and the air treatment member; a pre-motor filter positioned in the air flow path downstream from the outlet conduit; and, an agitation member operatively engageable with the pre-motor filter.

19 Claims, 63 Drawing Sheets

(56) References Cited

U.S. PATENT DOCUMENTS

| | | | |
|---|---|---|---|
| 5,647,093 A * | 7/1997 | Engel | E01H 1/0854 |
| | | | 15/349 |
| 6,440,197 B1 * | 8/2002 | Conrad | A47L 9/1608 |
| | | | 55/418 |
| 7,794,515 B2 | 9/2010 | Oh et al. | |
| 8,152,877 B2 | 4/2012 | Greene | |
| 8,484,799 B2 | 7/2013 | Conrad | |
| 8,590,102 B2 | 11/2013 | Conrad | |
| 8,997,309 B2 | 4/2015 | Conrad | |
| 9,161,669 B2 | 10/2015 | Conrad | |
| 2009/0019663 A1 | 1/2009 | Rowntree | |
| 2009/0031525 A1 * | 2/2009 | Makarov | A47L 9/1625 |
| | | | 15/347 |
| 2009/0229074 A1 | 9/2009 | Oh | |
| 2009/0293221 A1 | 12/2009 | Hwang et al. | |
| 2010/0011530 A1 * | 1/2010 | Kunz | A47L 9/20 |
| | | | 15/347 |
| 2010/0154367 A1 * | 6/2010 | Luo | A47L 9/122 |
| | | | 55/337 |
| 2012/0222248 A1 | 9/2012 | Conrad | |

FOREIGN PATENT DOCUMENTS

| | | |
|---|---|---|
| DE | 102009035602 A1 | 2/2011 |
| EP | 1987753 A2 | 11/2008 |
| GB | 1436403 A | 5/1976 |
| JP | 2004121722 A | 4/2004 |
| KR | 1020040088978 A | 10/2004 |
| KR | 1020050104613 A | 11/2005 |
| KR | 1020060112420 A | 11/2006 |

OTHER PUBLICATIONS

English machine translation of KR1020050104613, published on Nov. 3, 2005.
English machine translation of KR1020040088978, published on Oct. 20, 2004.
English machine translation of DE102009035602, published on Feb. 10, 2011.
English machine translation of JP2004121722, published on Apr. 22, 2004.
English machine translation of CN101095604, published on Jan. 2, 2008.

* cited by examiner

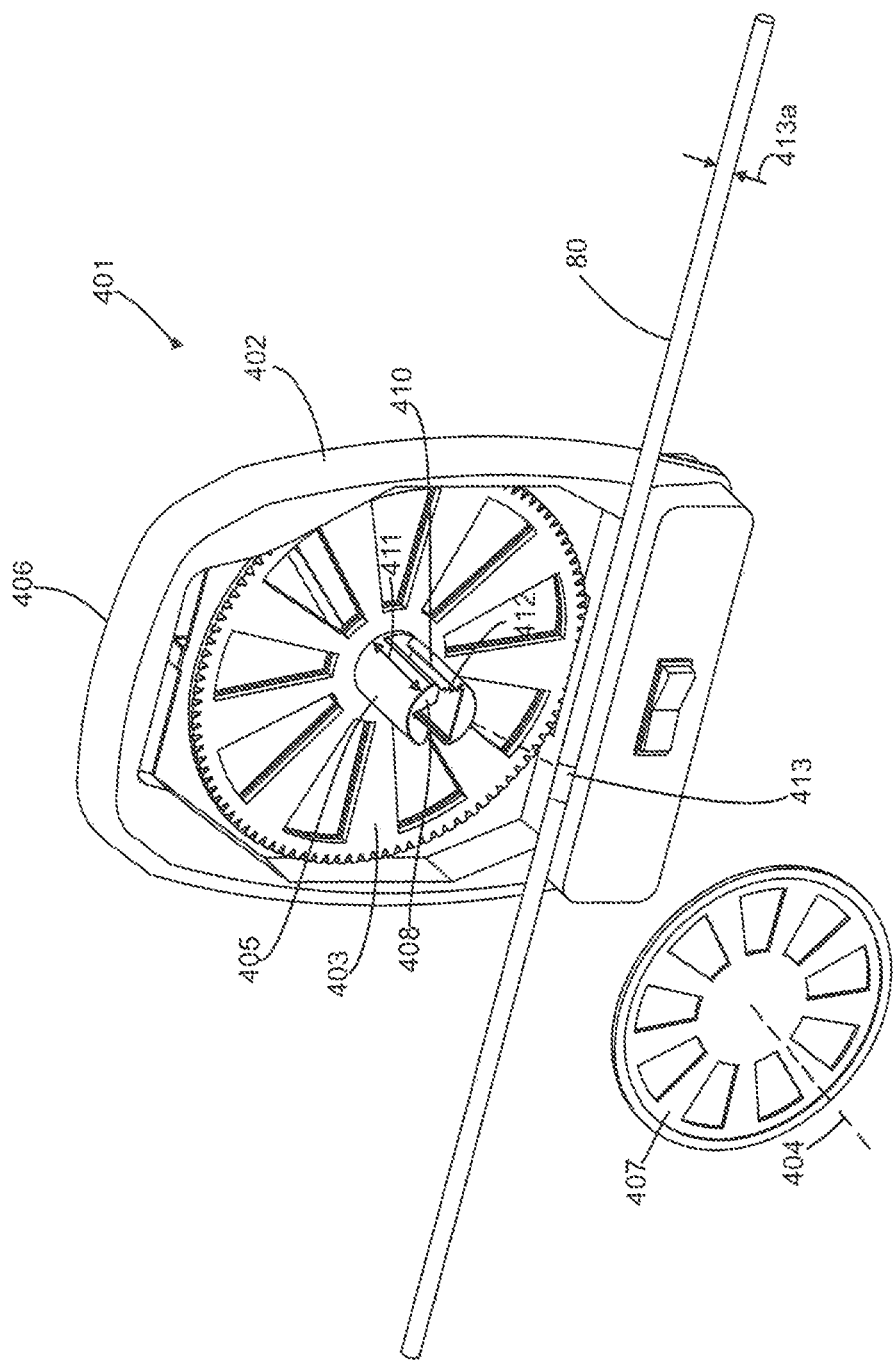

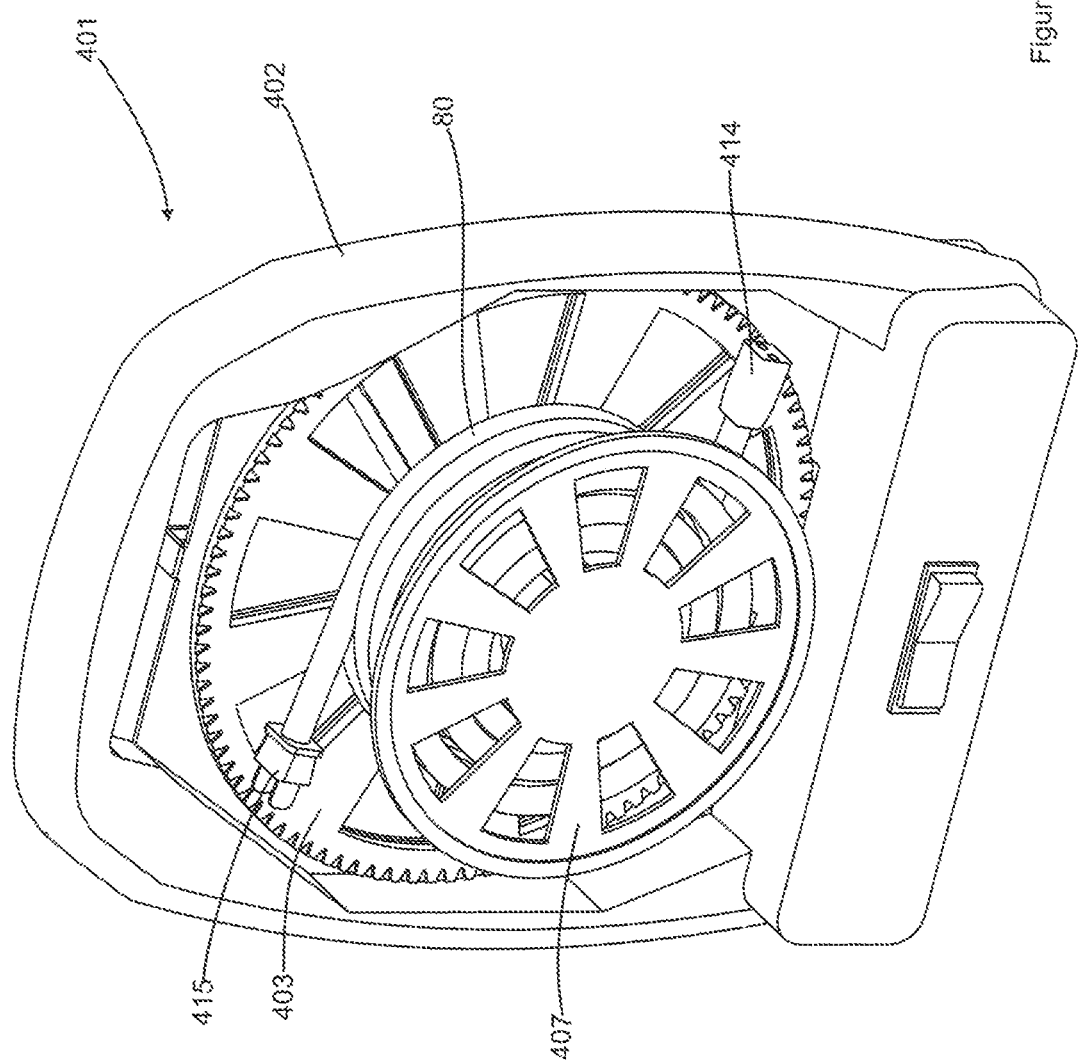

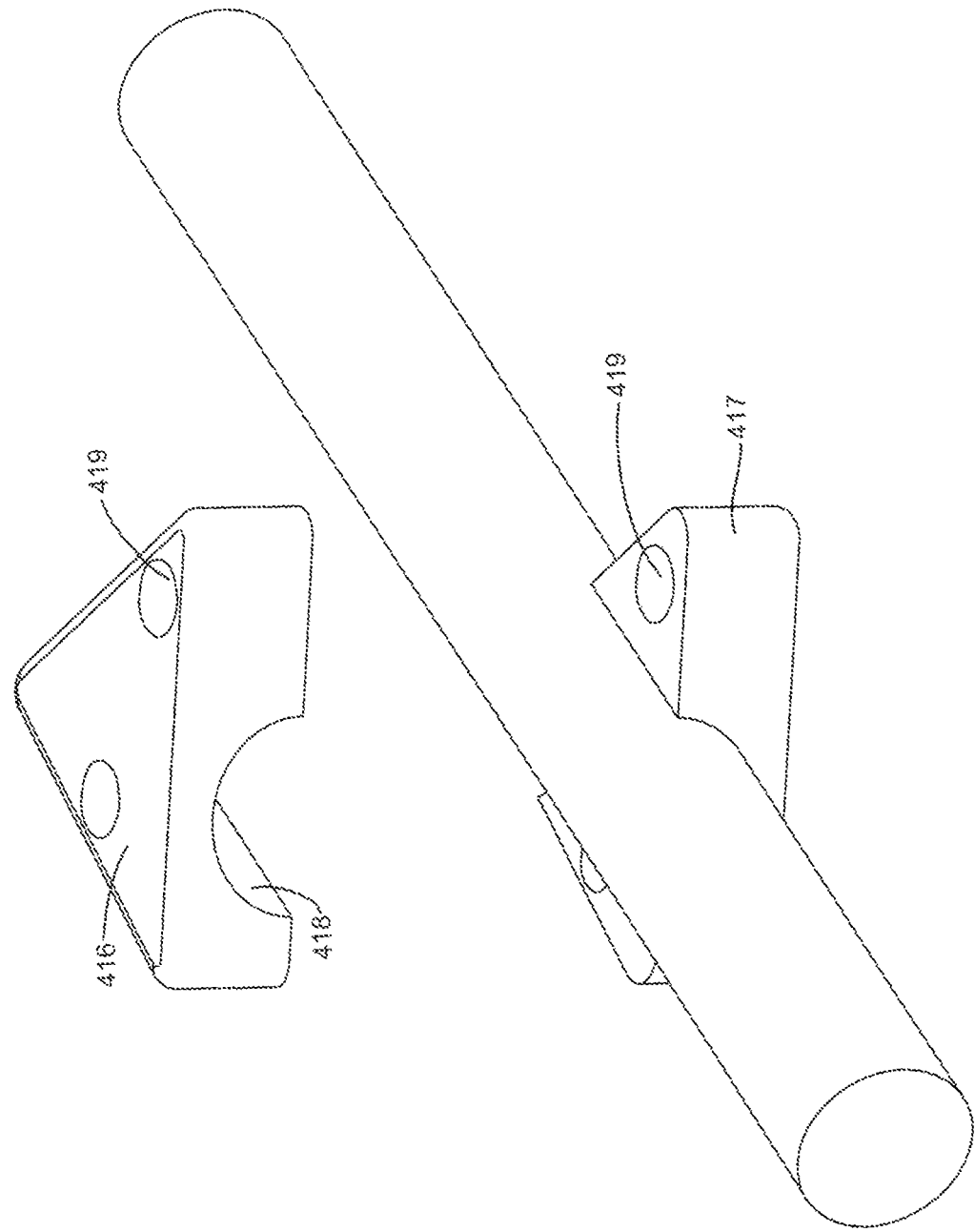

SURFACE CLEANING APPARATUS

CROSS-REFERENCE TO RELATED APPLICATIONS

This application is a continuation of U.S. patent application Ser. No. 13/781,559, filed Feb. 28, 2013, entitled Surface Cleaning Apparatus, the entirety of which is incorporated herein by reference.

FIELD

This specification relates to a surface cleaning apparatus. In a preferred embodiment, the surface cleaning apparatus has a filter wiping apparatus.

INTRODUCTION

The following is not an admission that anything discussed below is part of the prior art or part of the common general knowledge of a person skilled in the art.

Surface cleaning apparatus which utilize one or more cyclonic cleaning stages are known. Typically, a cyclone has an air inlet and an air outlet at the same end (e.g., the upper end). Dirt may accumulate in the other end (e.g., the bottom) of the cyclone chamber. Alternately, a dirt outlet may be provided in the bottom of the cyclone chamber so as to allow separated particulate matter to travel to a dirt collection chamber that is exterior to the cyclone chamber (see for example, US 2009/0205160). See also, US 2011/0314631, which discloses a cyclone chamber having an air inlet and an air outlet at one end and the end wall opposed to the end with the air inlet and the air outlet is spaced from the sidewall of the cyclone chamber by a variable amount so as to provide an outlet through which dirt may exit the cyclone chamber to an exterior dirt collection chamber.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

According to one broad aspect, a surface cleaning apparatus is provided with a uniflow cyclone chamber having a sidewall outlet. For example, the cyclone air inlet may be provided at a first end, the air outlet (e.g. vortex finder) may be provided at the second opposed end wall and a dirt outlet may be provided through a sidewall of the cyclone chamber at the second opposed end. For example, the dirt outlet may comprise an opening in the sidewall that extends radially around part of the sidewall of the cyclone chamber. The opening may be provided at the end wall of the cyclone chamber or it may be spaced therefrom (e.g., the sidewall may extend to the second opposed wall except at one location which defines a cut out or slot in the sidewall through which dirt may exit the cyclone chamber). Alternately, the sidewall may be spaced from the second opposed end wall so as to provide a gap (which may have a constant height or may have a variable height) through which dirt may exit the cyclone chamber. An advantage of this design is that a cyclone chamber having improved dirt separation efficiency is obtained. By enhancing the separation efficiency of the cyclone, a second stage cyclone may not be needed. In addition, removing an increased amount of particulate matter from the airstream passing through the cyclone chamber reduces the amount of entrained particulate matter which will be conveyed to an optional pre-motor filter, thereby extending the lifetime of the pre-motor filter before washing or replacement is required.

Optionally, the end wall of the cyclone chamber at the air inlet end may be rounded. For example, the air inlet end of the cyclone chamber may be shaped similar to a horizontal section through a toroid. Accordingly, the rounded portion may extend towards the opposed second end so as to define part of the sidewall of the cyclone chamber.

Optionally, in such an embodiment, the air inlet end of the cyclone chamber is openable so as to allow access to the interior of the cyclone chamber. The inner end of the rounded portion may be part of the openable end wall of the cyclone chamber. For example, the rounded portion may abut a facing edge of the sidewall or it may seat against an inner surface of the sidewall. Such a construction is advantageous as it allows the rounded end wall to be emptied while providing an appropriate seal at the opening end of the cyclone chamber. It will be appreciated that, optionally, an exterior dirt collection chamber may be openable at the same end as a cyclone chamber and, in such a case, it is preferably openable concurrently with the cyclone chamber. For example, a common floor or end wall may be utilized to close both the cyclone chamber and the dirt collection chamber. In such a case, the end wall of the dirt collection chamber and the half toroidal shape of the lower end of the cyclone chamber may be molded as a single piece.

It will be appreciated by a person skilled in the art that any of the features relating to the openable end wall of the cyclone chamber discussed herein may not be utilized with the uniflow cyclone construction disclosed herein but may be used by itself or with any other feature disclosed herein.

In accordance with another embodiment, a pre-motor filter is provided. Preferably, the pre-motor filter is provided with a transparent housing on the upstream (dirty) side of the pre-motor filter. The transparent housing permits a user to see the upstream side of the pre-motor filter and determine when the pre-motor filter may require cleaning.

In another embodiment, the pre-motor filter may be provided in a filter holder and the filter holder may be removable from the surface cleaning apparatus for cleaning or replacement of the pre-motor filter. The filter holder may define a chamber in which particulate matter conveyed from the cyclone chamber to the pre-motor filter may be stored. This may include particulate matter that is dis-entrained as the air changes direction to travel through the pre-motor filter and/or particulate matter that is separated from the airflow as the airflow enters the pre-motor filter. For example, the filter holder may comprise a cup having a sidewall and an end wall. The pre-motor filter may be placed in the cup spaced from the end wall with the pre-motor filter abutting the sidewall so as to define a dirt cup chamber between the end wall of the cup and the side of the pre-motor filter facing the end wall. An air conduit (e.g. an extension of the vortex finder) may extend through the foam into the dirt cup chamber. Accordingly, air exiting the cyclone chamber may travel through the conduit into the dirt cup chamber to reach the upstream side of the pre-motor filter and then travel through the pre-motor filter. Dirt may accordingly accumulate on the upstream side of the premotor filter. Optionally, the conduit may extend into the dirt cup chamber to a height above that of the pre-motor filter such that particulate matter may not fall downwardly through the conduit into the cyclone chamber. In accordance with such an embodiment, the filter holder may be removed from the surface cleaning apparatus and conveyed to a location (e.g. a sink or a garbage can) where the pre-motor filter may be removed so as to allow access to the dirt cup chamber so it may be emptied. Alternately, a portion of the dirt cup chamber may be openable. It will be appreciated that, in such an embodiment, the cup or at least the portion of a cup defining the dirt cup chamber may be transparent so as to allow a user to determine when the filter is dirty and/or the dirt cup chamber should be emptied.

Alternately, in some embodiments, the pre-motor filter may be positioned with the upstream side facing upwardly. Air may accordingly exit the cyclone chamber and travel, e.g., laterally through a duct to a position above the pre-motor filter. The air may then travel downwardly through the pre-motor filter. A sidewall may extend above the top of the pre-motor filter to define a dirt collection area. The portion of the duct or housing containing the pre-motor filter may be openable so as to allow access to the dirt collection area. When it is desired to remove dirt which has accumulated on top of the pre-motor filter, the duct or housing may be opened and the portion of the surface cleaning apparatus containing the pre-motor filter may be inverted to allow the dirt to be removed.

It will be appreciated by a person skilled in the art that any of the features of the pre-motor filter and pre-motor filter holder discussed herein need not be utilized with the uniflow cyclone design disclosed herein but may be used by themselves or in combination with any other feature disclosed herein.

In accordance with another embodiment, a pre-motor filter is provided with a pre-motor filter cleaner. For example, an agitation member may be provided to impact the pre-motor filter, preferably the upstream side thereof, so as to loosen dirt of the upstream side. The upstream side may then be emptied, e.g., by inverting the pre-motor filter (e.g. a pre-motor filter holder containing the premotor filter may be inverted thereby removing particular matter that has been loosened from the upstream side of the premotor filter). It will be appreciated that this feature is preferably used with the pre-motor filter dirt cup or dirt collection area discussed herein.

An advantage of this design is that the required amount of time between washing or replacing the pre-motor filter may be increased since the increase in back pressure caused by a dirty pre-motor filter may be reduced, particularly if the upstream side of the pre-motor filter faces downwardly. The cleaning member may be a mechanical or electro-mechanical member that taps, scrapes or otherwise engages the pre-motor filter to remove surface dirt therefrom. For example, a reciprocating motor with a hammer or the like provided on an arm extending therefrom may be utilized. The hammer may dislodge dirt from the upstream side when it contacts the pre-motor filter. Alternately, a weight, which is suspended on an arm at a position spaced from the pre-motor filter may be provided. Movement of the pre-motor filter may cause the weight to oscillate and engage repeatedly the pre-motor filter thereby assisting in cleaning the upstream side of the pre-motor filter. Alternately, one and more ribs or other scrapers may be provided abutting the upstream side and rotatably mounted so as to scrape the upstream surface thereby removing dirt therefrom.

It will be appreciated by a person skilled in the art that any of the features of the filter cleaning member disclosed herein need not be utilized with the uniflow cyclone design disclosed herein but may be used by itself or in combination with any other feature disclosed herein.

If a pre-motor filter is provided with a pre-motor filter dirt cup holder that receives dirt that accumulates on, or is dislodged from, the upstream side of the pre-motor filter, the surface cleaning apparatus may be constructed such that the pre-motor filter dirt cup may be emptied when the cyclone chamber and/or a dirt collection chamber in communication with the cyclone chamber is emptied. Preferably, the pre-motor filter dirt cup, the cyclone chamber and the dirt chamber in communication with the cyclone chamber are concurrently emptied. For example, all three dirt collection areas may have a common floor or wall which is openable.

The pre-motor filter dirt cup may comprise a chamber exterior to the cyclone chamber which is in communication with the upstream side of the pre-motor filter via an angled pathway (e.g., a ramp). For example, the upstream side of the pre-motor filter may face the air outlet end of the cyclone chamber so that the air exiting the cyclone chamber travels linearly to reach the pre-motor filter. An angled wall may be provided underneath the pre-motor filter and above the cyclone chamber so as to direct dirt to a dirt collection chamber adjacent, e.g., the sidewall of the cyclone chamber or the dirt collection chamber in communication with the cyclone chamber. The dirt cup and the cyclone chamber may have a common floor which is openable. In an alternate design, the upstream side of the pre-motor filter may face the vortex finder. A dirt collection chamber may be provided in an insert extending upwardly from the end wall of the cyclone chamber opposed to and facing the vortex finder. Accordingly, dirt may fall from the upstream side of the pre-motor filter and travel downwardly through the vortex finder to the pre-motor filter dirt collection chamber. In such a case, a filter cleaner as discussed previously may be provided and may engage the upstream side of the pre-motor filter. Accordingly, when a cyclone is not in use (e.g. the vacuum cleaner is turned off), the filter cleaning member may tap or otherwise physically agitate the pre-motor filter to loosen dirt which then falls downwardly through the vortex finder into the dirt collection chamber for the pre-motor filter. It will be appreciated that the dirt collection chamber for the premotor filter may be opened when the end wall of the cyclone chamber is opened so as to permit the cyclone chamber to be emptied.

It will be appreciated by a person skilled in the art that any of the features of the openable pre-motor filter dirt cup need not be utilized with the uniflow cyclone design disclosed herein but may be used by itself or in combination with any other feature disclosed herein.

Alternately, or in addition, it will be appreciated that the pre-motor filter dirt cup may be removable for emptying. The pre-motor filter dirt cup may be removable by itself, in combination with the cyclone chamber, in combination with the dirt chamber for the cyclone chamber or preferably, concurrently with both the cyclone chamber and the dirt collection chamber for the cyclone chamber. In particular, it is preferred that the dirt cup is removed with both the cyclone chamber and the dirt collection chamber and that all three are emptied at the same time. It will be appreciated by a person skilled in the art that any of the features of the removable pre-motor filter dirt cup need not be utilized with the uniflow cyclone design disclosed herein but may be used by itself or in combination with any other features disclosed herein.

In another embodiment, the surface cleaning apparatus may include an expandable hose which is biased to the extended position and is stored in a contracted position in the surface cleaning apparatus. An advantage of this design is that the suction hose may be stored in the surface cleaning apparatus and may be deployed when needed. For example, the hose may be stored in a compartment which has a hose outlet. One and more rollers, preferably at least a pair of opposed rollers or drive wheels, may be provided on opposed sides of the hose. The rollers may be manually and, preferably, electrically operated. Rotation of the rollers in one direction may allow the hose to be withdrawn from the chamber. Rotation of the rollers in the opposite direction may draw the hose automatically into the chamber for storage. In an alternate design, a ratchet type mechanism may be used. For example, a pair of pivotally mounted arms which are biased to an engagement position may be provided. The arms are positioned so as to contact the hose in an engaged position and prevent the hose from expanding and being drawn out of the chamber. If it is desired to remove the hose from the chamber, the arms may be moved to a disengaged position thereby allowing the hose to automatically extend itself due to the compression of the hose in the chamber. When it is desired to retract the hose into the chamber, the hose may be manually inserted, thereby compressing the hose in the chamber, or a pair of rollers or other motorized means may draw the hose into the chamber. It will be appreciated by a person skilled in the art that any of the features of a hose that is biased to an extended position need not be utilized with the uniflow cyclone design as disclosed herein but may be used by itself or in combination with any other feature disclosed herein.

In one embodiment, there is provided a surface cleaning apparatus comprising:
(a) a body housing a suction motor;
(b) a uniflow cyclone chamber comprising a first end having a first end wall, a second opposed end having a second end wall, a sidewall, an air inlet in the first end, a dirt outlet in the second end and an air outlet that is configured so that air exits the cyclone chamber through the second end;
(c) a dirt collection chamber exterior to the cyclone chamber; and,
(d) an air flow path extending from a dirty air inlet to a clean air outlet and including the suction motor and the cyclone chamber.

In some embodiments, the cyclone chamber may have a longitudinal axis and the dirt outlet is oriented generally parallel to the longitudinal axis.

In some embodiments, the sidewall may extend to the second end and the dirt outlet is provided in the sidewall.

In some embodiments, the first end may comprise a lower end.

In some embodiments, the dirt outlet may have a radial extent and may have an upstream end and a downstream end based on the direction of airflow in the cyclone chamber and the upstream end may be located from 0-90 degrees downstream from the air inlet.

In some embodiments, the upstream end may be located from 0-45 degrees downstream from the air inlet.

In some embodiments, the upstream end may be located from 0-15 degrees downstream from the air inlet.

In some embodiments, the downstream end may be located from 5-150 degrees downstream from the upstream end.

In some embodiments, the downstream end may be located from 15-120 degrees downstream from the upstream end.

In some embodiments, the downstream end may be located from 35-75 degrees downstream from the upstream end.

In some embodiments, the dirt outlet may have a radial extent and may have an upstream end and a downstream end based on the direction of airflow in the cyclone chamber and the downstream end may be located from 5-150 degrees downstream from the upstream end.

In some embodiments, the downstream end may be located from 15-120 degrees downstream from the upstream end.

In some embodiments, the downstream end may be located from 35-75 degrees downstream from the upstream end.

In some embodiments, the dirt collection chamber may partially surround the cyclone chamber.

In some embodiments, the dirt outlet may have a radial extent and may have an upstream end and a downstream end based on the direction of airflow in the cyclone chamber and the upstream end may be located proximate a location at which a sidewall of the dirt collection chamber extends outwardly from the sidewall of the cyclone chamber.

In some embodiments, the dirt collection chamber may partially surround the cyclone chamber and the upstream end may be located proximate a location at which a sidewall of the dirt collection chamber extends outwardly from the sidewall of the cyclone chamber.

In some embodiments, the dirt collection chamber may partially surround the cyclone chamber and the upstream end may be located proximate a location at which a sidewall of the dirt collection chamber extends outwardly from the sidewall of the cyclone chamber.

In some embodiments, the dirt collection chamber may partially surround the cyclone chamber and the upstream end may be located proximate a location at which a sidewall of the dirt collection chamber extends outwardly from the sidewall of the cyclone chamber.

In some embodiments, the dirt collection chamber may surround the cyclone chamber, the dirt outlet may have a radial extent and may have an upstream end and a downstream end based on the direction of airflow in the cyclone chamber and the upstream end may be located from 0-90 degrees upstream from a location at which a sidewall of the dirt collection chamber is closest to the sidewall of the cyclone chamber.

In some embodiments, the upstream end may be located proximate the location at which a sidewall of the dirt collection chamber is closest to the sidewall of the cyclone chamber.

It will be appreciated by a person skilled in the art that a surface cleaning apparatus may embody any one or more of the features contained herein and that the features may be used in any particular combination or sub-combination.

DRAWINGS

The drawings included herewith are for illustrating various examples of articles, methods, and apparatuses of the teaching of the present specification and are not intended to limit the scope of what is taught in any way.

In the drawings:

FIG. 27a is a partially exploded front perspective view of an embodiment of a cord reel;

FIGS. 27b, 27c, 27d and 28a are front perspective views of the cord reel of FIG. 27a;

FIG. 28b is a perspective view of an embodiment of a locating member;

FIG. 28c is a partially exploded front perspective view of the cord reel of FIGS. 27a, 27b, 27c, 27d and 28a;

FIGS. 30-31 are back perspective views of the cord reel of FIGS. 27a-28a;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

General Description of a Canister Vacuum Cleaner

Figure 1:
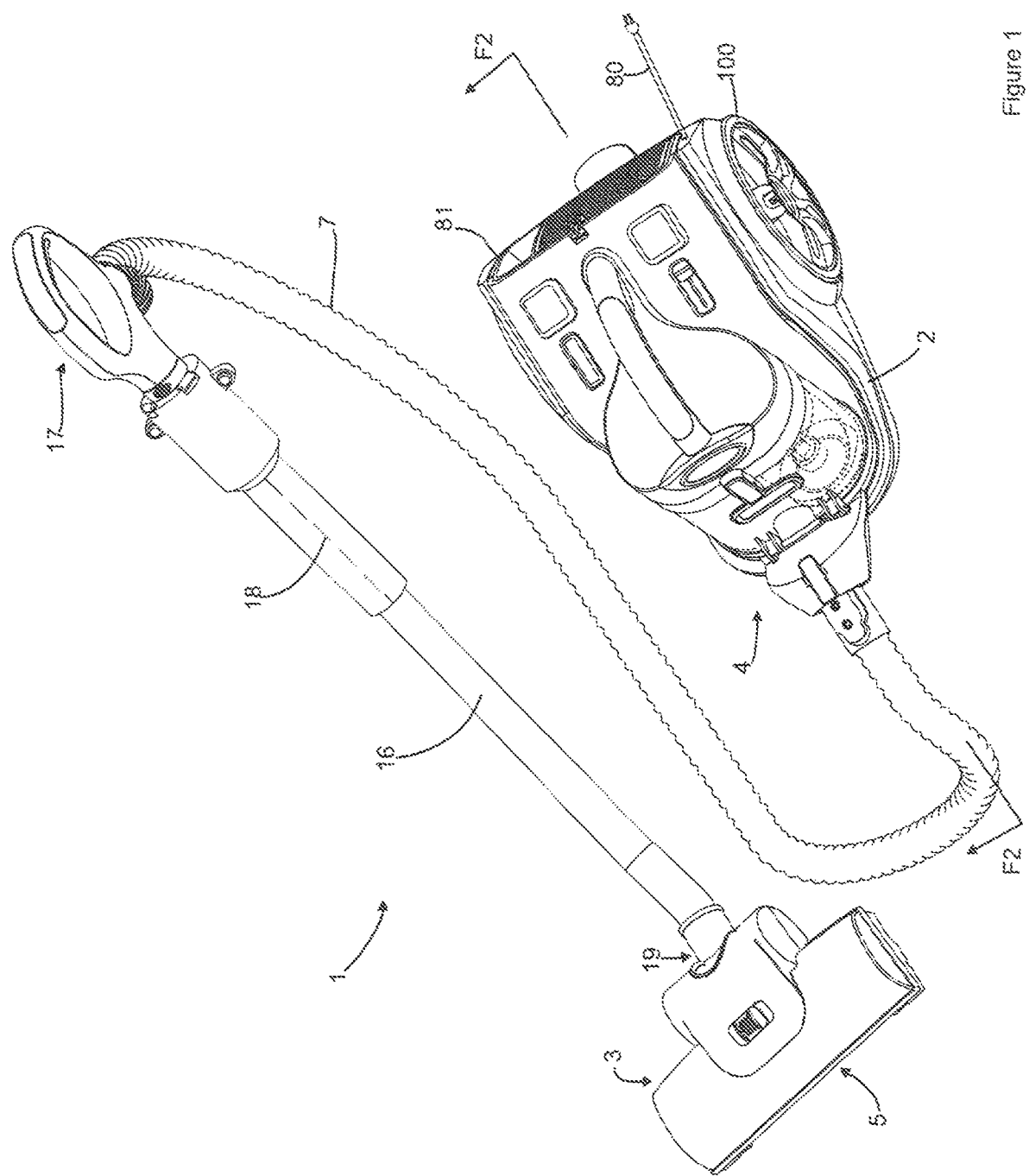
FIG. 1 is a perspective view of an embodiment of a surface cleaning apparatus.

Referring to FIG. 1, a first embodiment of a surface cleaning apparatus 1 is shown. In the embodiment shown, the surface cleaning apparatus is a canister-type vacuum cleaner. In alternate embodiments, the surface cleaning apparatus may be another suitable type of surface cleaning apparatus, such as an upright-style vacuum cleaner, and hand vacuum cleaner, a stick vac, a wet-dry type vacuum cleaner, a carpet extractor or the like.

In the illustrated example, the surface cleaning apparatus 1 includes a chassis portion or support structure 2 and a surface cleaning head 3. A surface cleaning unit 4 is mounted on the chassis portion 2. The surface cleaning apparatus 1 also has at least one dirty air inlet 5, at least one clean air outlet 6, and an air flow path or passage extending therebetween. In the illustrated example, the air flow path includes at least one flexible air flow conduit member (such as a hose 7 or other flexible conduit). Alternatively, the air flow path may be formed from rigid members.

Figure 2:
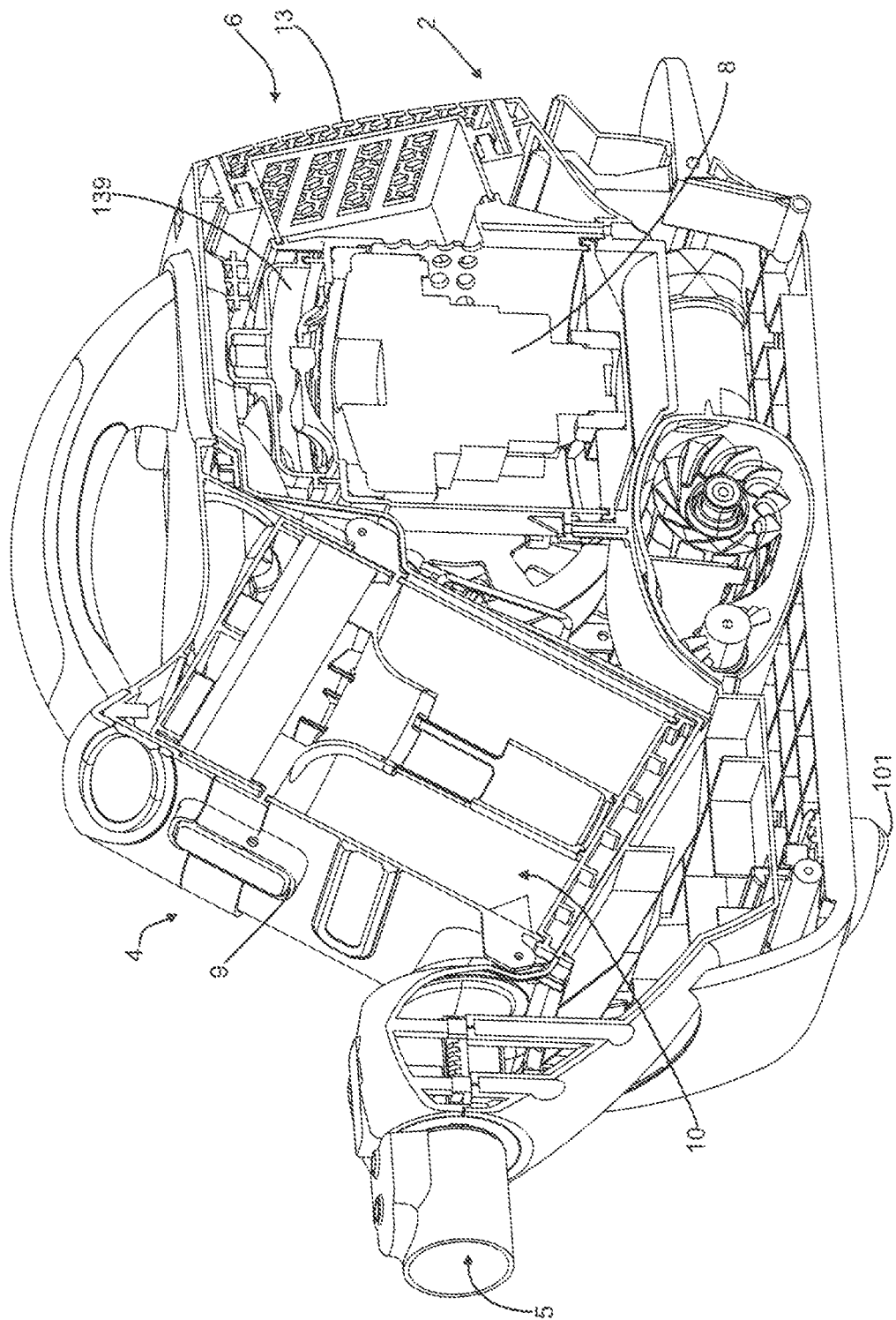
FIG. 2 is a cross-sectional view of a portion of the surface cleaning apparatus of FIG. 1, taken along line F2-F2 in FIG. 1.
Figure 3:
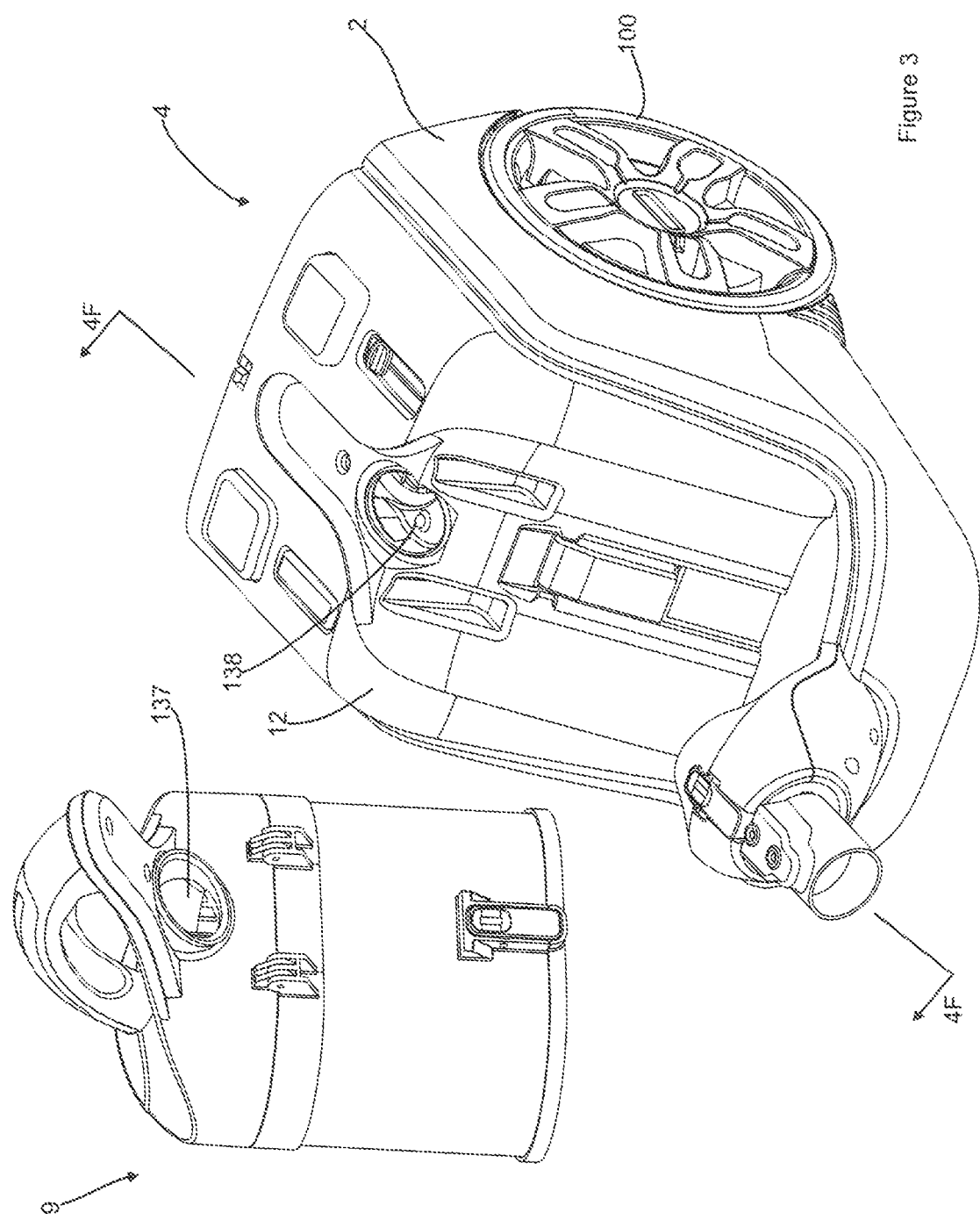
FIG. 3 is a perspective view of a portion of the surface cleaning apparatus of FIG. 1.

At least one suction motor and at least one air treatment member are positioned in the air flow path to separate dirt and other debris from the airflow. Preferably, the chassis portion and/or surface cleaning unit include the suction motor, to draw dirty air in through the dirty air inlet, and the air treatment member to remove dirt or debris from the dirty air flow. The air treatment member may be any suitable air treatment member, including, for example, one or more cyclones, filters, and bags. Preferably at least one air treatment member is provided upstream from the suction motor. Referring to FIGS. 2 and 3, in the illustrated example, the surface cleaning unit includes both the suction motor 8, in a motor housing 12 and an air treatment member in the form of a cyclone bin assembly 9. The motor housing can include at least one removable or openable door or grill 13 which may allow a user to access the interior of the motor housing 12, for example to access the motor 8, a post motor filter (e.g., a HEPA filter) or any other component within the housing 12. Preferably, as exemplified in FIG. 10, a cyclone bin assembly 9 is provided wherein the cyclone bin assembly comprises a cyclone chamber 10 and a dirt collection chamber 11.

Figure 6:
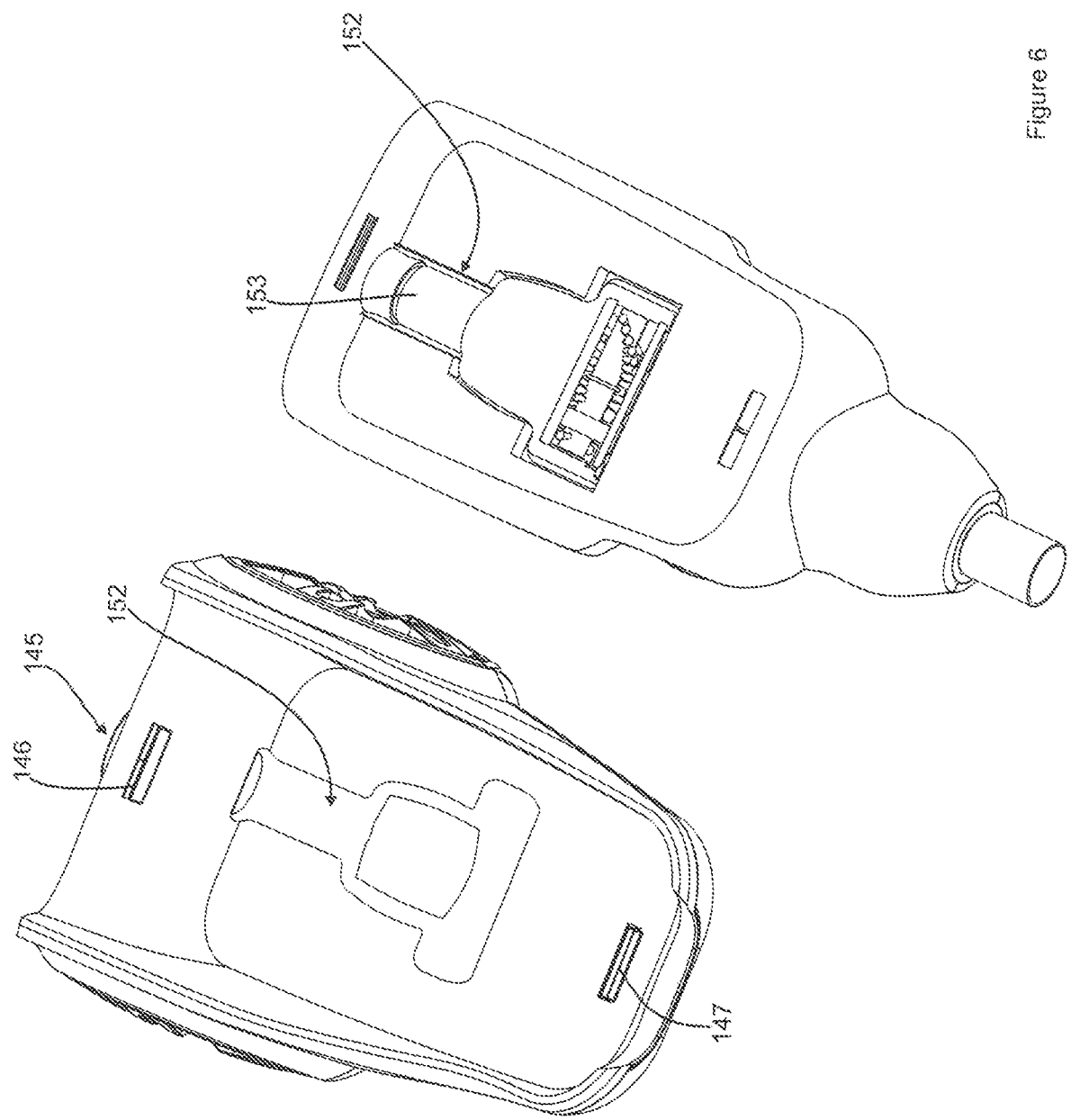
FIG. 6 is a perspective view of a portion of the surface cleaning apparatus of FIG. 1.
Figure 7:
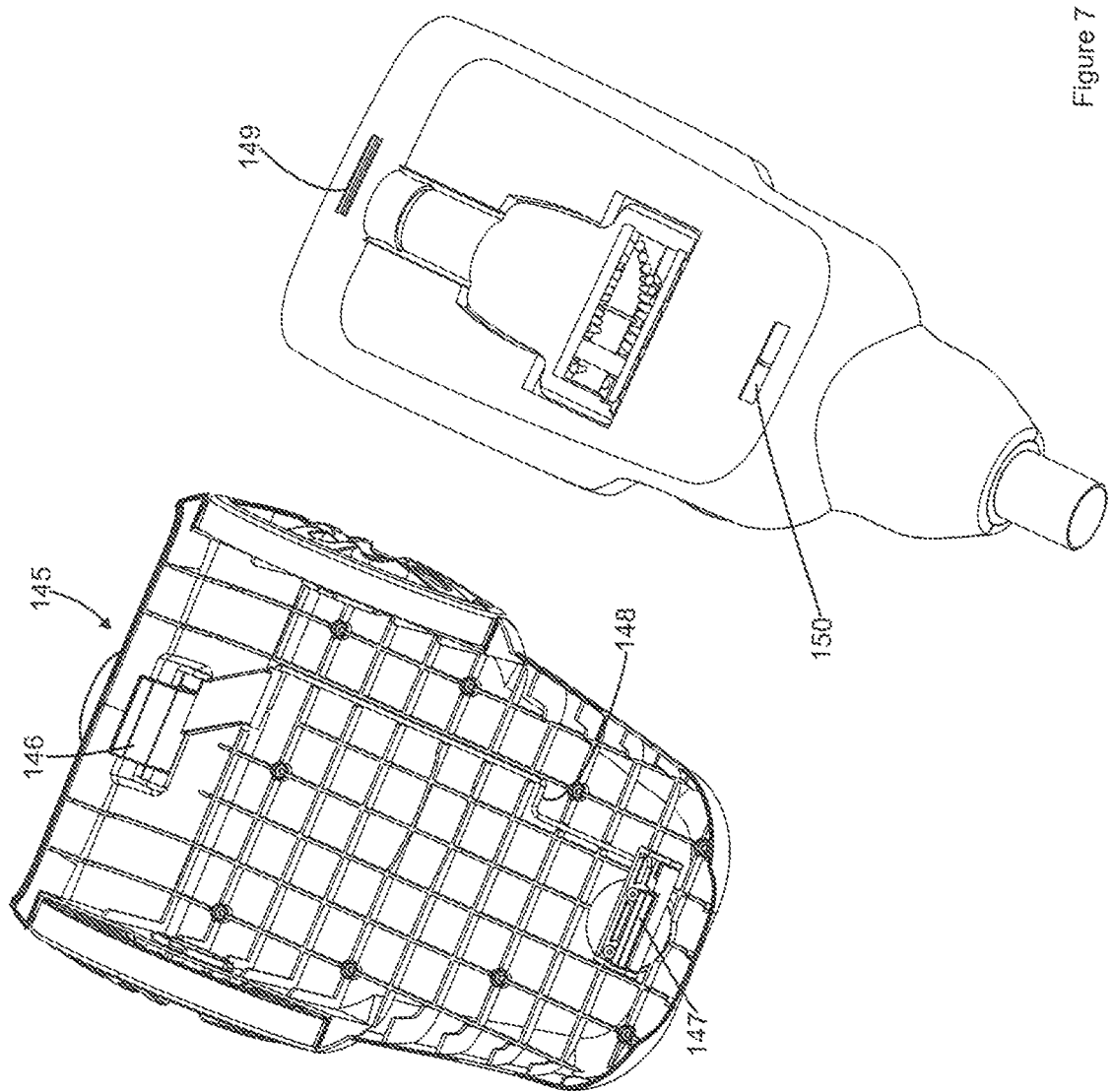
FIG. 7 is the perspective view of FIG. 6 with a portion of the chassis portion removed.
Figure 8:
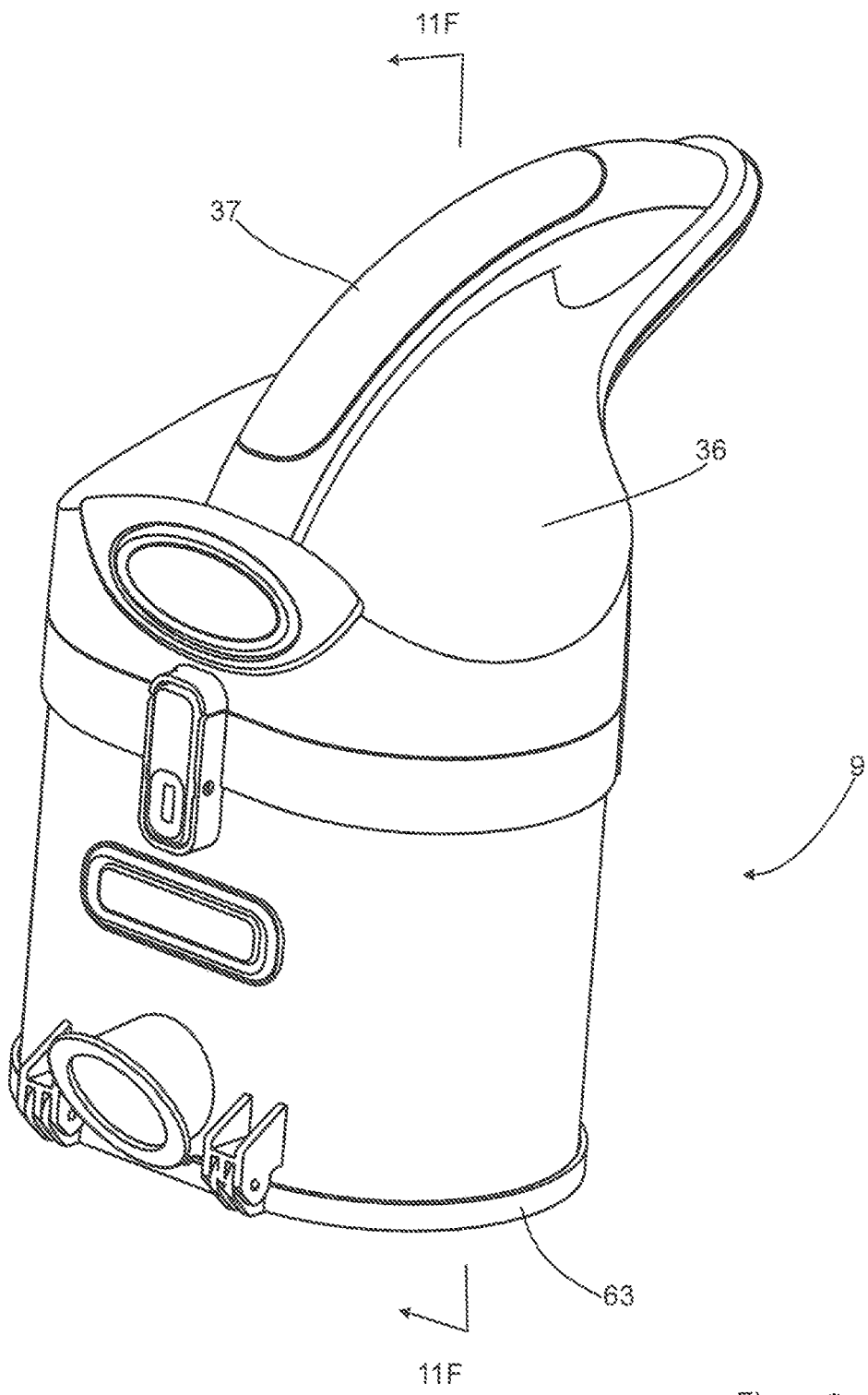
FIG. 8 is a front perspective view of a cyclone bin assembly from the surface cleaning apparatus of FIG. 1.

Optionally, the surface cleaning unit 4 may be a portable surface cleaning unit and may be detachable from the chassis portion (FIG. 3). In such embodiments, the surface cleaning unit 4 includes a suction motor and is removably mounted to chassis portion 2. For example, chassis portion 2 may be connected to surface cleaning unit 4 by a mount apparatus 14 that allows the surface cleaning unit 4 to be detached from the chassis portion 2. Preferably, mount apparatus is has a release actuator that is foot operable, such as a foot pedal. The foot pedal may be lined electrically or mechanically to a surface cleaning unit engagement member, which may comprise one or more engagement members configured to engage and retain surface cleaning unit 4 in position on chassis portion 2. For example, referring to FIGS. 6 and 7, in the illustrated embodiment the mount apparatus 14 includes a foot pedal 145 that is connected to rear latch 146 and to front latch 147 via a connecting rod 148. The rear latch 146 engages a rear slot 149 on the surface cleaning unit 4, and the front latch 147 engages a corresponding front slot 150. Stepping on the pedal 145 can disengage both latches 146, 147, thereby releasing the surface cleaning unit 4 from the chassis portion 2. The latches 146, 147 and pedal 145 can be biased toward the latched configuration. Optionally, a cavity 152 for storing an auxiliary cleaning tool 153 may be formed at the interface between the surface cleaning unit 4 and the chassis 2 and preferably comprises a recess in the lower surface of the surface cleaning unit 4.

In the embodiment shown, the surface cleaning head 3 includes the dirty air inlet 5 in the form of a slot or opening formed in a generally downward facing surface of the surface cleaning head 3. From the dirty air inlet 5, the air flow path extends through the surface cleaning head 3, and through an up flow conduit 16 (FIG. 2) in the chassis portion 2 to the surface cleaning unit 4. In the illustrated example, the clean air outlet 6 is provided in the rear of the surface cleaning unit 4, and is configured to direct the clear air in a generally lateral direction, toward the back of the apparatus 1.

A handle 17 is provided toward the top of the up flow conduit 16 to allow a user to manipulate the surface cleaning head 3. Referring to FIGS. 1 and 3, the up flow conduit 16 extends along an upper axis 18 and is moveably mounted to the surface cleaning head 3. In the illustrated example, the up flow conduit 16 is pivotally mounted to the surface cleaning head via a pivot joint 19. The pivot joint 19 may be any suitable pivot joint. Alternatively, or in addition to being pivotally coupled to the surface cleaning head, the up flow conduit 16 can also be rotatably mounted to the surface cleaning head. In this configuration, the up flow conduit 16 may be rotatable about the upper axis. In this configuration, rotation of the up flow conduit 16 about the upper axis may help steer the surface cleaning head across the floor (or other surface being cleaned). It will be appreciated that the surface cleaning head 3 and conduit 16 may be of any design known in the art and the air flow path to the surface cleaning unit 4 may be of any design.

Portable Cleaning Mode

In one aspect of the teachings described herein, which may be used in combination with any one or more other aspects, the vacuum cleaner 1 may be operable in a variety different functional configurations or operating modes. The versatility of operating in different operating modes may be achieved by permitting the surface cleaning unit to be detachable from the chassis portion. Alternatively, or in addition, further versatility may be achieved by permitting portions of the vacuum cleaner to be detachable from each other at a plurality of locations in the chassis portion, and re-connectable to each other in a variety of combinations and configurations.

In the example illustrated, mounting the surface cleaning unit 4 on the chassis portion 2 allows the chassis portion 2 to carry the weight of the surface cleaning unit 4 and to, e.g., rollingly support the weight using rear wheels 100 and front wheel 101 (FIG. 2). With the surface cleaning unit 4 attached, the vacuum cleaner 1 may be operated like a traditional canister-style vacuum cleaner.

Alternatively, in some cleaning situations the user may preferably detach the surface cleaning unit 4 from the chassis portion 2 and choose to carry the surface cleaning unit 4 (e.g. by hand or by a strap) separately from the chassis portion 2, while still using the up flow conduit 16 to drivingly maneuver the surface cleaning head 3. When the surface cleaning unit 4 is detached, a user may more easily maneuver the surface cleaning head and the cleaning unit 4 around obstacles, like furniture and stairs.

To enable the vacuum suction generated by the surface cleaning unit 4 to reach the surface cleaning head 3 when the surface cleaning unit 4 is detached from the support structure 2, the airflow connection between the surface cleaning head 3 and the cleaning unit 4 is preferably at least partially formed by a flexible conduit, such as the flexible hose 7. The flexible conduit is preferably attached to the surface cleaning unit 4 and not chassis 2 so as to allow a user to detach the surface cleaning unit 4 and maintain a flow connection between the portable surface cleaning unit 4 and the surface cleaning head 3 without having to reconfigure or reconnect any portions of the airflow conduit 16 (FIG. 5).

Figure 5:
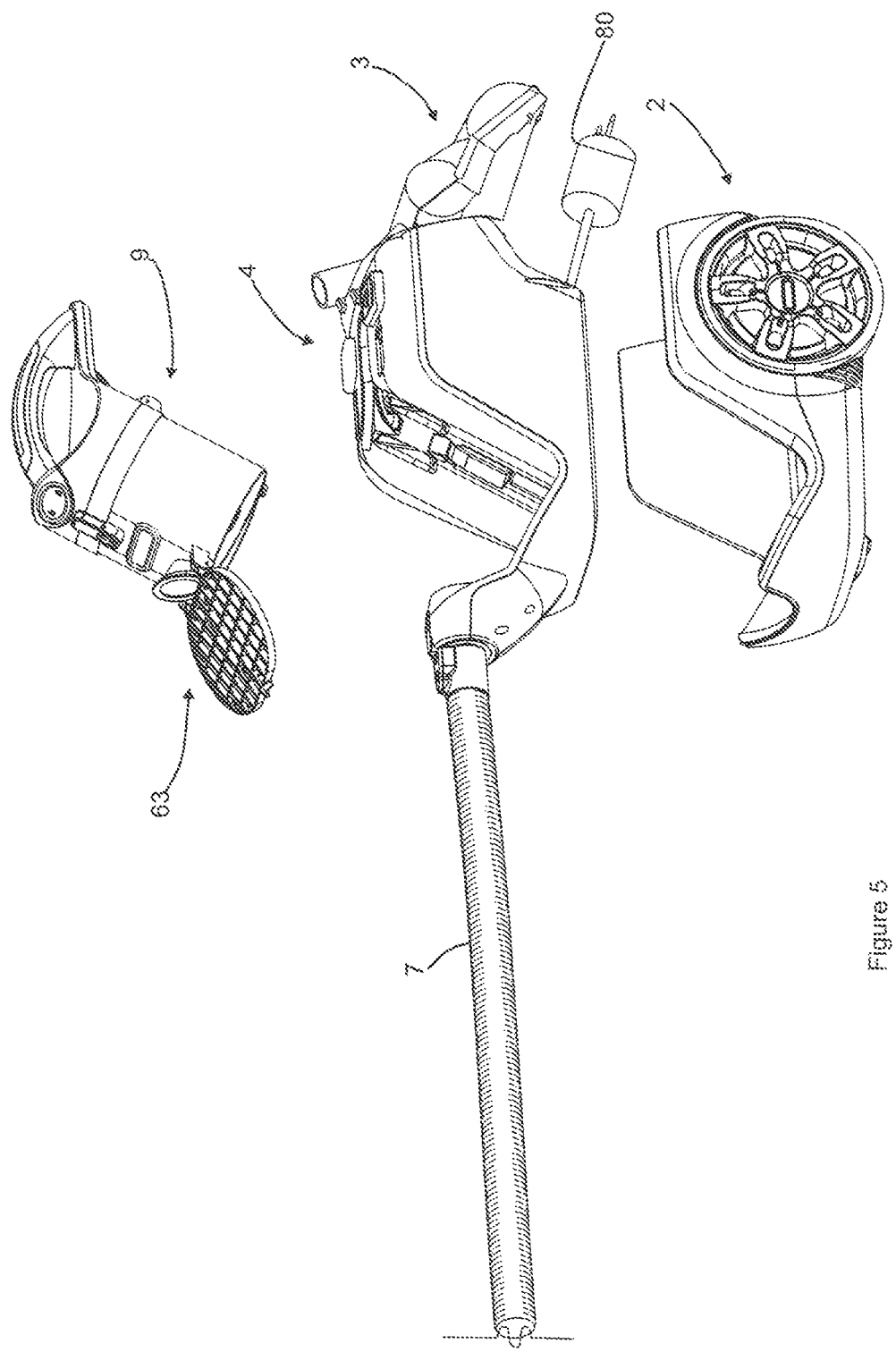
FIG. 5 is a partially exploded perspective view of the surface cleaning apparatus of FIG. 1.

Referring to FIG. 5, when the surface cleaning apparatus 1 is in use, a user may detach the surface cleaning unit 4 from the chassis portion 2 without interrupting the airflow communication between the cleaning unit 4 and the surface cleaning head 3. This allows a user to selectively detach and re-attach the cleaning unit 4 to the support structure 2 during use without having to stop and reconfigure the connecting hoses 7 or other portions of the airflow conduit 16.

Removable Cyclone Bin Assembly

The following is a description of a removable cyclone bin assembly that may be used by itself in any surface cleaning apparatus or in any combination or sub-combination with any other feature or features disclosed herein.

Optionally, the cyclone bin assembly 9 can be detachable from the motor housing 12. Providing a detachable cyclone bin assembly 9 may allow a user to carry the cyclone bin assembly 9 to a garbage can for emptying, without needing to carry or move the rest of the surface cleaning apparatus 1. Preferably, the cyclone bin assembly 9 can be separated from the motor housing 12 while the surface cleaning unit 4 is mounted on the chassis portion 2 and also when the surface cleaning unit 4 is separated from the chassis portion 2. Accordingly, the cyclone bin assembly is preferably positioned on an upper portion of the surface cleaning unit 4 and may be mounted on a shelf or recess provided forwardly of the suction motor.

Preferably, as exemplified in FIG. 3, the cyclone bin assembly 9 is removable as a closed module, which may help prevent dirt and debris from spilling out of the cyclone bin assembly 9 during transport.

Figure 9:
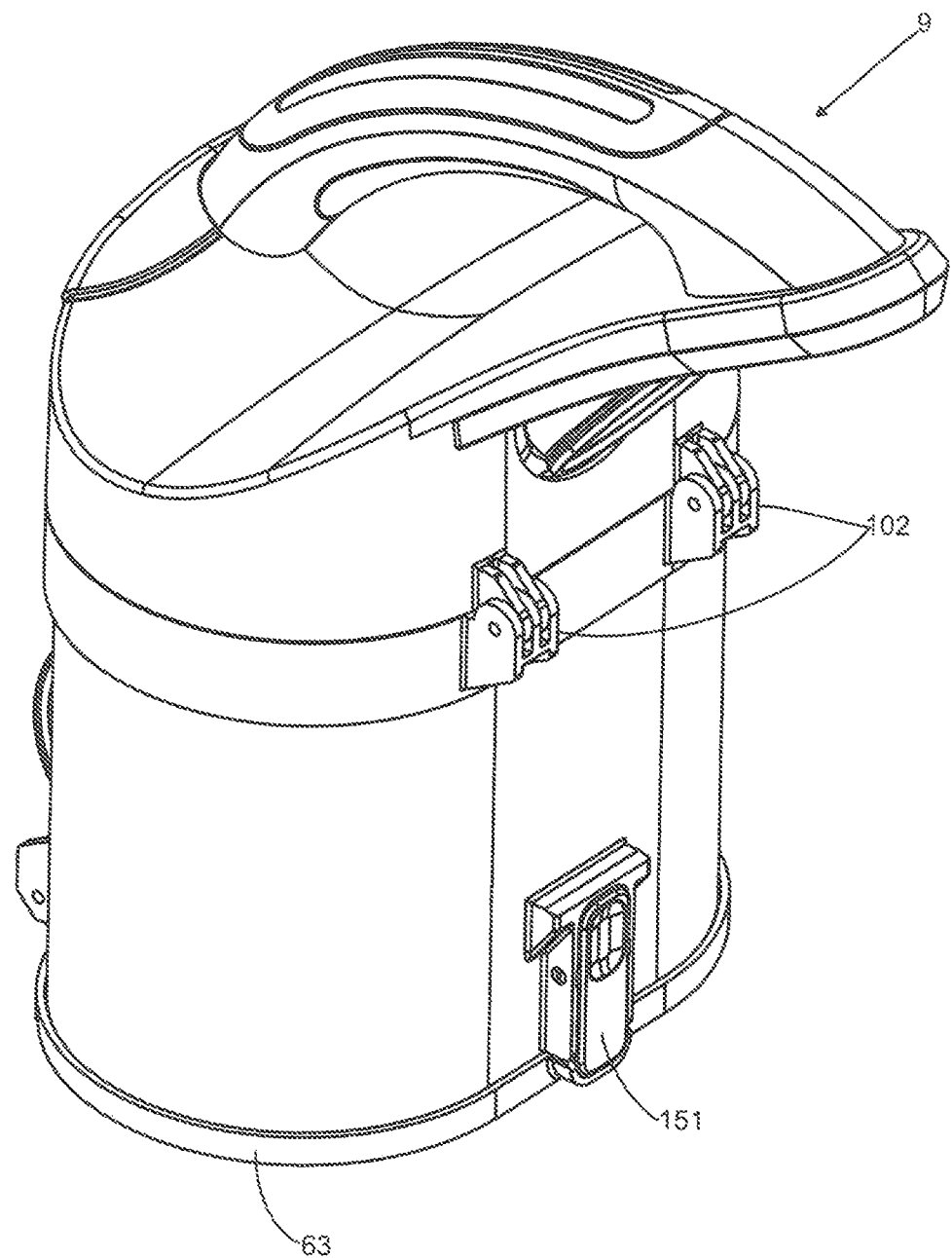
FIG. 9 is a rear perspective view of a cyclone bin assembly from the surface cleaning apparatus of FIG. 1.

In the illustrated example, the cyclone bin assembly 9 includes an outer sidewall 35 and a lid 36. The lid 36 is openable, and in the illustrated embodiment is pivotally connected to the sidewall 35 by hinges 102 (FIG. 9) and pivotal between an open position (FIG. 12) and a closed position (FIG. 9). The lid 36 can be held in its closed position using any suitable closure member, such as releasable latch 103.

In the illustrated embodiment, a bin handle 37 is provided on the lid 36. The bin handle 37 may allow a user to carry the surface cleaning unit 4 when it is detached from the chassis portion 2, and preferably is removable from the suction motor housing 12 with the cyclone bin assembly 9 so that it can also be used to carry the cyclone bin assembly for emptying.

Cyclone Construction

The following is a description of a cyclone construction that may be used by itself in any surface cleaning apparatus or in any combination or sub-combination with any other feature or features disclosed herein.

Figure 11:
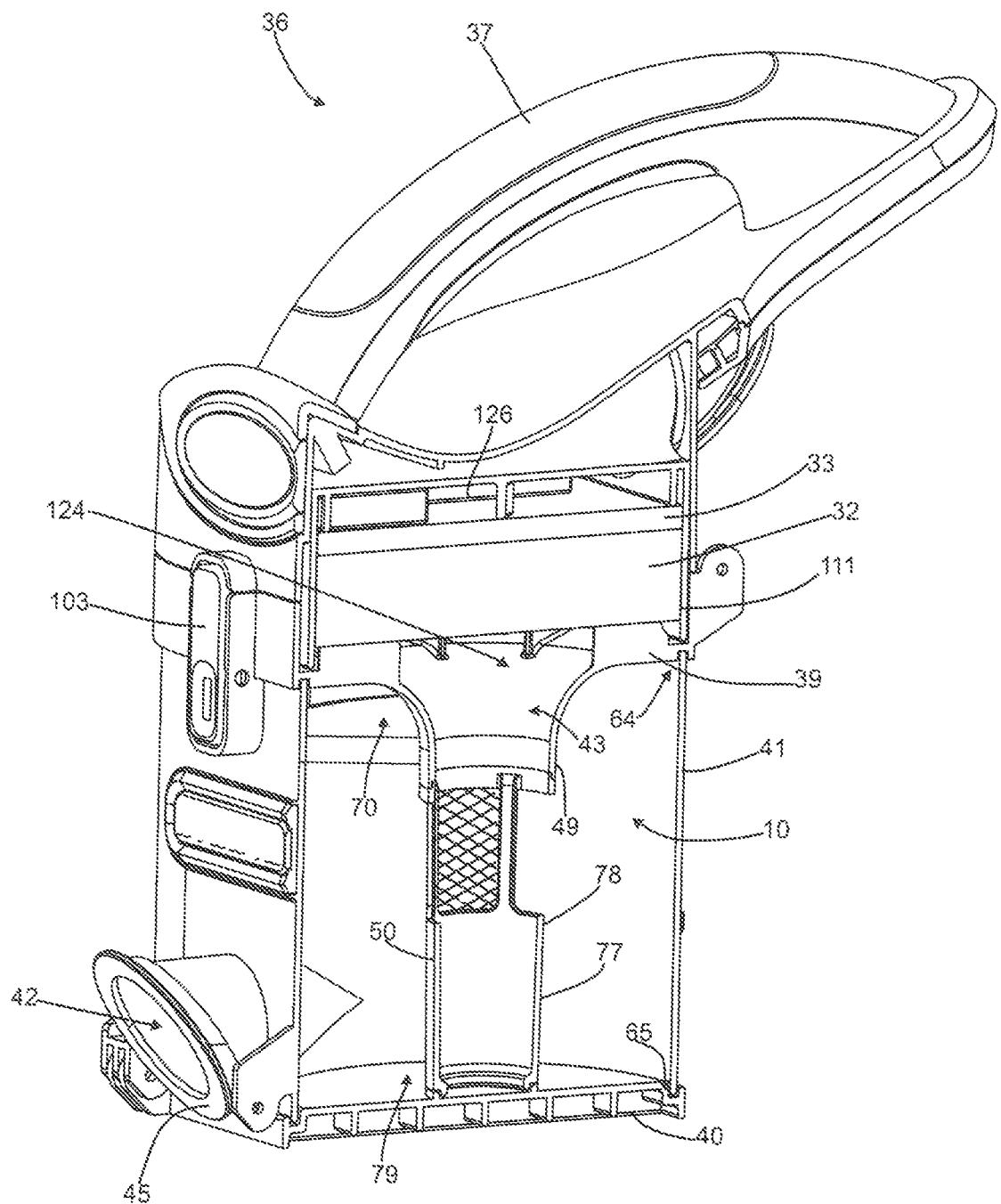
FIG. 11 is a perspective cross sectional view taken along line 11F-11F in FIG. 8.
Figure 13:
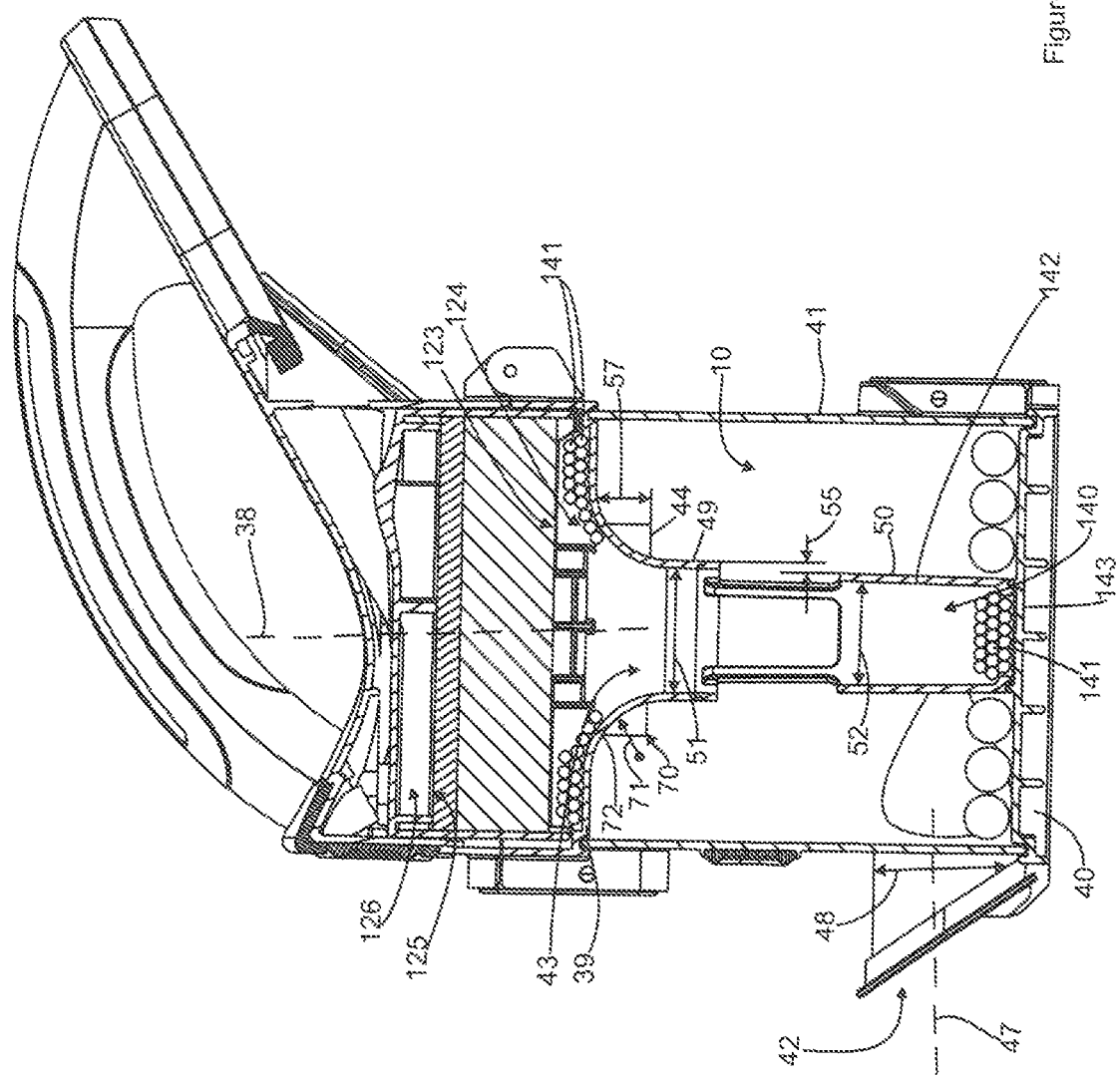
FIG. 13 is a side perspective view taken along line 11F-11F in FIG. 8.

Referring to FIGS. 11 and 13 in the illustrated embodiment the cyclone chamber 10 extends along a cyclone axis 38 and includes a first end wall 39, a second end wall 40 axially spaced apart from the first end wall 39 and a generally cylindrical sidewall 41 extending between the first and second end walls 39, 40. Optionally, some or all of the cyclone walls can coincide with portions of the dirt collection chamber 11 walls, suction motor housing 12 walls and/or may form portions of the outer surface 35 of surface cleaning unit. Alternatively, in some examples some or all of the cyclone walls can be distinct from other portions of the surface cleaning unit. In the illustrated embodiment, the cyclone chamber 10 is arranged in a generally vertical, uniflow cyclone configuration. Alternatively, the cyclone chamber can be provided in another configuration, including, having at least one or both of the air inlet and air outlet positioned toward the top of the cyclone chamber, or as a horizontal or inclined cyclone.

In the illustrated embodiment, the cyclone chamber 10 includes a cyclone air inlet 42 in fluid communication with a cyclone air outlet 43. The cyclone chamber 10 also includes at least one dirt outlet 44 (see also FIG. 10), through which dirt and debris that is separated from the air flow can exit the cyclone chamber 10. While it is preferred that most or all of the dirt exit the cyclone chamber via the dirt outlet, some dirt may settle on the bottom end wall of the cyclone chamber 10 and/or may be carried with the air exiting the cyclone chamber via the air outlet 43.

Preferably the cyclone air inlet 42 is located toward one end of the cyclone chamber 10 (the lower end in the example illustrated) and may be positioned adjacent the corresponding cyclone chamber end wall 40. Alternatively, the cyclone air inlet 42 may be provided at another location within the cyclone chamber 10.

Referring to FIG. 11, in the illustrated embodiment the air inlet 42 includes an upstream or inlet end 45, which may be coupled to the hose 7 or other suitable conduit, and a downstream end 46 (FIG. 10) that is spaced apart from the upstream end 45. In the illustrated configuration, the cyclone bin assembly 9 can be removed from the surface cleaning unit 4, for example, for cleaning or emptying, while the hose 7 remains with the surface cleaning unit 4. This may allow a user to remove the cyclone bin 9 assembly without having to detach or decouple the hose 7. Alternatively, the downstream end of the hose 7 may be coupled to the cyclone bin assembly 9 such that the downstream end of the hose travels with the cyclone bin assembly when it is removed.

The air inlet 42 defines an inlet axis 47 and has an inlet diameter 48 (FIG. 13). The cross-sectional area of the air inlet 42 taken in a plane orthogonal to the inlet axis 47 can be referred to as the cross-sectional area or flow area of the air inlet 42. Preferably, the air inlet 42 is positioned so that air flowing out of the downstream end is travelling generally tangentially relative to the sidewall 41 of the cyclone chamber 10.

The perimeter of the air inlet 42 defines a cross-sectional shape of the air inlet. The cross-sectional shape of the air inlet can be any suitable shape. In the illustrated example the air inlet has a generally round/circular cross-sectional shape with radius 48. Optionally, the diameter 48 may be between about 0.25 inches and about 5 inches or more, preferably between about 1 inch and about 5 inches, more preferably is between about 0.75 and 2 inches or between about 1.5 inches and about 3 inches, and most preferably is about 2 to 2.5 inches or between about 1 to 1.5 inches. Alternatively, instead of being circular, the cross-sectional shape of the air inlet may be another shape, including, for example, oval, square and rectangular.

Air can exit the cyclone chamber 10 via the air outlet 43. Optionally, the cyclone air outlet 43 may be positioned in one of the cyclone chamber end walls, and in the example illustrated is positioned in the end wall 39, at the opposite end of the cyclone chamber 10 from the air inlet 42. In this configuration, air can enter at the bottom of the cyclone chamber 10 and exit at the upper end of the cyclone chamber 10.

Figure 21:
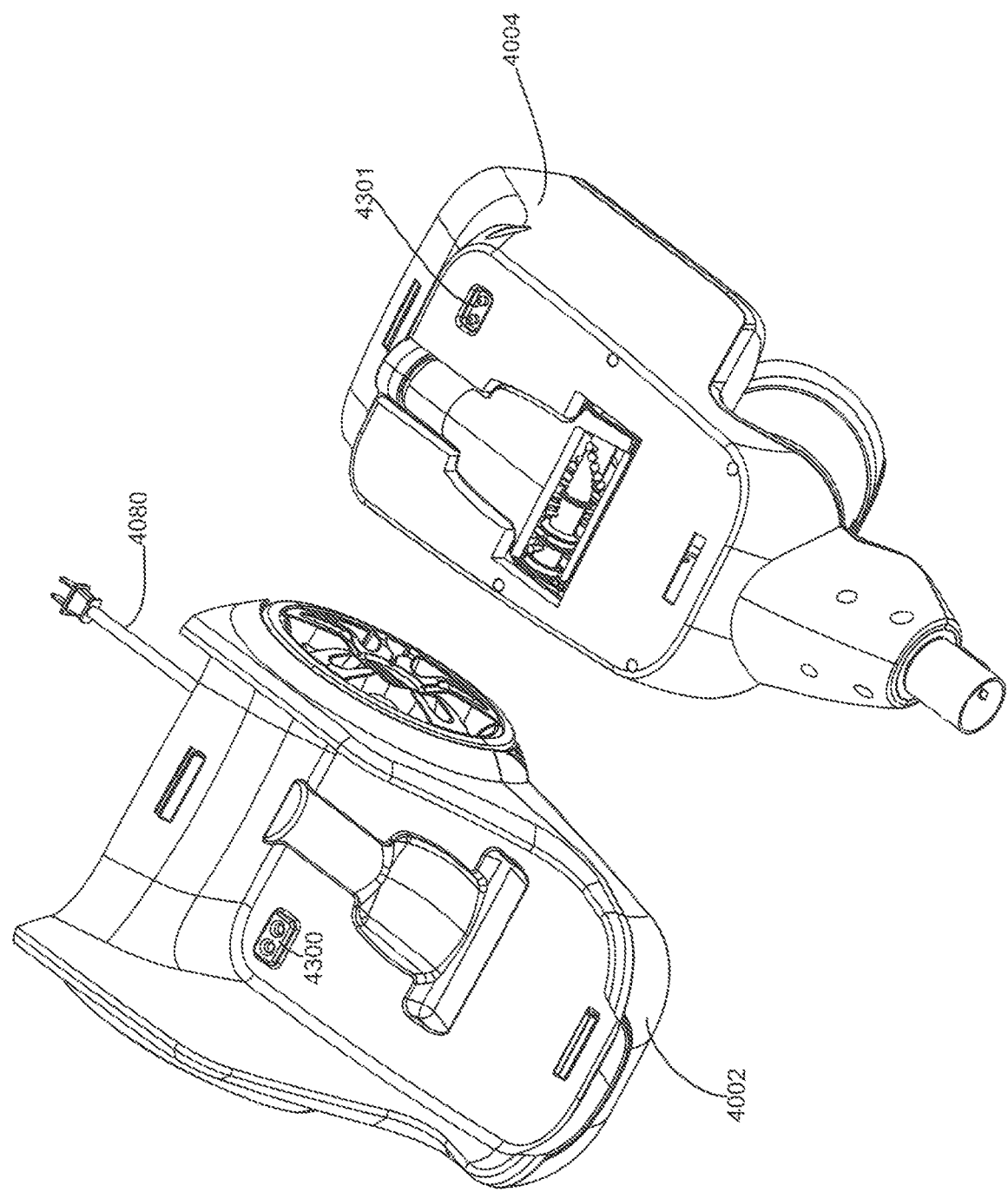
FIG. 21 is an exploded perspective view of the surface cleaning apparatus of FIG. 20.

In the illustrated example, the cyclone air outlet 43 includes a vortex finder 49. In the example illustrated, the longitudinal cyclone axis 38 is aligned with the orientation of the vortex finder 49. In the illustrated embodiment the air outlet 43 is generally circular in cross-sectional shape and defines an air outlet diameter 51 (FIG. 21). Optionally, the cross-sectional or flow area of the cyclone air outlet 43 may be between about 50% and about 150% and between about 60%-90% and about 70%-80% of the cross-sectional area of the cyclone air inlet 42, and preferable is generally equal to the cyclone air inlet area. In this configuration, the air outlet diameter 51 may be about the same as the air inlet diameter 48.

Referring to FIG. 11, in the illustrated embodiment, the upper end wall 39 is connected to the upper end of the sidewall 41 to enclose the upper end of the cyclone chamber 10. In the illustrated example, the intersection or juncture 64 between the end wall 39 and the side wall 41 is a relatively sharp corner that does not include any type of angled or radiused surface. Similarly, in the illustrated embodiment, the lower end wall 40 meets the lower end of the cyclone sidewall 41 at a juncture 65 that is also configured as a relatively sharp corner.

Optionally, the juncture between the vortex finder 49 and the end wall 39 may be provided with an angled or curved surface. In the illustrated embodiment, the juncture 70 between the end wall 40 and the vortex finder 49 includes a curved surface 72 (FIG. 13). The curved surface 72 has a radius 71. The radius 71 may be selected based on the radius of the air inlet 42 (e.g. half of the diameter 48), and optionally may be the selected so that the juncture surface 72 has the same radius as the air inlet 42. Providing curved surface 72 at the juncture 70 may help reduce backpressure and may help improve cyclone efficiency.

Referring to FIG. 11, in the illustrated embodiment the cyclone is a uniflow cyclone and an extension member 77 extends inwardly from a lower end wall of the cyclone chamber and may extend to a position that is proximate the lower end 105 of the screen 50 and may abut lower end 105. The extension member 77 may be a closed member or, alternately, it may be a generally hollow tube-like member that extends between the lower end 105 of the screen 50 and the end wall 40 so as to provide a pre-motor filter dirt cup as discussed subsequently. Together, the vortex finder 49, screen 50 and extension member 77 may form a generally continuous internal column member that extends between the first and second end walls 39 and 40 of the cyclone chamber 10. Providing the projection member 77 may help direct air flow within the cyclone chamber, and may help support and/or stabilize the distal end 78 of the screen 50.

Optionally, the juncture 79 between the end wall 40 and the projection member 77 may include a curved or angled juncture surface, similar to surface 72, or may be provided as a sharp corner as illustrated.

In the illustrated embodiment the extension member 77 is integral with the screen 50 and vortex finder 49, and remains within the cyclone chamber when the door 63 is opened. Alternatively, some or all of the extension member 77, screen 50 and vortex finder 49 may be mounted to the end wall 40, such that they move with the door 63 and is removed from the cyclone chamber when the door 63 is opened.

In the illustrated embodiment, the air inlet 42 is positioned at the juncture 65 between the sidewall 41 and the end wall 40 and is positioned such that the air inlet 42 is adjacent the sidewall 41 and the end wall 40 (i.e. there is no radial gap between the outer edge of the air inlet 42 and the sidewall 41 and no axial gap between the bottom of the air inlet 42 and the end wall 40). Alternatively, the air inlet 42 may be spaced radially inwardly from the sidewall 41 or axially above the end wall 40.

When combined with any other embodiment, the cyclone bin assembly 9 may be of any particular design and may use any number of cyclone chambers and dirt collection chambers. The following is a description of exemplified features of a cyclone bin assembly any of which may be used either individually or in any combination or sub-combination with any other feature disclosed herein.

Screen

The following is a description of a cyclone and a screen that may be used by itself in any surface cleaning apparatus or in any combination or sub-combination with any other feature or features disclosed herein.

Optionally, a screen or other type of filter member may be provided on the cyclone air outlet 43 to help prevent fluff, lint and other debris from exiting via the air outlet. Referring to FIG. 11, in the illustrated example a screen 50 is positioned at the air outlet 43 and connected to the vortex finder 49. In FIG. 11 the screen is illustrated with a representation of its mesh in place, however for clarity the mesh has been omitted from the other Figures. The screen 50 is generally cylindrical in the illustrated embodiment, but may be of any suitable shape, including for example frusto-conical, in other embodiments. Optionally, the screen 50 can be removable from the vortex finder 49.

Optionally, the screen 50 may be sized to have a cross-section area that is larger than, smaller than or generally equal to the air outlet 43 cross-sectional area. Referring to FIG. 13, in the illustrated example, the diameter 52 of the screen 50 is less than the diameter 51 of the vortex finder 49 conduit providing the cyclone air outlet 43. In this configuration, the radial surface 53 of the screen 50 is radially offset inwardly from the surface 54 of the vortex finder 49 by an offset distance 55. Providing the offset gap 55 between the surfaces 53, 54 of the screen 50 and vortex finder 49 may help provide a relatively calmer region (i.e. a region of reduced air flow turbulence and/or laminar air flow) within the cyclone chamber 10. It may also assist the air that has been treated in the cyclone chamber to travel towards the vortex finder while mixing less with the air entering the cyclone chamber via the air inlet and thereby reduce the likelihood of dirt bypassing treatment in the cyclone chamber and travelling directly to the air outlet. Providing a relatively calmer air flow region adjacent the surface 53 of the screen 50 may help enable air to more easily flow through the screen 50 and into the vortex finder 49, which may help reduce backpressure in the air flow path. Reducing back pressure may help improve the efficiency of the cyclone chamber and/or may help reduce power requirements for generating and/or maintaining a desired level of suction.

In the illustrated embodiment the screen 50 is of generally constant diameter. Alternatively, the diameter of the screen 50 may vary along its length. For example, the screen may be generally tapered and may narrow toward its upper end (i.e. the end that is spaced apart from the vortex finder 49). The cross sectional area of the inner end of the screen may be 60-90% the cross sectional area of the air inlet and preferably is 70-80% the cross sectional area of the air inlet.

The screen may be tapered such that the width at the base of the screen (adjacent the vortex finder) is greater than the width at the upper end of the screen. In this configuration the cross-sectional area of the screen (in a plane that is generally perpendicular to the screen 50) is greater at the base of the screen than at its upper end. The amount of taper on the screen may be any suitable amount, and for example may be selected so that the cross-sectional area at the upper end of the screen is between about 60% and 90%, between about 70% and 80% and may be about 63%-67% of the cross-sectional area of the base of the screen.

Dirt Outlet

The following is a description of a cyclone dirt outlet that may be used by itself in any surface cleaning apparatus or in any combination or sub-combination with any other feature or features disclosed herein.

Cyclone chamber 10 may be in communication with a dirt collection chamber by any suitable means. Preferably, as exemplified, the dirt collection chamber 11 is exterior to cyclone chamber 10, and preferably has a sidewall 56 at least partially or completely laterally surrounds the cyclone chamber 10. At least partially nesting the cyclone chamber 10 within the dirt collection chamber 11 may help reduce the overall size of the cyclone bin assembly. Referring to FIG. 2, in the illustrated embodiment the cyclone chamber sidewall 41 is coincident with the sidewall 56 for approximately half its circumference. It will be appreciated that the dirt collection chamber may fully surround the cyclone chamber.

In the illustrated embodiment, the dirt outlet 44 is in communication with the cyclone chamber 10 and the dirt collection chamber 11. Optionally, the dirt outlet 44 can be axially and/or angularly spaced from the cyclone air inlet. Preferably, the cyclone dirt outlet 44 is positioned toward the opposite end of the cyclone chamber 10 from the cyclone air inlet 42. The cyclone dirt outlet 44 may be any type of opening and may be in communication with the dirt collection chamber to allow dirt and debris to exit the cyclone chamber 10 and enter the dirt collection chamber 11.

In the illustrated example, the cyclone dirt outlet 44 is in the form of a slot bounded by the cyclone side wall 41 and the upper cyclone end wall 39, and is located toward the upper end of the cyclone chamber 10. Alternatively, in other embodiments, the dirt outlet may be of any other suitable configuration, and may be provided at another location in the cyclone chamber, including, for example as an annular gap between the sidewall and an end wall of the cyclone chamber or an arrestor plate or other suitable member. If the dirt outlet comprises an annular gap, then a cut out may be provided in the end of the sidewall of the cyclone chamber facing the end wall of the plate so that part of the sidewall may be further from the plate or end wall than the rest of the sidewall.

In a preferred embodiment, a cyclone chamber comprises a uniflow cyclone with a dirt outlet at the air outlet end. Preferably, the dirt outlet is a slot shaped dirt outlet and more preferably, the end wall abuts the sidewall of the cyclone chamber except at the location of the dirt outlet. In such a case, the air outlet or vortex finder preferably extends into the cyclone chamber further than the edge of the dirt outlet that is spaced furthest from the end wall.

Referring to FIG. 13, the dirt slot 44 may be of any suitable length 57, generally measured in the axial direction, and may be between about 0.1 inches and about 2 inches, or more. Optionally, the length 57 of the slot 44 may be constant along its width, or alternatively the length 57 may vary along the width of the slot 44, preferably in the downstream direction as measured by the direction of air rotation in the cyclone chamber.

Optionally, the slot 44 may extend around the entire perimeter of the cyclone chamber (forming a generally continuous annular gap) or may extend around only a portion of the cyclone chamber perimeter. For example, the slot may subtend an angle 73 (FIG. 10) that is between about 5° and about 360°, and may be between about 5-150°, about 15-120°, about 35-75°, about 45 and about 90° and between about 60 and 80°. Similarly, the slot 44 may extend around about 10% to about 80% of the cyclone chamber perimeter, and preferably may extend around about 15% to about 40% of the cyclone chamber perimeter.

Optionally, the slot 44 may be positioned so that it is angularly aligned with the cyclone air inlet 42, or so that an angle 60 (FIG. 10) between the air inlet and the slot 44 (measured to a center line of the slot 44) is between about 0 and about 350° or more, and may be between 5° and about 180° and may be between about 0 and about 90°. In some embodiments, the slot 44 can be positioned so that an upstream end of the slot (i.e. the end of the slot that is upstream relative to the direction of the air circulating within the cyclone chamber) is between about 0° and about 350° from the air inlet, and may be between about 5 and 180° and between about 0-90°, about 0-45° and about 0-15° downstream from the air inlet.

Figure 10:
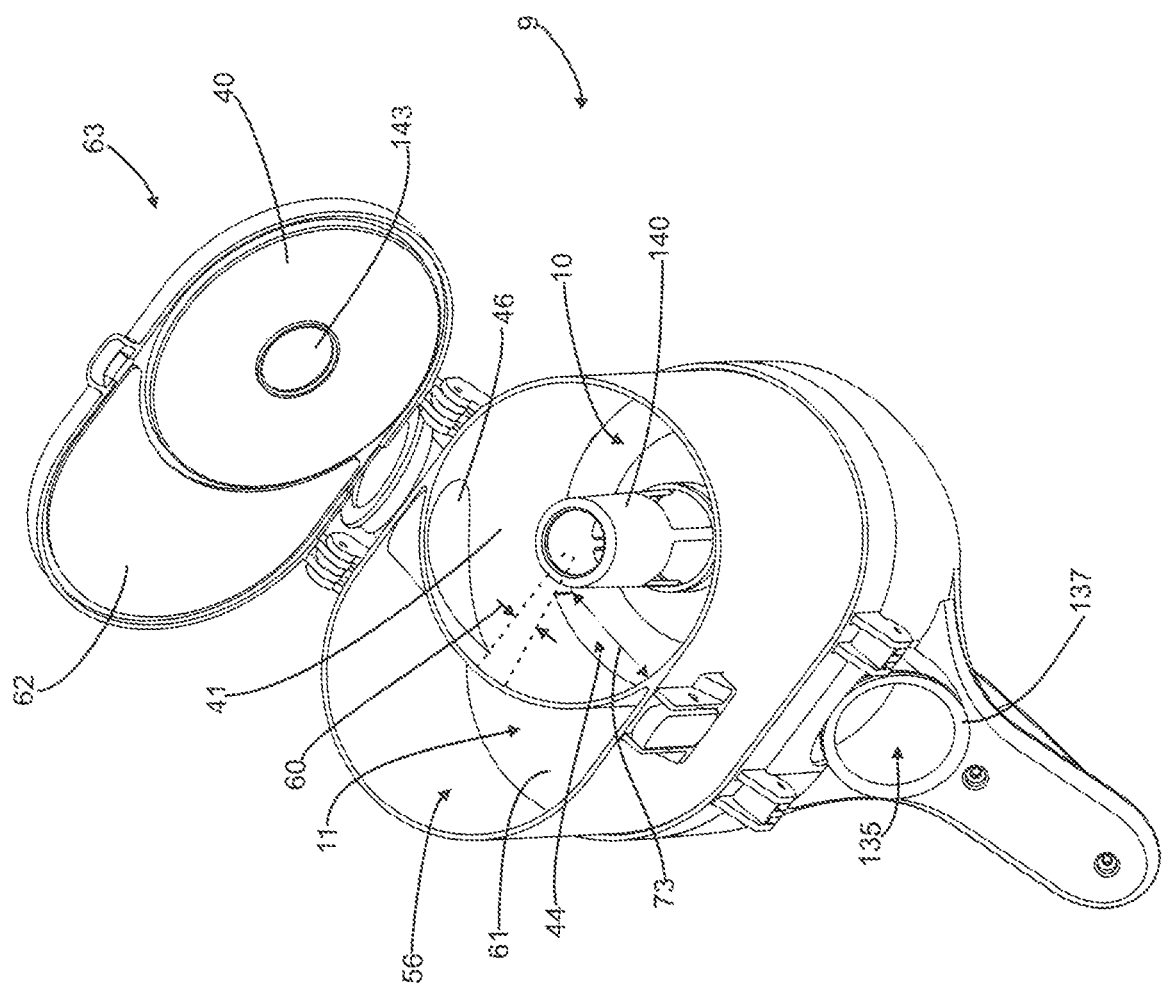
FIG. 10 is a bottom perspective view of a cyclone bin assembly from the surface cleaning apparatus of FIG. 1 with the bin open.

The dirt collection chamber 11 may be of any suitable configuration. Referring to FIG. 10, in the illustrated example, the dirt collection chamber 11 includes a first end wall 61, a second end wall 62 and the sidewall 56 extending therebetween.

To help facilitate emptying the dirt collection chamber 11, one of or both of the end walls 61, 62 may be openable. Similarly, one or both of the cyclone chamber end walls 39 and 40 may be openable to allow a user to empty debris from the cyclone chamber. In the illustrated example, the upper dirt chamber end wall 61 is integral with the upper cyclone end wall 39 and the lower dirt collection chamber end wall 62 is integral with, and openable with, the lower cyclone chamber end wall 40 and both form part of the openable bottom door 63. The door 63 is moveable between a closed position (FIG. 11) and an open position (FIG. 10). When the door 63 is open, both the cyclone chamber 10 and the dirt collection chamber 11 can be emptied concurrently. Alternatively, the end walls of the dirt collection chamber 11 and the cyclone chamber 10 need not be integral with each other, and the dirt collection chamber 11 may be openable independently of the cyclone chamber 10.

Pre-Motor Filter Housing

The following is a description of a pre-motor filter housing that may be used by itself in any surface cleaning apparatus or in any combination or sub-combination with any other feature or features disclosed herein.

Figure 12:
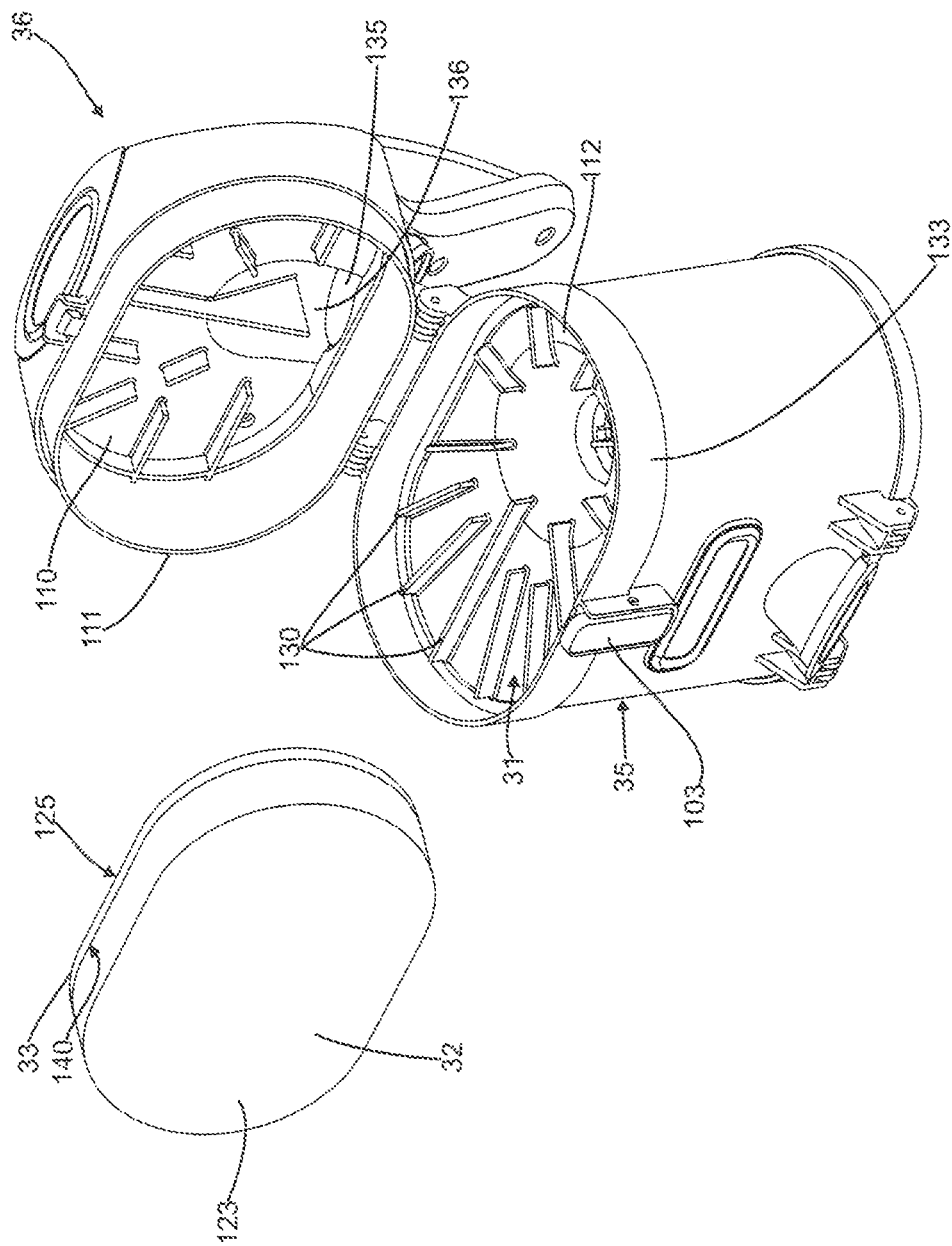
FIG. 12 is a top perspective view of a cyclone bin assembly from the surface cleaning apparatus of FIG. 1 with the lid open and the pre-motor filters removed.

Referring to FIG. 12, in the illustrated embodiment, the cyclone bin assembly 9 includes a pre-motor filter chamber 31 that is positioned in the air flow path between the cyclone chamber 10 and the suction motor 8 (see also FIG. 11). One or more filters can be provided in the pre-motor filter chamber 31 to filter the air exiting the cyclone bin assembly 9 before it reaches the motor 8. Preferably, as exemplified, the pre-motor filter includes a foam filter 32 and a downstream felt layer 33 positioned within the pre-motor filter chamber 31. Preferably, the filters 32, 33 are removable (FIG. 12) to allow a user to clean and/or replace them when they are dirty.

Referring to FIG. 12, the pre-motor filter chamber 31 includes an upper end wall 110, a sidewall 111 and a lower end wall 112. Optionally, the sidewalls 111 of the pre-motor filter chamber 31 can be at least partially transparent so that a user can visually inspect the condition of the filters 32, 33 to determine if they require cleaning or replacement without having to remove the cyclone bin assembly 9.

The open headspace or header between the upper end wall 39 of the cyclone chamber 10 and the upstream side 123 of the filter 32 defines an upstream air plenum 124 (see FIG. 13). Providing the upstream plenum 124 allows air to flow across the upstream side 123 of the filter 32. The open headspace or header downstream of the filters 32, 33, between the downstream side 125 of filter 33 and the upper wall 110, provides a downstream air plenum 126. Providing a downstream plenum 126 allows air exiting the filters 32, 33 to flow radially across the downstream side 125 of filter 33 and toward the pre-motor filter chamber air outlet 135. In use, air exits the cyclone chamber 10 via the air outlet 43 and flows into upstream plenum 124, through filters 32, 33, into downstream plenum 126 and into the air outlet 135 of the pre-motor filter housing.

Figure 4:
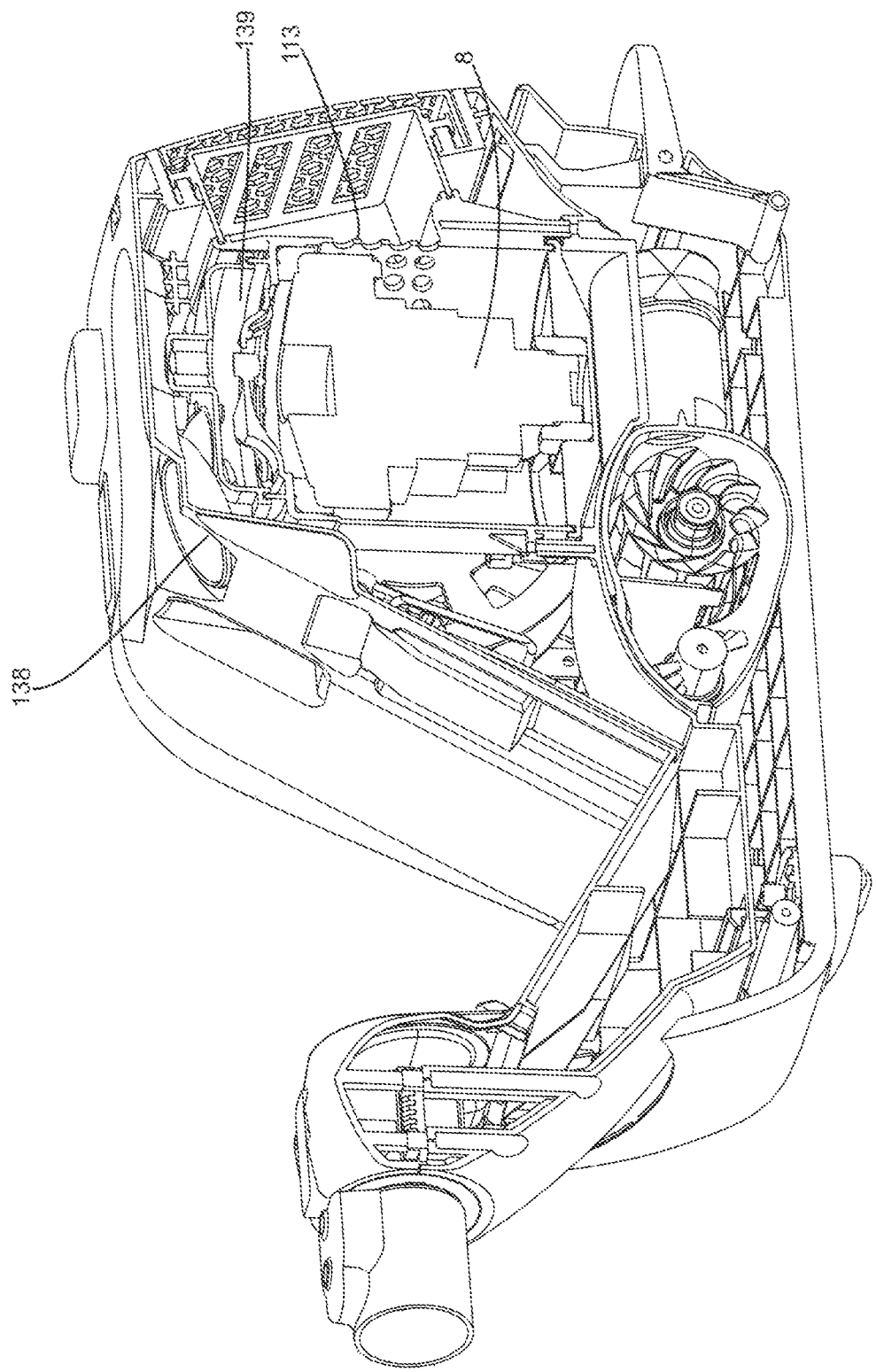
FIG. 4 is a cross sectional view taken along line 4F-4F in FIG. 3.

In the illustrated embodiment, the air outlet 135 is provided in the lid 36 and has an inlet end 136 in the pre-motor filter chamber (FIG. 12) and an outlet end 137 provided on the outer surface of the cyclone bin assembly (FIGS. 10 and 4). To provide air flow communication between the pre-motor filter chamber 31 and the suction motor 8, the outlet end 137 is configured to mate with the inlet end 138 of a motor air flow passage 139 provided in the surface cleaning unit 4. The motor air flow passage 139 is in air flow communication with the air inlet 113 of the suction motor 8.

Referring to FIG. 12, most of the upper end wall 110 and sidewall 111 may be provided by the inner surface of the lid 36, which may be opened to provide access to the filters 32, 32. In the illustrated embodiment, opening the lid 36 exposes the downstream side 125 of filter 33, which is generally the cleaner side of the pre-motor filter. Configuring the pre-motor filter chamber so that the clean, downstream side of the filter is exposed to the user when the lid 36 is opened allows a user to grasp the clean side 125 of the filter 33. This may allow the user to remove or manipulate the filter 33 while holding its clean side 125, and may eliminate the need for a user to grasp or otherwise contact the relatively dirtier, upstream side of the filter.

Optionally, filter 33 may be connected to filter 32 so that a user grasping the clean side 125 may be able to remove both filters 32, 33. Alternatively, the filter 33 may be removable independently from the filter 32. In such a configuration, removing the filter 33 will expose the downstream side 140 of the filter 32. While potentially not as clear as surface 125, the downstream side 140 of filter 32 is likely to be cleaner than upstream side 123. In this configuration, a user can grasp filter 32 via downstream side 140 and can avoid having to touch or otherwise contact the dirtier upstream side 123.

Optionally, some or all of the intersections between the vortex finder and wall 110, the walls 110 and 111, the walls 111 and 112, and the wall 112 and the pre-motor filter air outlet 135 may include angled or curved surfaces, for example like the surfaces within the cyclone chamber 10. Providing curved or smooth junctures within the pre-motor filter housing 31 may help improve air flow and may reduce backpressure in the air flow path. This may help improve the efficiency of the surface cleaning apparatus 1. Improving the efficiency may allow the surface cleaning apparatus to provide improved suction capabilities, and/or may allow the surface cleaning apparatus to maintain its existing suction capabilities while requiring a smaller, less powerful motor 8.

In the illustrated example, the bottom wall 112 includes a plurality of supporting ribs 130 that project upwards from the wall 112 into the chamber 31. The ribs 130 are configured to contact the upstream side 123 of the filters (in this example felt filter 32) in the chamber 31 and to hold it above the wall 112, thereby help to maintaining the downstream plenum 126. The ribs 130 are spaced apart from each other to allow air to flow between them, within the plenum 126, and toward the suction motor air inlet 113. In the illustrated embodiment, the upper wall 110 also includes a plurality of ribs 130 for contacting the upstream side 125 of the filters (in this example filter 33) and to maintain a spacing between the upstream side 125 and the wall 110 to provide the upstream plenum 126.

Optionally, some or all of the support ribs in the pre-motor filter chamber 31 may be configured to help guide or direct the air flowing through the downstream plenum 126. For example, some of the ribs may be configured to help induce rotation of the air within the plenum 126, before it flows into the suction motor 8. Preferably, this pre-rotation of the air flow can be selected so that the air is rotated in the direction of revolution of the suction motor 8. Pre-rotating the air in this manner may help improve the efficiency of the surface cleaning unit 4. The ribs may be configured in any suitable manner to help impart rotation to the air flow.

The ribs 130 define a rib height 133. If the lower wall 112 of the pre-motor filter is flat, the height 133 of each rib 130, 131 may remain constant along its entire with. Alternatively, if the lower wall 112 varies in height, (e.g., the ribs extend to a trumpet shaped portion of a vortex finder, then the ribs 130, 131 may also vary in height so as to provide a planar support surface for the filter. Preferably, the ribs 130, 131 are configured such that the upper ends of the ribs 130, 131 lie in a common plane to support the filter 33, and the lower ends of the ribs are in contact with the wall 112.

Pre-Motor Filter Dirt Chamber and Filter Cleaning Member

The following is a description of a pre-motor filter dirt chamber and a filter cleaning member, each of which may be used separately or together in any surface cleaning apparatus or in any combination or sub-combination with any other feature or features disclosed herein.

When the surface cleaning apparatus 1 is in use the upstream side 123 of the filter 32 may become soiled and/or partially blocked by dust and other relatively fine debris that is carried out of the cyclone chamber 10. If the upstream side 123 of the filter 32 becomes sufficiently blocked, air flow through filter 32 may be compromised and efficiency of the surface cleaning apparatus 1 may decrease. One method of cleaning the upstream side 123 of the filter 32 is for a user to remove the filter 32 as described above, clean the surface 123 and replace the filter 32 within the pre-motor filter chamber 31. Optionally, instead of cleaning the filter 32, a user may insert a new filter. Alternatively, instead of removing the filter 32 from the pre-motor filter chamber 31, the surface cleaning apparatus 1 may be configured to allow the filter 32, particularly the upstream side 123, to be cleaned in situ, without removing the filter 32 from the pre-motor filter chamber 31. Dirt and debris may be extracted from the upstream side 123 using any suitable mechanism, including, for example, banging to tapping one or more sides of the pre-motor filter chamber 31 and/or the pre-motor filter to dislodge the dirt and using a mechanical and/or electro-mechanical mechanism to help dislodge the debris. Examples of such mechanisms may include, for example, a scraper or other mechanical member that contacts and cleans the surface 123 and a shaker or beater type of mechanism that can shake the filter 32 to help dislodge the debris.

Alternately, or in addition, the pre-motor filter chamber 31 may be configured to receive fine dirt and debris from the upstream side 123 and direct the debris into a fine particle collection chamber or pre-motor filter dirt chamber that can collect the dislodged debris. The fine particle collection chamber may be a portion of the primary dirt collection chamber 11, or may be provided as a separate chamber. The fine particle collection chamber may be positioned directly below the upstream side of the pre-motor filter so that dirt falls downwardly into the chamber or it may be laterally spaced so that the dirt is conveyed laterally, e.g., by a ramp or an angled surface, to the chamber.

Referring to FIG. 13, in the illustrated embodiment, the cyclone bin assembly 9 includes a pre-motor filter dirt chamber 140 for receiving debris 141 that is dislodged from the upstream upside 123 of filter 32. In the illustrated embodiment, the dirt chamber 140 is located within the extension member 77, which is inside the cyclone chamber 10. In this configuration, there is no communication between the dirt chamber 140 and the dirt chamber 11, nor do they share any walls or components in common. Alternatively, the dirt chamber 140 may be nested within the dirt chamber 11 and/or may have one or more surfaces or walls in common with the dirt chamber 11.

In the illustrated example, the bottom wall 112 of the pre-motor filter chamber 31 (which is coincident with the upper wall 39 of the cyclone chamber 10 in this example) is curved downwardly toward the air inlet 43. Curving the wall 112 in this manner may help guide the debris toward the air outlet 43. When the air flow through the cyclone chamber 10 is off (i.e. when the cyclone bin assembly 9 is removed and/or when the surface cleaning apparatus is off), the debris 141 on wall 112 may fall downwardly though the vortex finder 39, through the air outlet, pass through the interior of the screen 50 and fall into the dirt chamber 140. Because the dirt chamber 140 is positioned below the air flow openings in the screen 50 it may be a relatively low air flow region when the surface cleaning apparatus is in use. This may allow debris 141 that has accumulated in dirt chamber 140 to remain in the dirt chamber 140 if the surface cleaning apparatus 1 is used prior to emptying the dirt chamber 140, as the debris 141 in chamber 140 will tend not to be re-entrained in the air flowing into the screen 50 and upwardly though the air outlet 43.

The dirt chamber 140 includes a sidewall 142 and a bottom wall 143. The top of the chamber 140 is open to receive the debris 141. Referring to FIG. 10, in the illustrated embodiment the lower end of the dirt chamber 140 is integral with the floor 40 of the cyclone chamber and is part of the openable door 63. In this configuration, the pre-motor filter dirt chamber 140 is contained within the cyclone bin assembly 9, and is therefore removable from the surface cleaning unit 4 with the cyclone chamber 10, dirt chamber 11 and pre-motor filter chamber 31 for emptying and/or cleaning. Preferably, as illustrated, the dirt chamber 140 can be removed in its closed configuration to help prevent dirt and debris from spilling when the cyclone bin assembly 9 is manipulated.

In this configuration, opening the door 63 simultaneously opens the cyclone chamber 10, the dirt chamber 11 and the pre-motor filter dirt chamber 140. Alternatively, the pre-motor filter chamber 140 can be configured so that it is openable in combination with only one of the cyclone chamber 10 and/or dirt collection chamber 11, or independently from any other chamber.

Figure 14:
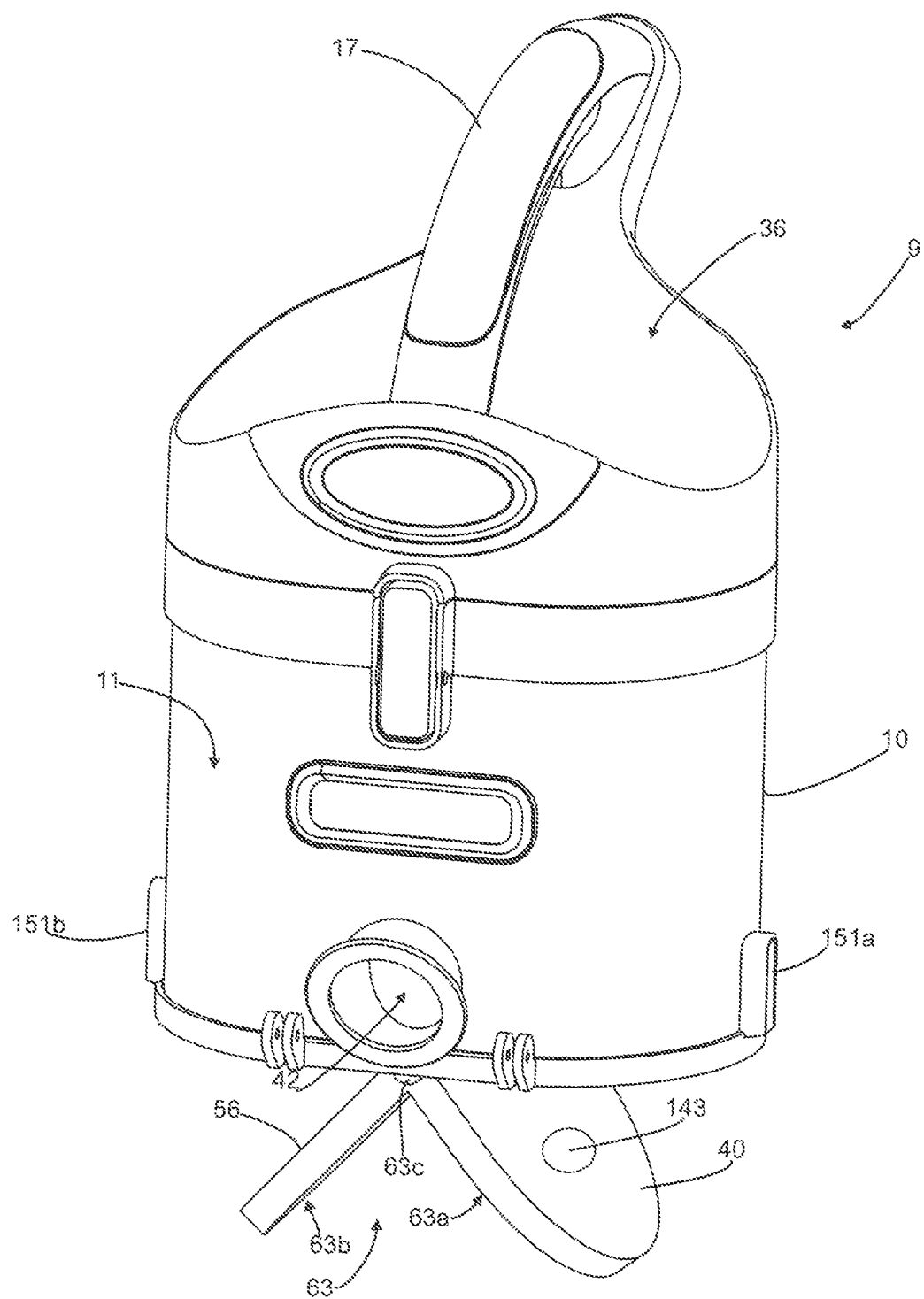
FIG. 14 is a front perspective view of another embodiment of a cyclone bin assembly.

For example, referring to FIG. 14 the cyclone bin assembly 9 can include a modified bottom door 63 that includes two separately openable portions 63a and 63b that are pivotally mounted about hinge 63c. Each door portion 63a, 63b can be held closed by a corresponding, releasable latch 151a and 151b (similar to latch 151 that holds the door 63 closed). In this configuration, the dirt chamber 11 can be emptied independently of the cyclone chamber 10 and dirt chamber 140.

It will also be appreciated that the pre-motor filter chamber 140 may be removable in combination with only one of the cyclone chamber 10 and/or dirt collection chamber 11, or independently from any other chamber.

Outwardly Biased Suction Hose

The following is a description of an outwardly biased suction hose and a suction hose chamber therefor, which may be used by itself or in any surface cleaning apparatus or in any combination or sub-combination with any other feature or features disclosed herein.

Referring to FIG. 1, when a user is grasping the handle 17 to drive and maneuver the surface cleaning head 3, the chassis portion 2 may be pulled along via hose 7. Typically, a hose is extensible and is biased to a contracted position. If the portion of the hose 7 extending between the handle 17 and the chassis portion 2 is elastic or otherwise extensible it may be difficult for a user to accurately control the movement of the chassis portion 2. For example, for a user to advance the chassis portion 2, the hose 7 would have to be stretched to its maximum length before a suitable pulling force would be transmitted to the chassis portion 2.

Alternatively, the hose may be configured as a compressible hose that is biased or sprung toward its extended configuration. The hose may include any type of suitable biasing member, such as a spring. The biasing member may be incorporated into the sidewall of the hose, or affixed to the interior or exterior surface of the hose. Accordingly, in its neutral state, the hose is extended and not contracted.

For storage and/or when the full length of the hose is not required for cleaning, the hose may be axially compressed into a retracted configuration (which may be at or close to its minimum length) within a suitable storage chamber, which may be part of a cord reel or part of a surface cleaning apparatus. The hose may be held in its compressed state within the storage chamber, which may help reduce the overall size of the surface cleaning apparatus. The hose may be held in place and compressed using any suitable securement mechanism.

When the surface cleaning apparatus is in use a desired length of hose may be metered out from the storage chamber by selectively releasing the securement mechanism and allowing the hose to spring or extend outward from the chamber due to its internal biasing member. When a desired length of hose is exposed, the user may re-engage the securement mechanism to contain the remainder of the hose within the storage chamber.

Preferably, the hose is not further extensible beyond its extended configuration. In this configuration, the exposed, uncompressed length of hose will not further stretch or extend when used to pull the chassis portion 2.

Figure 15:
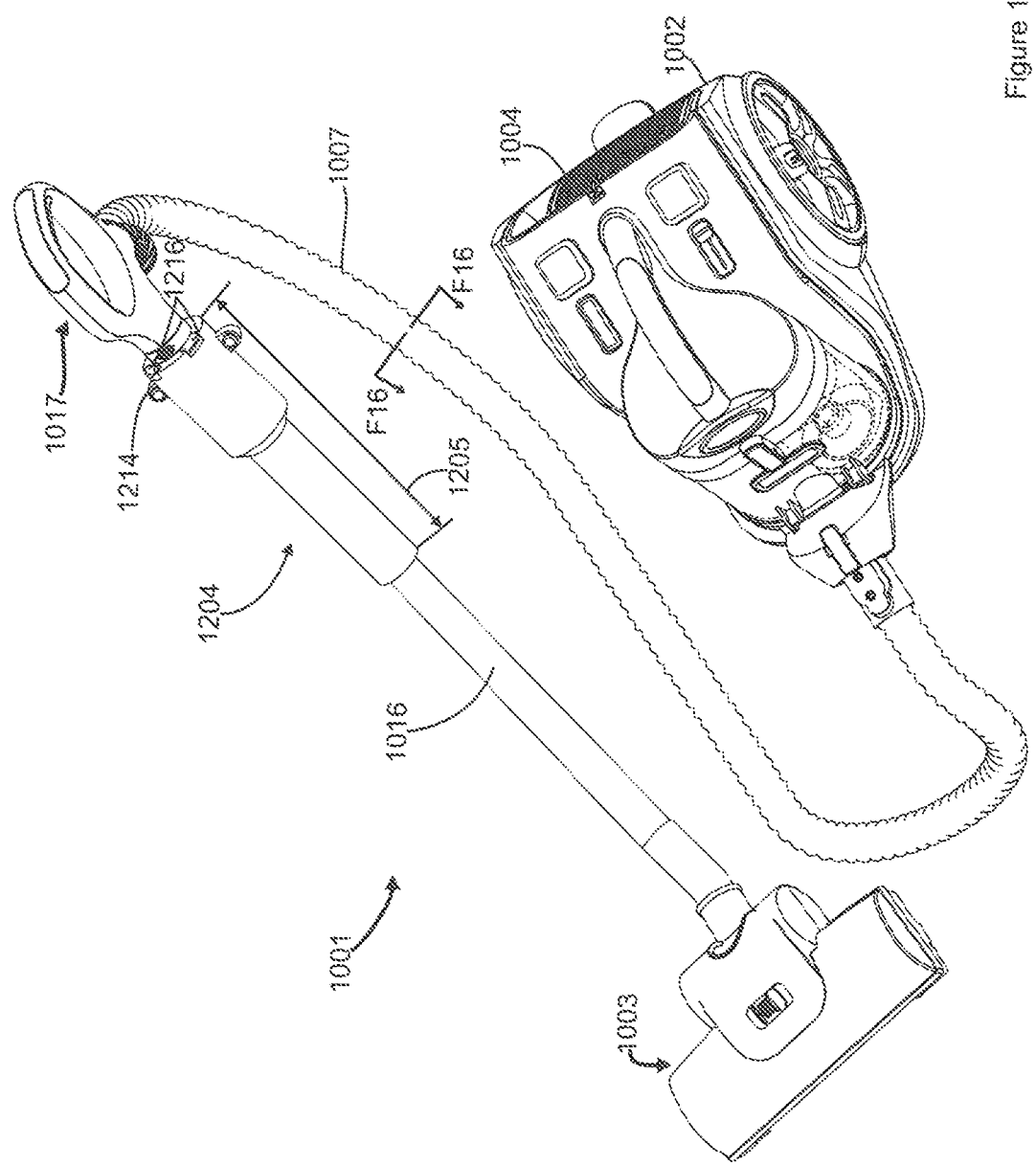
FIG. 15 is a perspective view of an alternate embodiment of a surface cleaning apparatus.

Referring to FIG. 15, another embodiment of a surface cleaning apparatus 1001 is shown. The surface cleaning apparatus 1001 is generally similar to apparatus 1, and analogous features are identified using like reference characters indexed by 1000.

Figure 16:
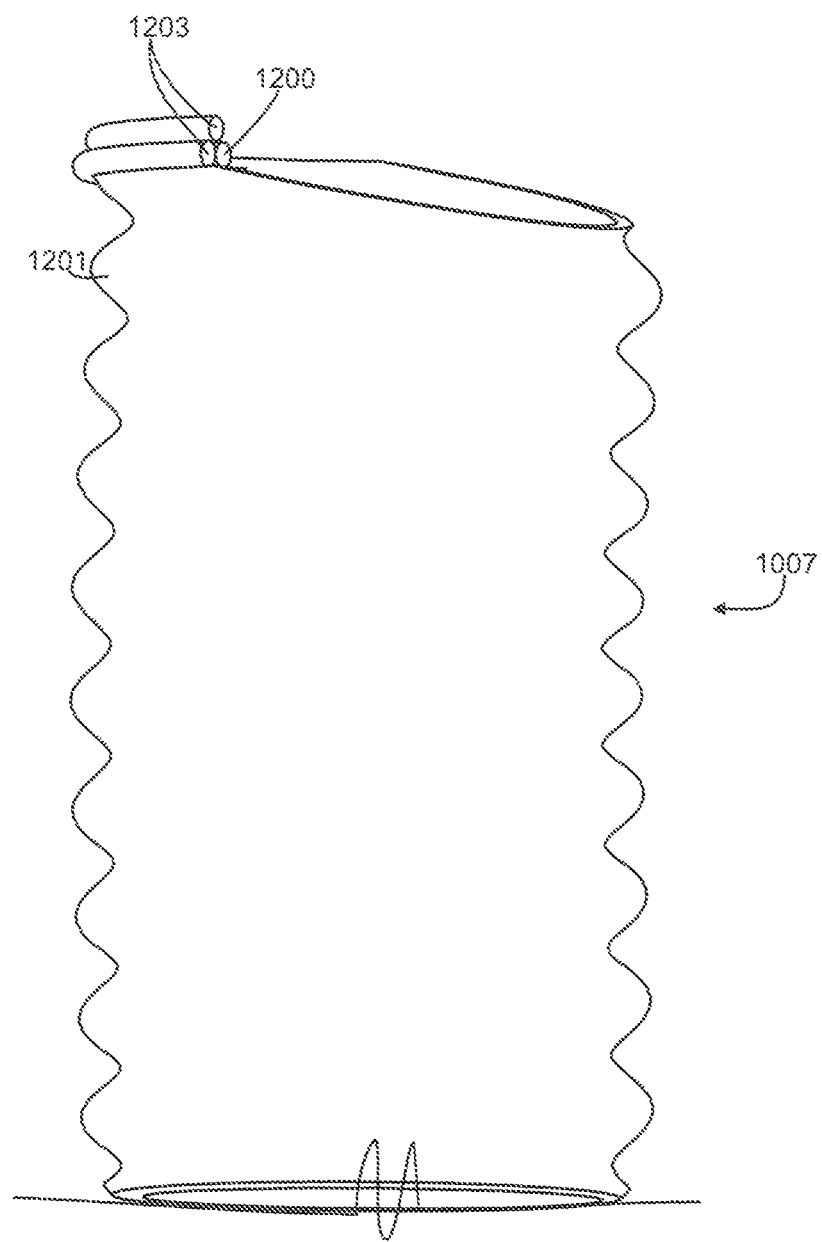
FIG. 16 is a cross sectional view taken along line F16-F16 in FIG. 15.

In this embodiment, the hose 1007 is a compressible hose that can be compressed from an extended length to a compressed or retracted length. Referring also to FIG. 16, the hose 1007 includes a biasing spring 1200 within the hose sidewall 1201 that is configured to bias the hose 1007 toward its extended length. The hose wall 1201 is preferably not otherwise extensible so that the hose 1007 generally cannot be stretched beyond its extended length. Optionally, in addition to a biasing spring 1200, the sidewall 1201 may also include one or more electrical conductors, e.g. wires 1203, to transmit electrical power and/or control signals from the surface cleaning unit 4 to the handle 17, and optionally downstream to the surface cleaning head 3 (for example to power a brush motor in the cleaning head 3).

In the illustrated embodiment, a hose storage chamber 1204 is provided as a portion of the up flow conduit 16, adjacent the handle 1017. The hose storage chamber is configured to contain the compressed portions of the suction hose 1007, and preferably has a length 1205 that is between about 50% and about 100% or more of the length of the hose 1007 in its fully compressed state, so that the chamber 1204 is sized to contain substantially all of the hose 1007 when it is compressed.

Figure 17:
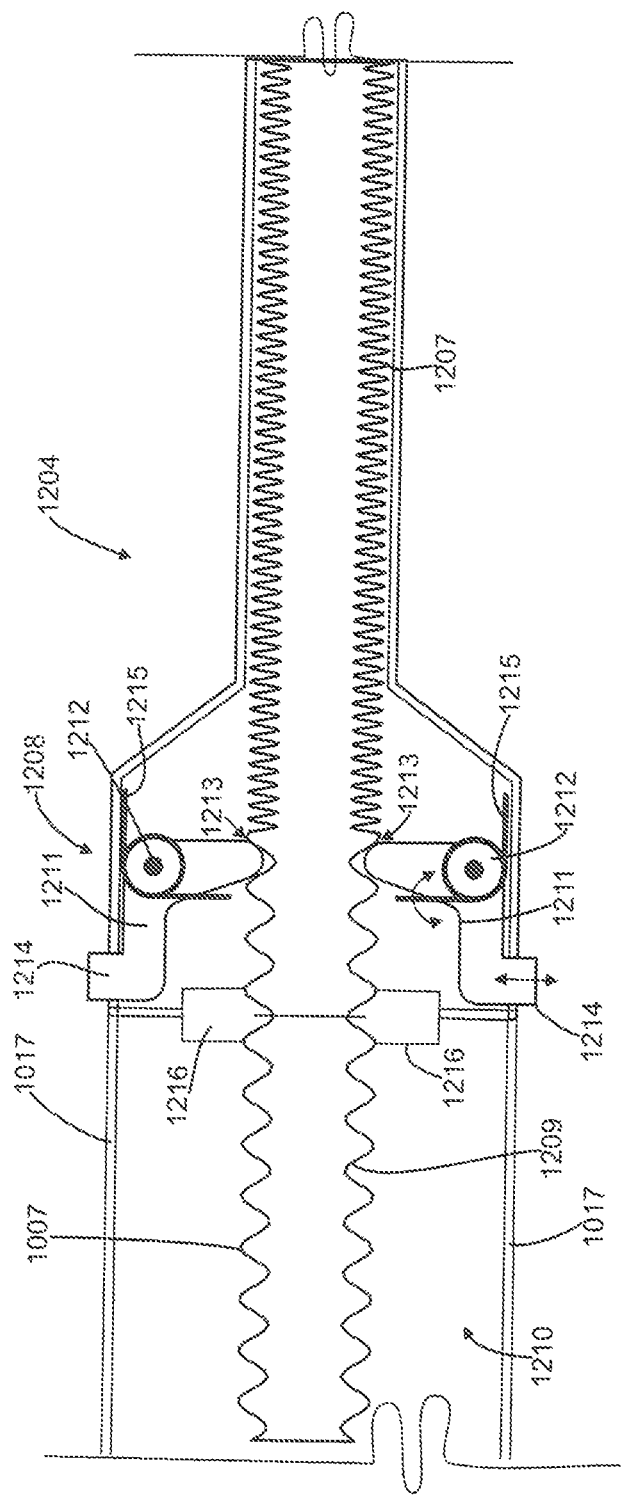
FIG. 17 is a schematic representation of an internal suction hose housing of the surface cleaning apparatus of FIG. 16.

Referring also to FIG. 17, a schematic representation of the hose storage chamber 1204 illustrates a compressed portion 1207 of the hose 1007 contained within the storage chamber 1204, upstream from the securement mechanism 1208 which holds the hose 1007 in its compressed state. An uncompressed or extended portion 1209 of the hose 1007 is located outboard or downstream from the securement mechanism 1208 and, in the example illustrated, extends through the hollow interior 1210 of handle 1017.

In the illustrated embodiment, the securement mechanism 1208 includes a pair of latch members 1211 that are pivotally mounted within the chamber 1204 at pivot joints 1212. Each latch member 1211 includes an engagement end 1213 that frictionally engages the outer surface of the hose 1007 to prevent relative axial movement between the engagement ends 1213 and the hose 1007. When the latches 1211 are in their engaged position (FIG. 17), the uncompressed portion 1210 of the hose 1007 is maintained at a fixed length.

To allow additional hose 1007 to be drawn from the storage chamber 1204, the latch members 1211 may be disengaged by a user. In the illustrated embodiment, each latch member 1211 includes a contact portion 1214 that can be engaged by the user. Squeezing or otherwise depressing the contact portions 1214 in the radial direction will cause the latch members 1211 to pivot about their respective pivot joints 1212 and will move the engagement ends 1213 out of contact with the outer surface of the hose 1007. This will allow the compressed portion 1207 of the hose 1007 to expand under its own biasing force, and to expand until the latch members 1211 are re-engaged, or until the hose 1007 reaches maximum length.

Preferably, the latch members 1211 are biased toward their engaged positions, for example by springs 1215 so that the latch members 1211 hold the hose 1007 in place until triggered by the user.

Optionally, the open end of the storage chamber 1204 can include one or more guide members to help guide or direct the hose 1007 as it expands outwardly. This may help prevent kinks or other damage to the hose. In the illustrated embodiment, the storage chamber 1204 includes guide members in the form of rollers 1216 positioned toward the end of the chamber 1204, and outside the latch members 1211. The rollers 1216 may rollingly contact the hose 1007 as it expands and may help prevent the hose 1007 from being curved or bent too tightly or from otherwise becoming snagged to caught within the chamber 1204.

Optionally, the rollers 1216 may be dampened or otherwise configured so that they provide a desired degree of rolling resistance when the hose 1007 is expanding. Providing resistance with the rollers 1216 may absorb some of the expansion force of the spring 1200, and may help control the speed at which the hose 1007 expands from within the storage chamber 1204. This may help prevent the hose 1007 from expanding more than desired or from otherwise overwhelming the user when the latches 1211 are disengaged. While illustrated as standalone rollers 1216, the rollers 1216 may be connected to any suitable drive apparatus (such as an electric motor) to further control the expansion of the hose 1007.

When a user is finished with a given cleaning task, it may be desirable to re-compress the hose 1007 into the storage chamber 1204. In the illustrated embodiment, the latches 1211 are configured as one-way latches so that when the hose 1007 is pushed inwardly (for example by the user) the latches 1211 will automatically pivot or ratchet to allow the hose 1007 to move freely inwardly (without needing to depress the contact portions 1214), but will resist expansion of the hose 1007. Alternatively, instead of manually inserting the hose 1007, the hose storage chamber 1204 may include an automated hose compression system. For example, in the illustrated embodiment the rollers 1216 may be powered and may be operable to drive the hose 1007 into the storage chamber 1204. Alternately, rollers 1216 may be electrically driven and used without latch members 1211 or the like.

Optionally, instead of being provided on the up flow duct, the hose storage chamber may be provided in the body of a surface cleaning apparatus, e.g., in a canister or base portion of the surface cleaning apparatus. Providing the hose storage chamber in the canister may position most of the weight of the hose within the canister (which rolls along the ground during normal use) and may therefore help reduce the amount of weight that is carried directly by the user holding the handle 17. In the illustrated example such a hose storage chamber could be provided on the chassis portion 2 and/or the surface cleaning unit 4.

Figure 18:
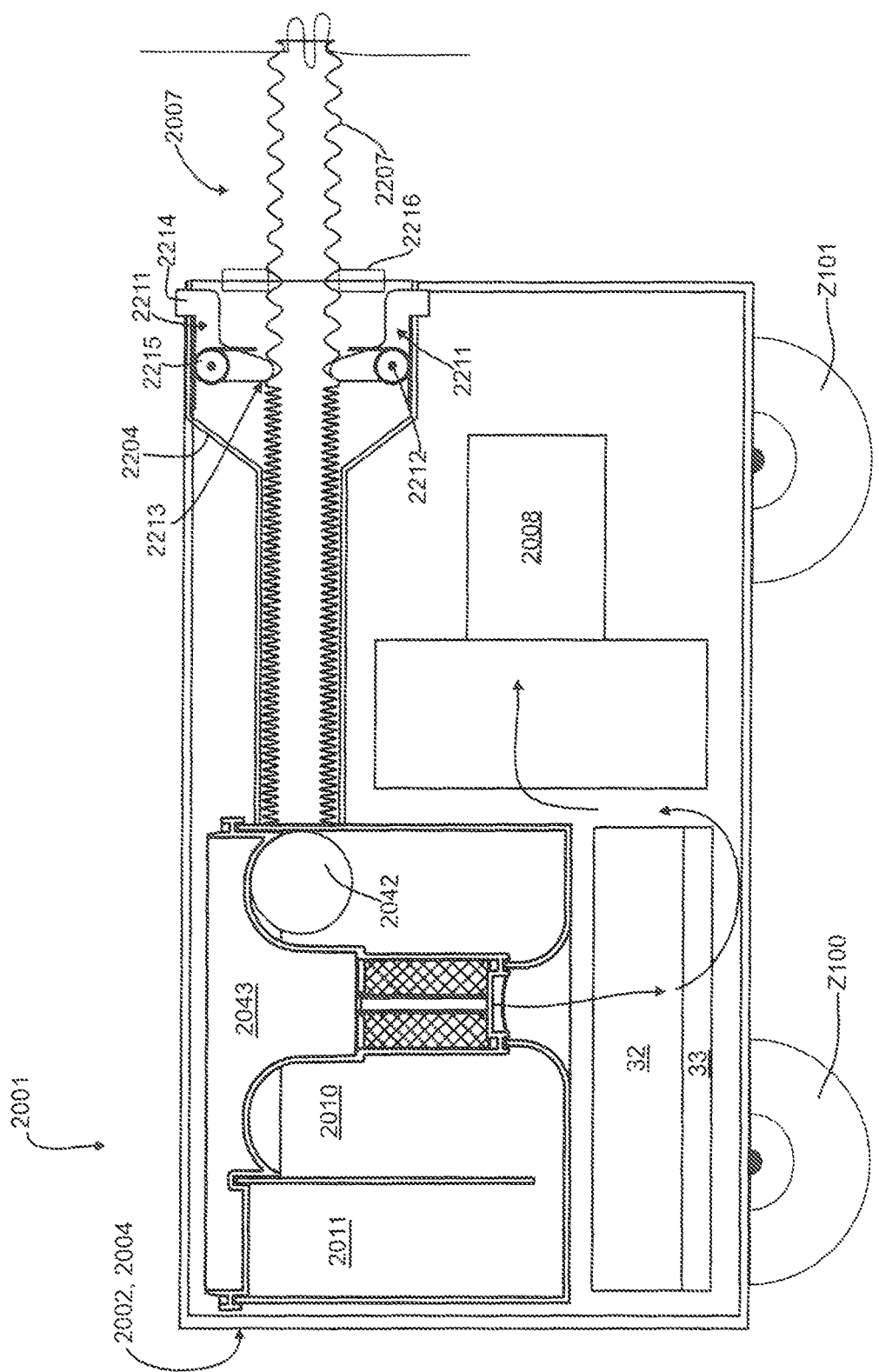
FIG. 18 is a schematic representation of another embodiment of a surface cleaning apparatus with an internal suction hose housing.

Referring to FIG. 18, a schematic example of a canister style vacuum cleaner 2001 is shown. The surface cleaning apparatus 2001 is generally similar to the apparatus 1, and analogous features are identified using like reference characters indexed by 2000. In this embodiment, the surface cleaning unit 2004 is integral with the chassis portion 2002 to form the canister portion, and the hose storage chamber 2204 is provided within the canister portion.

Figure 19:
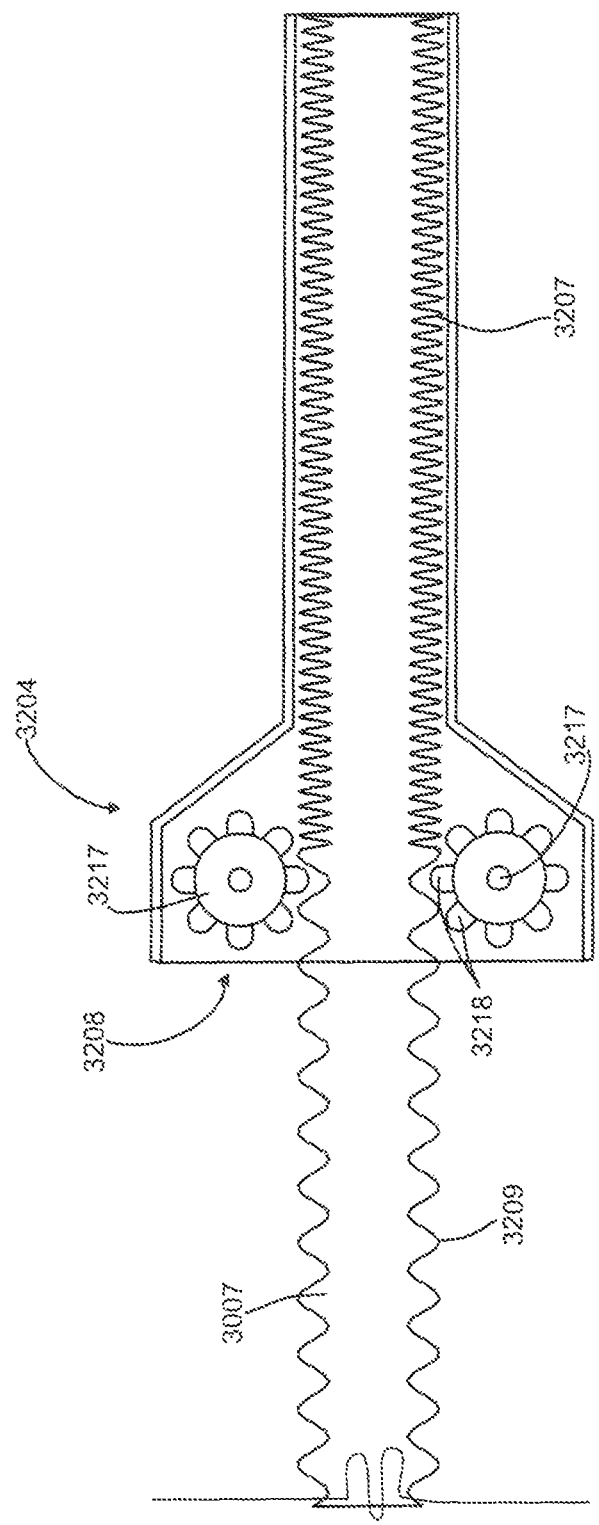
FIG. 19 is a schematic representation of another embodiment of an internal suction hose housing of a surface cleaning apparatus.

Referring to FIG. 19, a schematic representation of an alternate embodiment of a hose storage chamber 3204 is shown. The hose storage chamber 3204 is generally similar to hose storage chamber 1204, and analogous features are identified using like reference characters indexed by 2000. In this embodiment, the securement mechanism 3208 includes rollers 3217 instead of latches. The rollers 3217 each include engagement projections 3218 for contacting and securing the hose 3007. The rollers 3217 are preferably driven using any suitable driving mechanism (e.g. an electric motor and/or a spring that may be manually wound) and can be used to drive the hose 3007 into the storage chamber 3204 for storage. Optionally, the rollers 3217 need not be configured to drive the hose 3007 outward, and instead may simply be unlocked and allowed to rotate with the hose 3007 as it expands under its own biasing force. Preferably, the rollers 3217 can be locked in place in order to hold the hose 3007 in a fixed position.

Surface Cleaning Unit with Onboard Energy Storage Device

The following is a description of an portable surface cleaning unit with an on board energy storage member and alternate configurations of a base, which may be used by itself or in any surface cleaning apparatus or in any combination or sub-combination with any other feature or features disclosed herein.

Referring to FIG. 1, in the illustrated embodiment, the suction motor 8 is provided within the surface cleaning unit 8. The electrical power cord 80 is, in this embodiment, connected to the surface cleaning unit 4 and remains connected when the surface cleaning unit 4 is separated from the chassis 2 (FIG. 5) to supply power to the surface cleaning unit 4. In a first alternate embodiment, power cord 80 may be connected to the chassis portion 2 instead of directly to the surface cleaning unit 4. In this first alternate configuration, the surface cleaning unit 4 may be electrically coupled to the chassis portion 2 when mounted on chassis portion 2.

According to this embodiment, surface cleaning unit 4 includes at least one on board power supply or power storage device, which may comprise, for example, one or more of a battery, fuel cell and external combustion engine. In such configurations, the surface cleaning module may be powered by AC power when docked, and powered by the on board power storage device when detached from the chassis portion. The suction motor may be configured to run on AC power when the surface cleaning unit 4 is mounted on the chassis. If the on board power supply provides DC power (such as a battery) the suction motor may also be operable to run on DC power when the surface cleaning unit is detached (for example, the suction motor may have dual windings).

Optionally, the chassis portion or the surface cleaning unit 4 may include an electrical system for converting AC power to DC power (including, for example, a rectifier, inverter, transformer and other suitable equipment) so that the suction motor in the surface cleaning unit may run on DC power when detached and when docked. This may allow a single motor configuration to be used. Alternatively, the suction motor may be selected so that it is directly compatible with AC and DC power sources, such that a converter on the chassis portion to feed DC power to the surface cleaning unit is not needed.

Preferably, the on board power storage device in the surface cleaning unit can be recharged, and more preferably can be recharged when the surface cleaning unit is docked on the chassis portion. Optionally, the chassis portion can be configured to charge the surface cleaning unit while the suction motor is running (while the apparatus is in use), and/or while the suction motor is off (the apparatus is in storage).

In a second alternate embodiment, a different power cord 80 may be connected to the chassis portion 2 in addition to the power cord connected to the cleaning unit 4. In a third alternate embodiment, power cord 80 may be selectively connectable to the chassis portion 2 and the surface cleaning unit 4. In this third alternate configuration, the surface cleaning unit 4 may be electrically coupled to the chassis portion 2 when mounted on chassis portion 2 and power cord 80 is connected to chassis 2 or power cord 80 may be directly connected to the surface cleaning unit 4 and directly power the surface cleaning unit 4.

Figure 20:
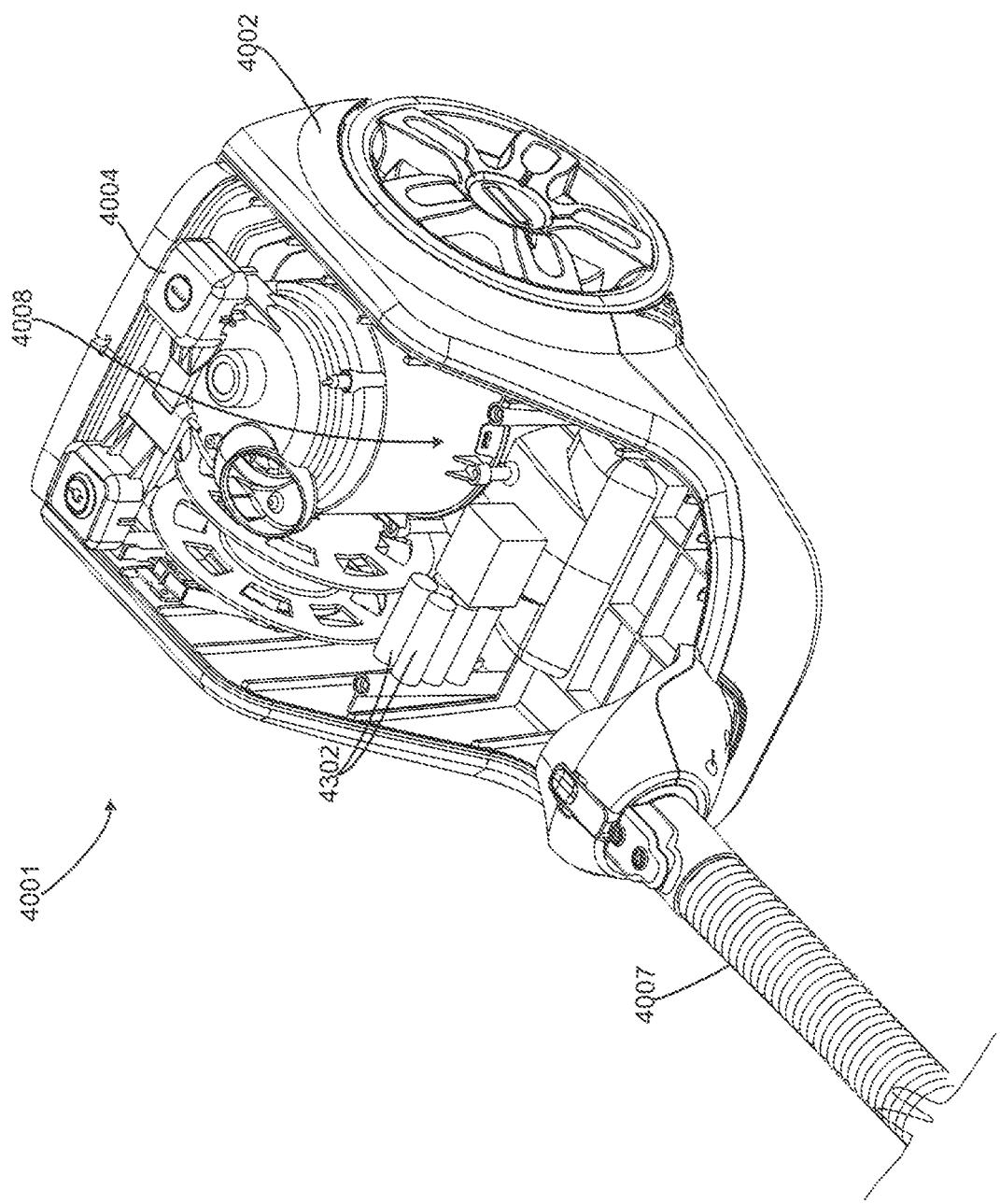
FIG. 20 is a perspective view of another embodiment of a surface cleaning apparatus.

Referring to FIG. 20, another embodiment of a surface cleaning apparatus 4001 and surface cleaning unit 4004 are shown. The surface cleaning unit 4004 is shown with its upper cover cut-away and cyclone bin assembly removed. The surface cleaning unit 4001 is generally similar to surface cleaning unit 1, and analogous features are illustrated using like reference characters indexed by 4000.

Referring to FIG. 21, in this embodiment, the electrical power cord 4008 is connected to the chassis portion 4002, instead of the surface cleaning unit 4004. To provide electrical communication, the chassis portion 4002 includes an electrical connector 4300 (preferably a female socket as exemplified) and the surface cleaning unit 4004 includes a mating electrical connector 4301 (e.g., male prongs in the illustrated example) that is mated with the connector 4300 when the surface cleaning unit 4004 is docked on the chassis portion 4002.

To power the surface cleaning unit 4004 when it is detached, in this embodiment the surface cleaning unit 4004 includes an on board power storage device in the form of batteries 4302 (FIG. 20), which are electrically connected to suction motor 4008. When the surface cleaning unit 4004 is detached from its chassis portion 4002 the suction motor 4008 is powered by the batteries 4302.

In the illustrated example, the suction motor 4008 is a DC motor, and the surface cleaning unit includes an on board converter module 4303 for converting AC power from the cord 4080 into DC power suitable for the motor 4008. Preferably, the batteries 4302 can be rechargeable batteries, and when the surface cleaning unit 4004 is docked, AC power from the wall may be used to charge the batteries 4302. The converter module 4303 is also configured to allow the batteries 4302 to be charged when the surface cleaning unit 4004 is connected to AC power. The converter module 4303 may include any suitable combination of components, including, for example, an inverter, a transformer and a rectifier.

Alternate Power Modes

The following is a description of a portable surface cleaning unit with alternate power modes, which may be used by itself or in any surface cleaning apparatus or in any combination or sub-combination with any other feature or features disclosed herein.

Figure 22:
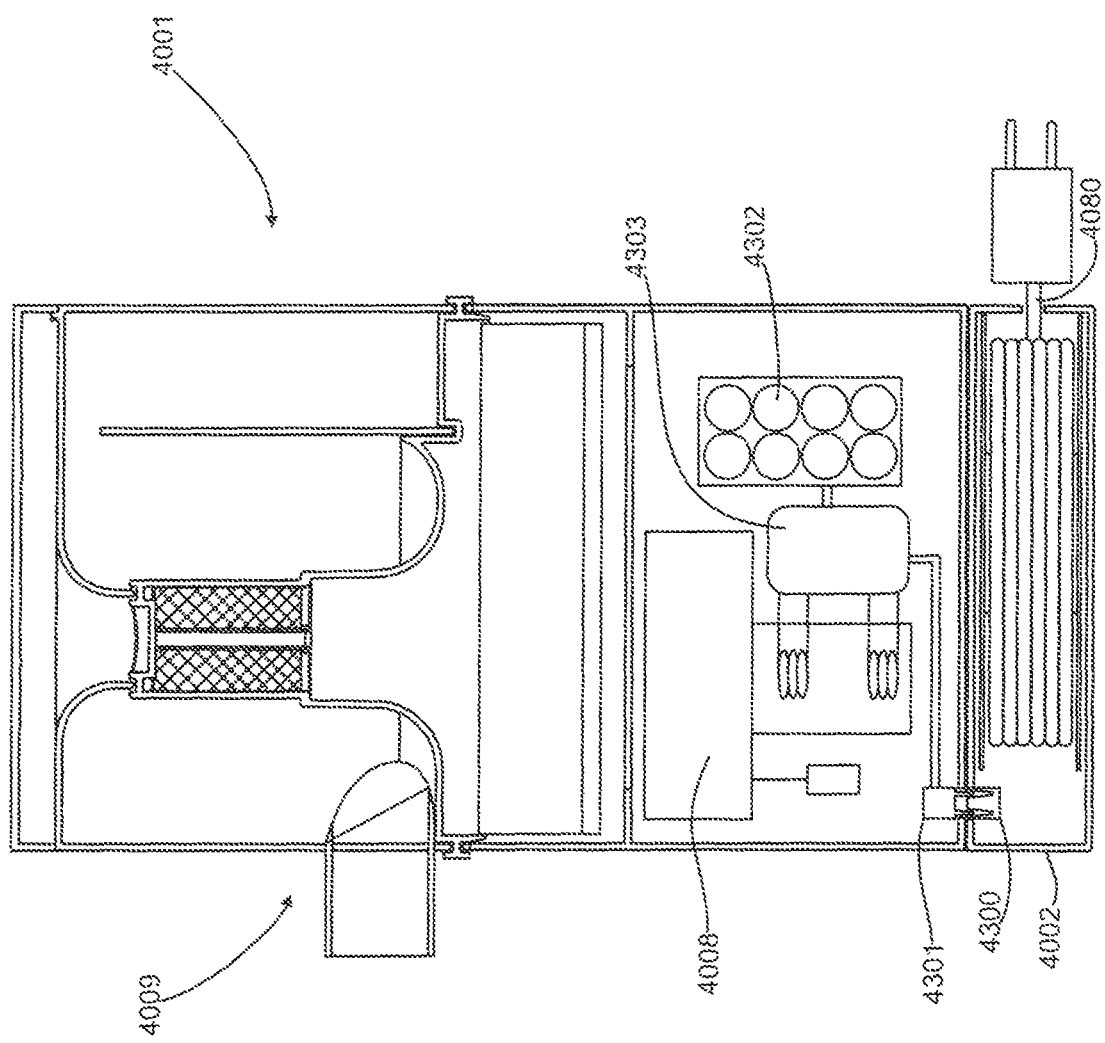
FIG. 22 is a schematic representation of the surface cleaning apparatus of FIG. 20.

Referring to FIG. 22, a schematic representation of the surface cleaning apparatus 4001 is shown. Optionally, a controller 4450 can be provided to alter the operation of the suction motor 4008 based on its power supply. For example, when the controller senses that the surface cleaning unit 4008 is being powered by an external power supply (e.g., AC power via cord 4080) the suction motor 4008 can be operated at a relatively high power or "full power" mode. Alternatively, when the surface cleaning unit 4004 is being powered by the on board power storage member (e.g. batteries and is being run on DC current), the controller may operate the motor 4008 at a relatively lower power level. Operating at a lower power level may help prolong the amount of cleaning time that can be obtained using the on board batteries.

Figure 23:
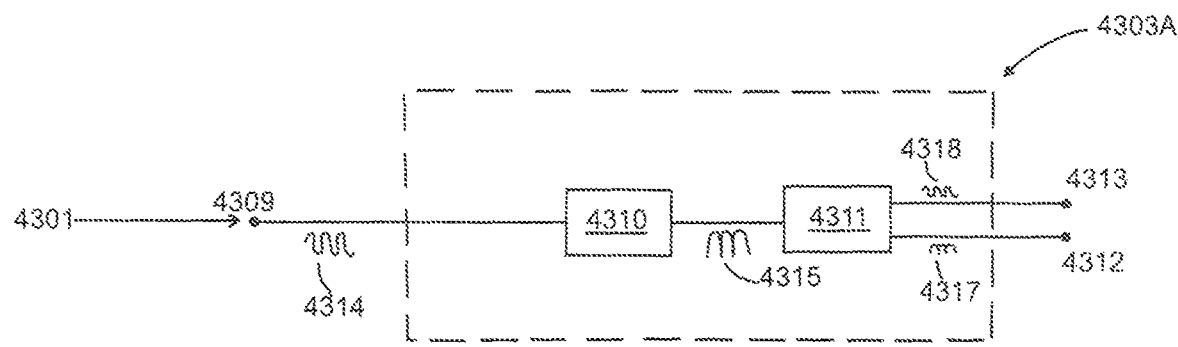
FIG. 23 is a block diagram of an embodiment of a converter module.
Figure 24:
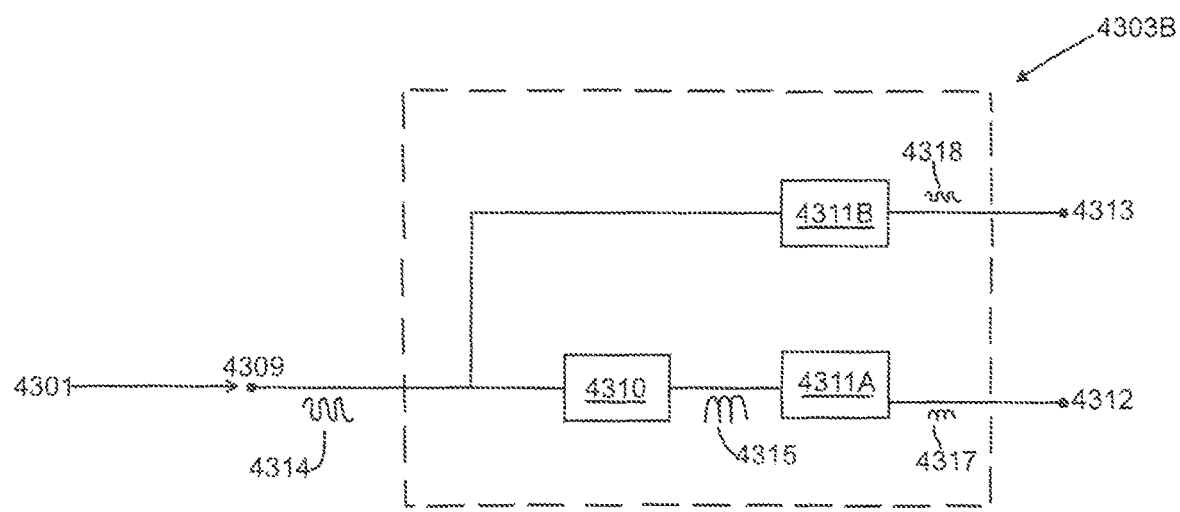
FIG. 24 is a block diagram of another embodiment of a converter module.

FIGS. 23 and 24 illustrate example embodiments of a converter module 4303. Generally, converter module 4303 operates to convert AC signals to DC signals. The converter module 4303 may also transform an input power signal to a signal suitable for the operation of the surface cleaning apparatus 4001. It will be understood that converter module 4303 may be provided in one or more different configurations.

In FIG. 23, converter module 4303A includes an input terminal 4309, a rectifier block 4310, a transformer block 4311 and output terminals 4312, 4313. The input terminal 4309 receives an input AC signal 4314 from the mating electrical connector 4301 and provides the input AC signal 4314 to the rectifier block 4310 and the transformer block 4311. The rectifier block 4310 may include one or more electrical components for converting the input AC signal 4314 to a rectified signal 4315. For example, the rectifier block 4310 can include one or more diodes in various configurations as known in the art. The rectifier block 4310 provides the rectified signal 4315 to the transformer block 4311.

In some embodiments, the rectifier block 4310 can also include a filter or a regulator for stabilizing a version of the rectified signal 4315 prior to generating and providing the rectified signal 4315 to the transformer block 4311.

The transformer block 4311 may include one or more electrical components for varying the rectified signal 4315 to a signal suitable for the operation of the surface cleaning apparatus 4001. For example, the input power signal 4314 received at the input terminal 4309 may be from the wall outlet and therefore, the value of the input power signal 4314 may need to be lowered. As illustrated in FIG. 23, the transformer block 4311 is coupled to the two output terminals 4312, 4313. The transformer block 4311 generates an output DC signal 4317 and an output AC signal 4318, and then provides the output DC signal 4317 to the output terminal 4312 and the output AC signal 4318 to the output terminal 4313.

As described above, the motor 4008 may be a motor that operates on AC power or DC power. When the motor 4008 operates on AC power, the motor 4008 can receive power via the output terminal 4313. Alternatively, when the motor 4008 operates on DC power, the motor 4008 can receive power via the output terminal 4312. The batteries 4302 may also be charged via the output terminal 4312. For example, the batteries 4302 may be charged via the output terminal 4312 while the surface cleaning apparatus 4001 is docked on the surface cleaning unit 4. The batteries 4302 may be charged while the surface cleaning apparatus 4001 is in use or when the surface cleaning apparatus 4001 is not in use.

In some embodiments, the converter module 4303 can include only one output terminal, such as the output terminal 4312. Transformer block 4311 can therefore generate and provide only one output signal, such as the output DC signal 4317, to the output terminal 4312.

FIG. 24 illustrates a converter module 4303B. The transformer block 4311 may be provided as two separate transformer blocks 4311A, 4311B. Similar to the transformer block 4311 of FIG. 24, the transformer block 4311A receives the rectified signal 4315 from the rectifier block 4310. However, unlike the transformer block 4311 of FIG. 24, the transformer block 4311A generates only the output DC signal 4317, which is then provided to the output terminal 4312. The transformer block 4311B receives the input AC signal 4314 from the input terminal 4309 in order to generate the output AC signal 4318.

It will be understood that the rectifier block 4310 and the transformer block 4311 may be provided in a different order than as illustrated in converter modules 4303A, 4303B. For example, the transformer block 4311 may receive the input AC signal 4314 to generate a transformed signal which is either provided to the rectifier block 4310 for processing and/or directly to the output terminal 4313.

Electrical Cord Reel

The following is a description of an electrical cord reel, which may be used by itself or in any surface cleaning apparatus or in any combination or sub-combination with any other feature or features disclosed herein.

When the surface cleaning apparatus is not in use, it may be desirable to wind the electrical cord for storage. Optionally, a cord reel can be provided to wind and hold the cord 80. The cord reel may be of any suitable configuration and may be a manually actuated reel (for example via a hand crank) or an automated reel. If the reel is automated (i.e. can wind the cord without manual user intervention), it may be driven by any suitable mechanism including, for example, a spring, a biasing mechanism and/or a motor. The motor used may be an electric motor that can be operated at a speed that is suitable for winding the cord. If the motor is electric, preferably the cord reel is provided with a power source (either on board or as part of the surface cleaning apparatus) so that the cord reel motor can be powered even after the electrical cord has been unplugged.

Figure 25:
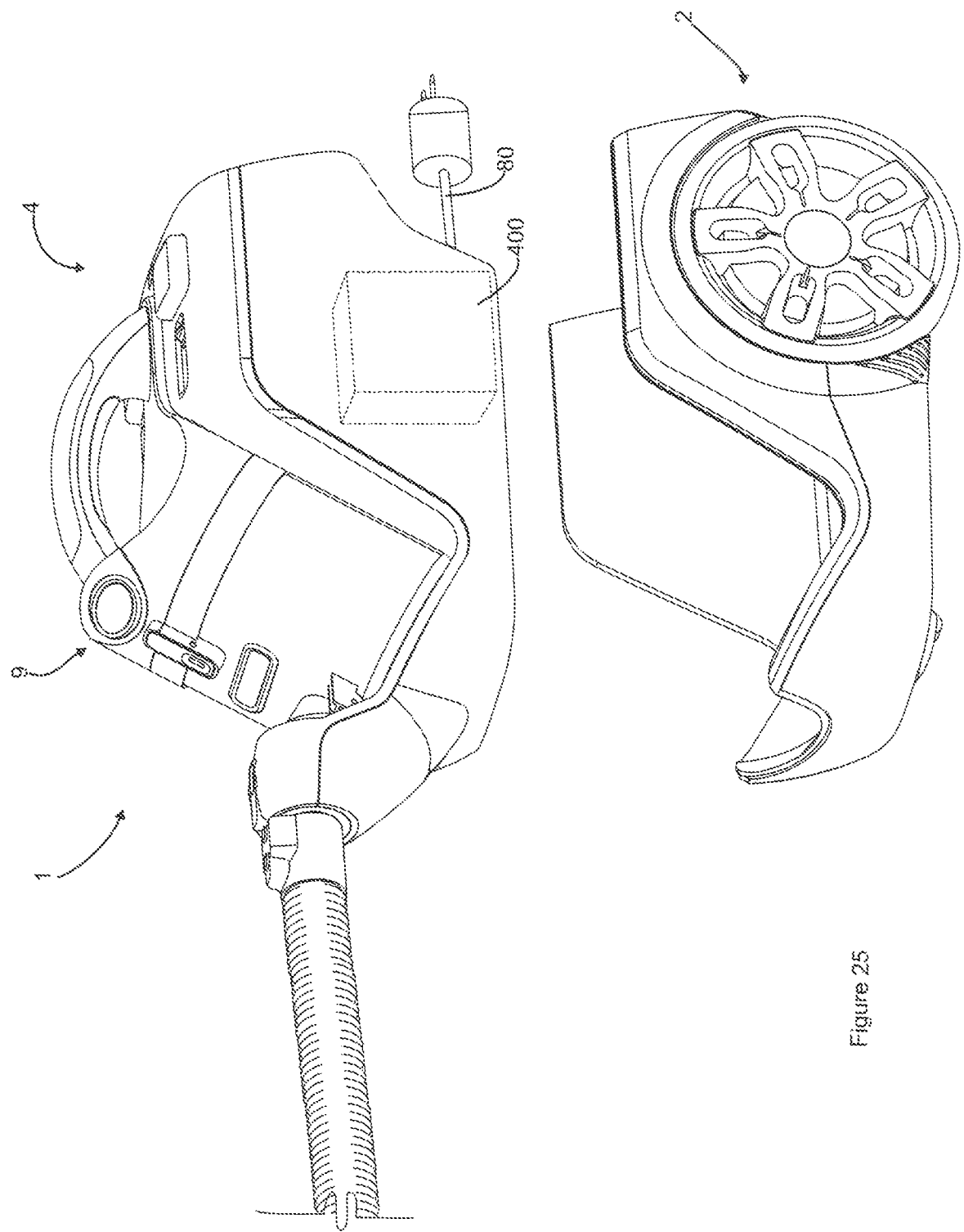
FIG. 25 is a perspective view of the surface cleaning apparatus of FIG. 1.
Figure 26A:
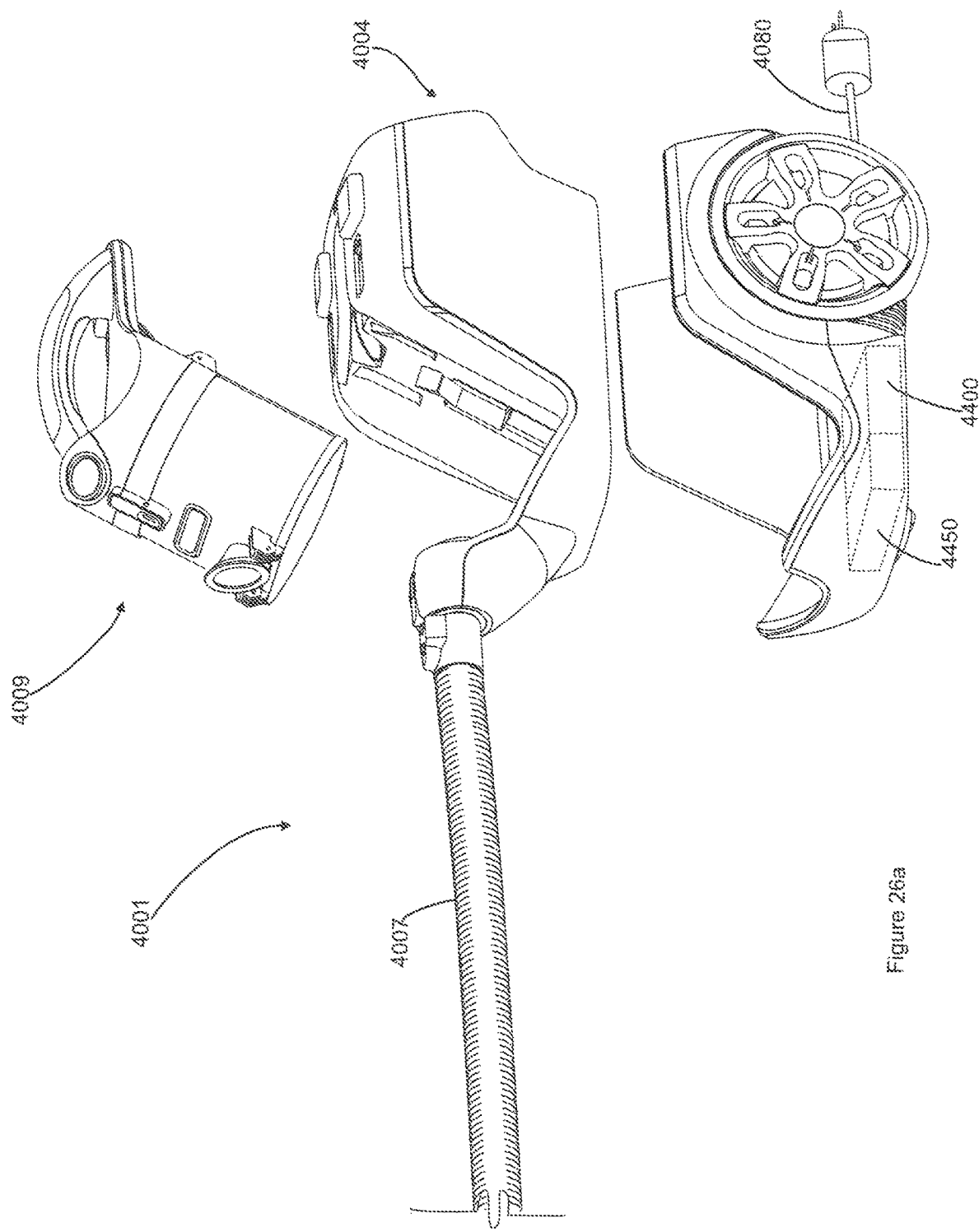
FIG. 26a is a partially exploded perspective view of the surface cleaning apparatus of FIG. 20.

Optionally, the cord reel, and associated power sources, controllers, switches, etc. can be internal (i.e. inside one portion of the surface cleaning apparatus) or external to the surface cleaning apparatus. For example, referring to FIG. 25, if the electrical cord 80 is connected to the surface cleaning unit 4, any suitable cord reel (illustrated schematically as box 400) may be provided inside the surface cleaning unit 4. Alternatively, referring to FIG. 26a, if the electrical cord 4080 is attached to the chassis portion 4002, a cord reel 4400 can be provided in the chassis portion 4002.

Figure 26B:
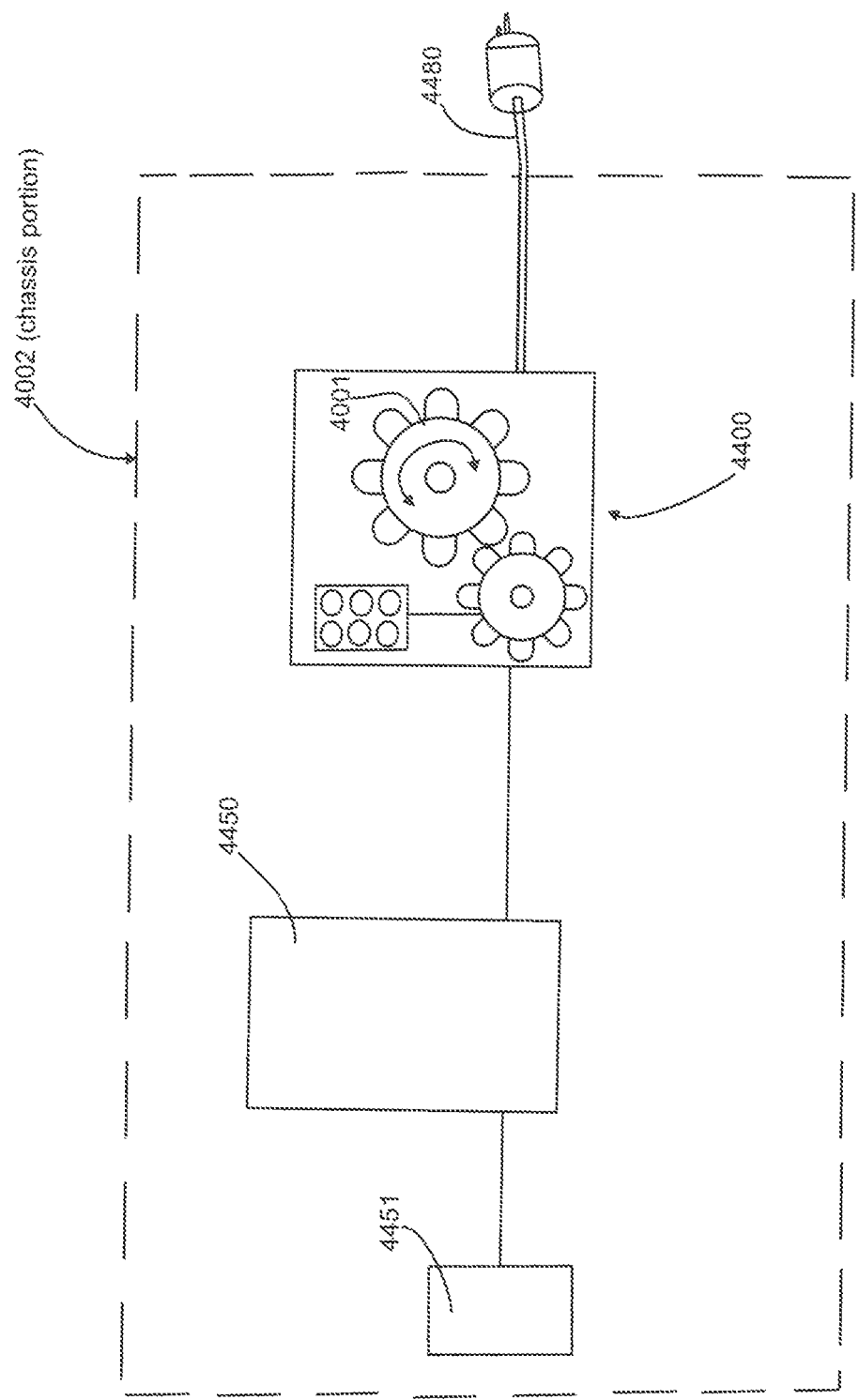
FIG. 26b is a schematic diagram of a cord reel control system.

In one embodiment, cord reel 4400, may be configured to automatically wind or unwind the cord based on at least one operating condition of the surface cleaning apparatus. For example, the surface cleaning apparatus may include a controller 4450 that is capable of sensing or detecting an operating condition of the surface cleaning apparatus 4001 and then control the cord reel based on the operating condition. Such a cord reel may optionally, but need not, include any of the other features of a cord reel disclosed herein For example, referring to FIG. 26b, a schematic representation of a cord reel 4400 and a control system therefor is illustrated. While a schematic is illustrated, the control system may be of any suitable configuration. In the illustrated embodiment, the control system includes the controller 4450 (e.g. a PLC, microprocessor or onboard computer) that is communicably linked to the cord reel module 4400. In this configuration, the cord reel 4400 includes a motor 4424 to drive the reel 4401 and an on board power supply in the form of batteries 4423 to power the motor 4424. The controller 4450 is connected to control the operation of the motor 4424.

One or more suitable sensors can be provided on the surface cleaning apparatus and connected to the controller 4450. In the illustrated example, the control system includes a position sensor 4451 connected to the controller. The position sensor 4451 can be any suitable type of sensor that can detect the rate and direction of movement of the chassis portion 4002. For example, the sensor 4451 can be an encoder that can measure the speed and direction of rotation of the wheels 100, or may be an optical sensor that can determine movement by visually tracking the surface under the chassis portion 2 or the rotation of a wheel of the chassis, or any other suitable sensor. In one embodiment, the controller can be configured to determine when the vacuum cleaner is moving forward and to unwind cord 80 from the reel 4401 at a given rate based on the speed of the movement. Alternately or in addition, the controller may be configured to wind cord 80 onto the reel 4401 when the chassis portion 4002 is moved backward. Alternatively, the sensor 4451 may be a receiver (e.g. a radio receiver) configured to receive external data, for example from a transmitter positioned adjacent the wall. Using this signal, the controller may be able to determine the position of the chassis portion 4002 relative to the transmitter and to unwind cord as the chassis portion 4002 moves farther from the transmitter and to wind the cord 80 as the chassis portion 4002 moves closer to the transmitter. Such a system may also be used in combination with a cord reel 400 that is provided in the carryable surface cleaning unit 4, which may not have wheels or be in visual proximity to the ground.

An analogous control system, and or controller, may be included in other portions of the surface cleaning apparatus, including, for example, in the surface cleaning unit 4 or 4004, and optionally in the body or control/drive module of an external cord reel.

In another embodiment, the cord reel may be a separate unit (i.e., it may not be incorporated into the surface cleaning unit 4 or chassis) and may have an on board energy storage member (e.g., one or more batteries). Preferably, the batteries are charged when the cord reel is plugged into the wall. The cord reel may have a first short cord that is configured to plug into a household electrical outlet and a second longer cord that is configured to be plugged into the surface cleaning apparatus. Such a cord reel may optionally, but need not, include any of the other features of a cord reel disclosed herein.

Figure 26C:
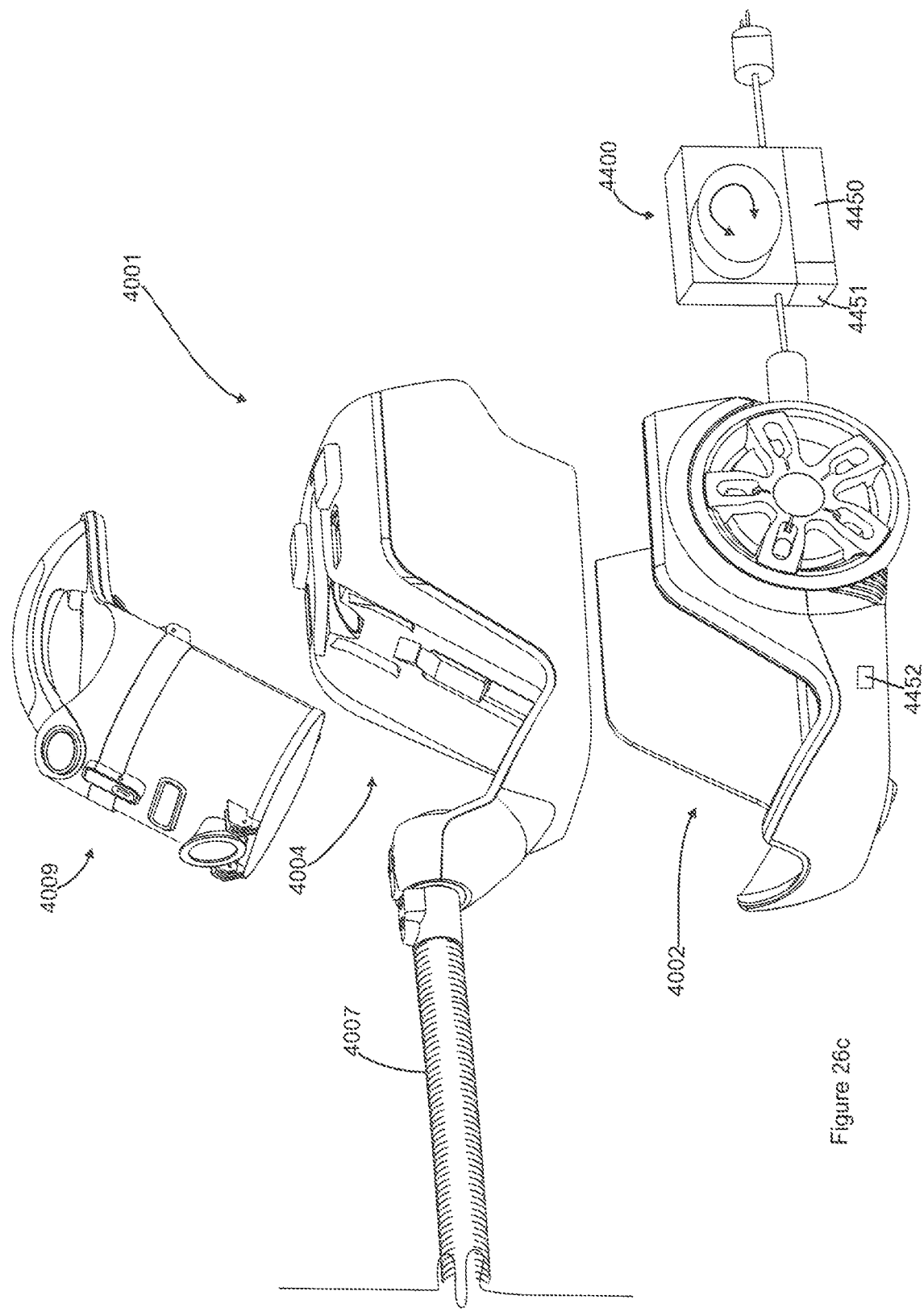
FIG. 26c is a partially exploded perspective view of the surface cleaning apparatus of FIG. 20 including a cord reel.

For example, referring to FIG. 26*c*, the cord reel 4400 may be separable from the chassis portion 4002 and may be configured as an external cord reel. In this configuration, the cord reel 4400 may be separated from the chassis portion 4002 and rested on the ground, for example adjacent a power socket. The cord 4080 can then be unwound from the reel 4400 as required to allow the chassis portion 4002 to be moved away from the wall socket. This may reduce the weight of the chassis portion 4002. In this embodiment, the controller 4450 may be located within the external cord reel, instead of within the surface cleaning unit 4004 or chassis portion 4002. Optionally, the sensor 4451 can be a radio receiver and the chassis portion 4002 can include a corresponding transmitter 4452 to allow the controller 4450 to determine the distance of the chassis portion 4002 from the cord reel 4400, and to unwind and/or wind cord 80 as required.

Figure 26D:
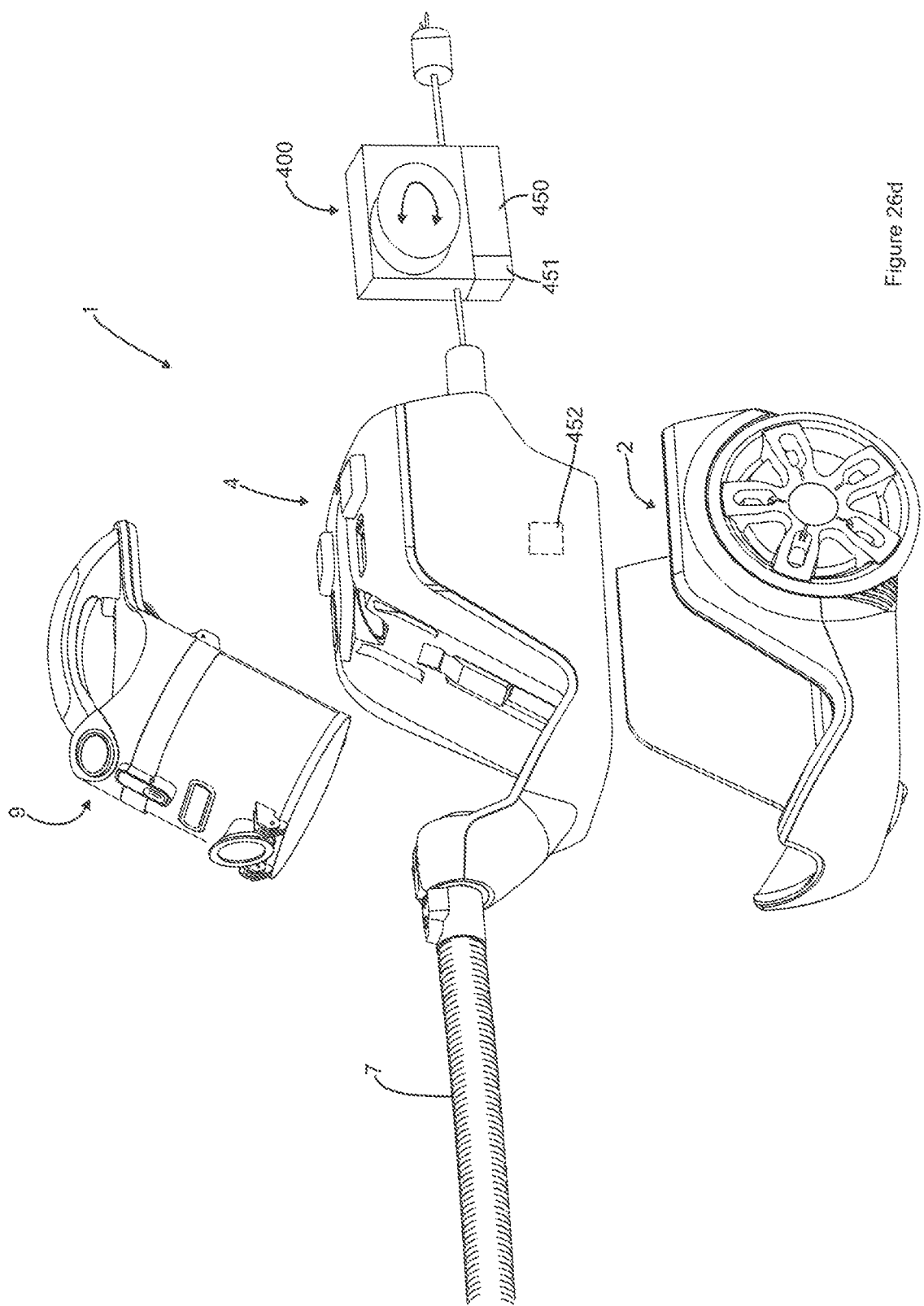
FIG. 26d is a partially exploded perspective view of an alternate embodiment of the surface cleaning apparatus of FIG. 20 including a cord reel.

Referring to FIG. 26*d*, an analogous system can be used if an external cord reel module 400 is connected to the surface cleaning unit 400, instead of the chassis portion 2.

In the illustrated example, the cord reel 400 may be a spring-powered cord reel that can wind the cord using potential energy stored in a spring. To activate the cord reel, a user can press the cord reel button 81 on the surface cleaning unit 4 to retract the cord 80. Alternatively, if the cord reel 400 were electrically driven, batteries could be provided within the surface cleaning unit 4 (for example, similar to the batteries 4302) to power the cord reel.

In another embodiment, the cord reel may be configured as a dual-wind cord reel, in which the reel is positioned between the ends of the cord and winds the cord in two directions simultaneously (e.g. one revolution of the reel winds two lengths of cord). Such a cord reel may optionally, but need not, include any of the other features of a cord reel disclosed herein Optionally, the dual-wind cord reel may be configured so that it connects to the cord without interrupting or forming part of the electrical connection between the ends of the cord. In this configuration, the cord reel need not include any type of rotatable or pivotal electrical connections, or any electrical connections at all, and may be referred to as a sealed or brushless cord reed. In this configuration, the integrity of the electrical insulation of the cord remains intact, which may be desirable if used in wet or other hazardous locations.

Referring to FIG. 27, an embodiment of a cord reel 401 that is suitable for use with surface cleaning apparatus 1, 4001 and/or other surface cleaning apparatuses is shown. The cord reel 401 includes a body 402 that rotatably supports a reel member 403. The reel includes an inner sidewall 403 that is rotatable about a reel axis 404. A central spindle member 405 projects axially from the reel member 403 and rotates with the inner sidewall 403. A handle 406 is provided toward the top of the body 402 to allow a user to grasp and/or carry the cord reel 401 when it is separated from the surface cleaning apparatus.

In the illustrated embodiment, the cord reel 401 is configured to be attached to a portion of the cord 80 that is intermediate its two ends and preferably proximate the center of the power cord and, more preferably, the reel 401 is connected to the middle of the cord 80. Connecting to the middle of the cord 80 may help ensure that the cord 80 winds generally evenly around the spindle 405. Optionally, to help retain the cord on the spindle 405 the reel 401 can include an outer sidewall 407 that is connected to the free end 408 of the spindle 405. In the illustrated embodiment the outer sidewall 407 is detachable from the spindle 405. This may allow the cord 80 to be connected to the cord reel 401 and may help facilitate removal of the wound cord from the reel.

For example, in the illustrated embodiment, to attach the cord reel 401 to the cord 80, the cord 80 is axially inserted into a slot 410 on the spindle 405. The slot 410 can be sized to receive a given cord 80, and may extend along some, or substantially all of the length of the spindle 405. Extending the slot 410 the entire length 411 of the spindle 405 may allow the cord 80 to be positioned at any location along the spindle length. Inserting the cord 80 axially into the slot 410 eliminates the need to feed either end of the cord 80 through the slot 410 (or other portions of the reel 401), which may allow for the slot 410 to be sized to have a width 412 that is generally equal to the width 413 of the cord 80.

Optionally, to help position the cord reel 401 in the middle of the length of the cord 80, the cord 80 may be provided with a locating member identify the middle of the cord. Preferably, the locating member is compatible with the cord reel 401 and more preferably, can fit within or otherwise engage the spindle 405 (or other suitable portion of the cord reel 401).

Referring to FIG. 27*a*, one example of a locating member is stripe 413 provided on cord 80. The stripe 413 is visual indication of the middle of the cord 80, and a user may align the cord reel 410 with the cord 80 by inserting the striped portion 413 into the slot 405. Optionally, the stripe 413 may be integral with the cord 80 (e.g. formed as a differently colored portion of the cord 80 insulation, etc.) or may be painted or otherwise marked on the outer surface of the cord 80. While a stripe is illustrated, the visual indicator may be any suitable feature, including, for example, a sticker or wrapper, lettering or other words, a change in texture of the cord 80 surface, etc.

Figure 28A:
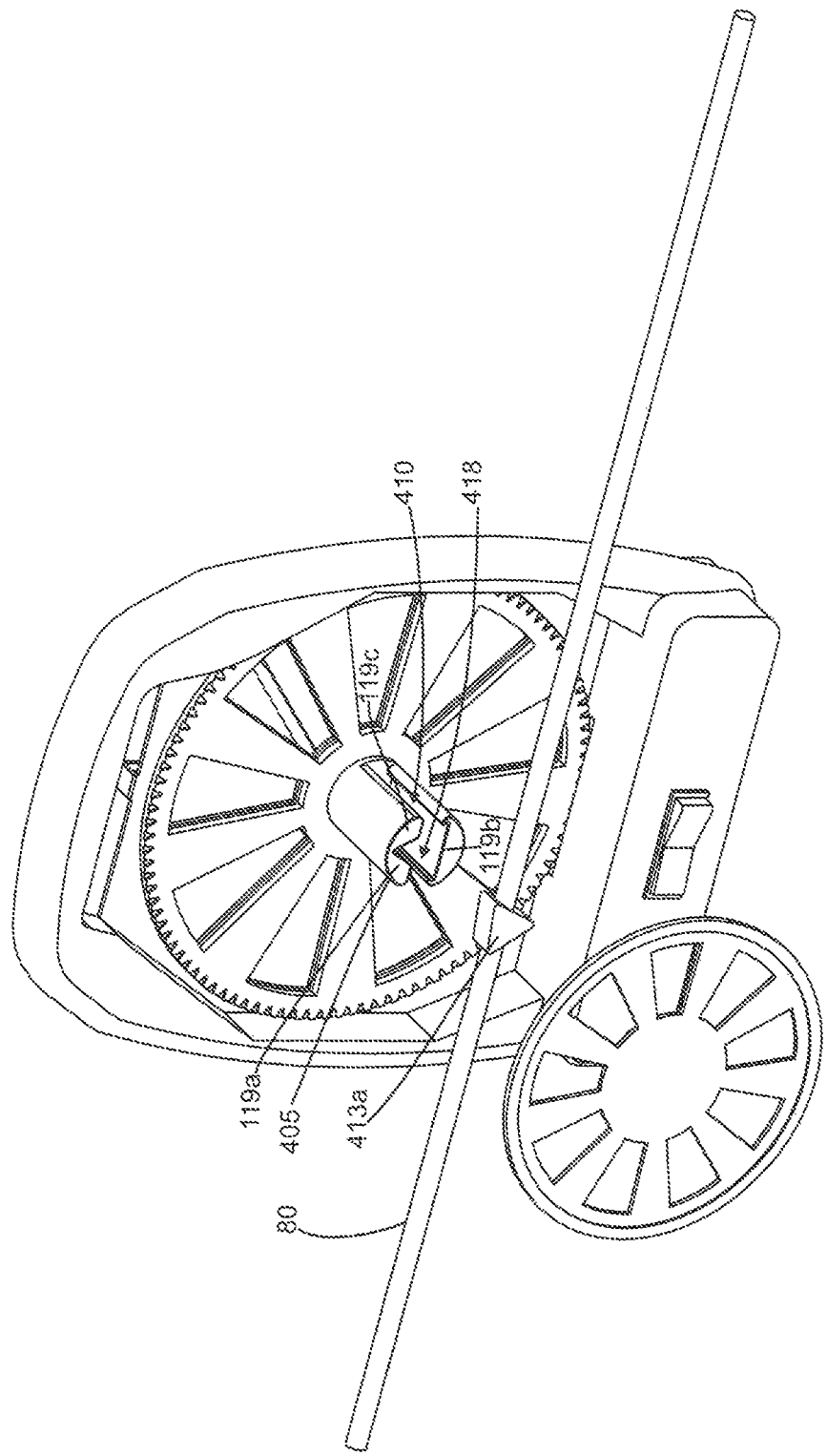
Figure 28C:
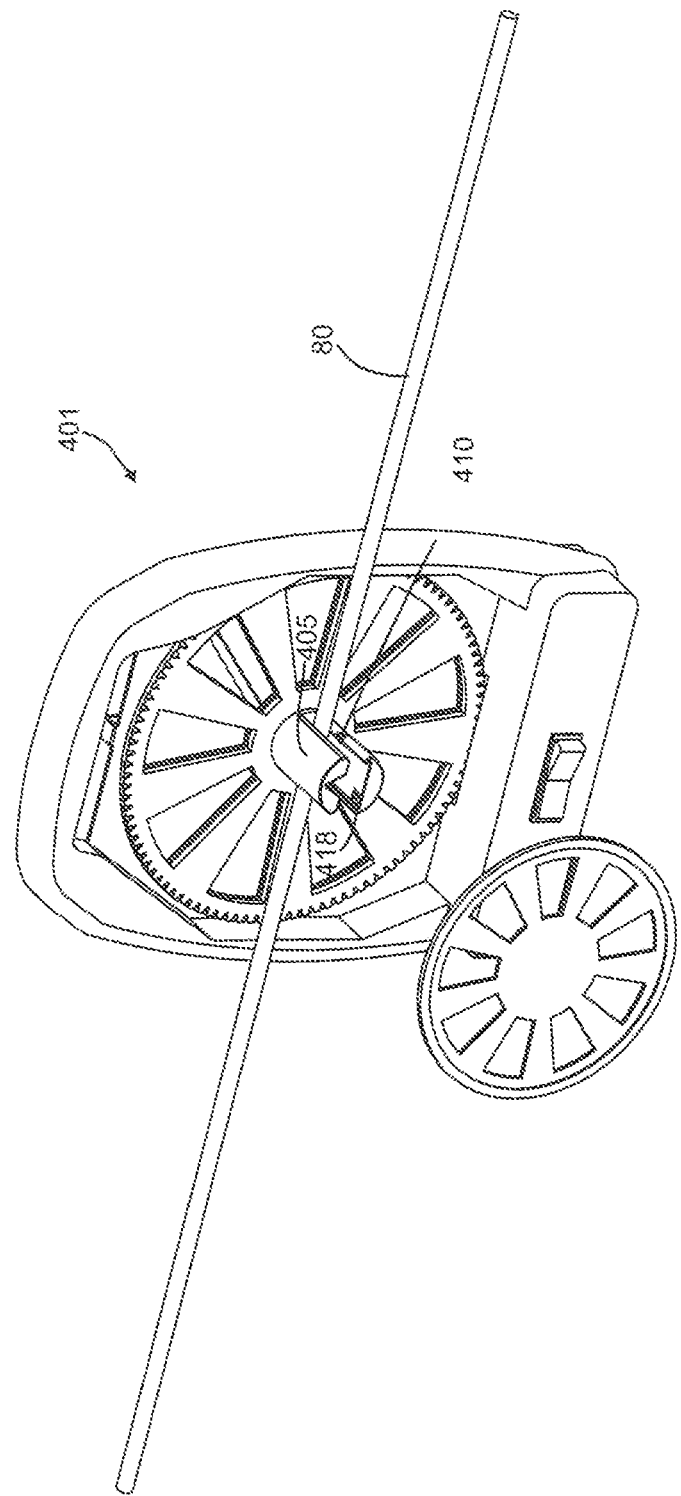

Optionally, instead of a visual indicator, the locating member may be a physical object that is configured to engage or mate with the spindle 405. For example, referring to FIGS. 28*a-c*, instead of (or in addition to) a visual stripe 413, a locating member may be provided as an anchor member 413*a*. In the illustrated example the anchor member 413*a* is a generally triangular member that is attached to the cord 80. The anchor member 413*a* includes two mating halves 416 and 417 each of which includes a cord channel 418 extending therethrough. The halves 416, 417 can be fastened together using any suitable mechanism, including fasteners inserted into apertures 419, a snap fit or press fit and other connecting clamps or clips. Optionally, the anchor member 413*a* can be provided separately from the cord 80. This may allow a user to attach the anchor member 413*a* to any cord the user wishes to use in combination with the cord reel 401.

Figure 33:
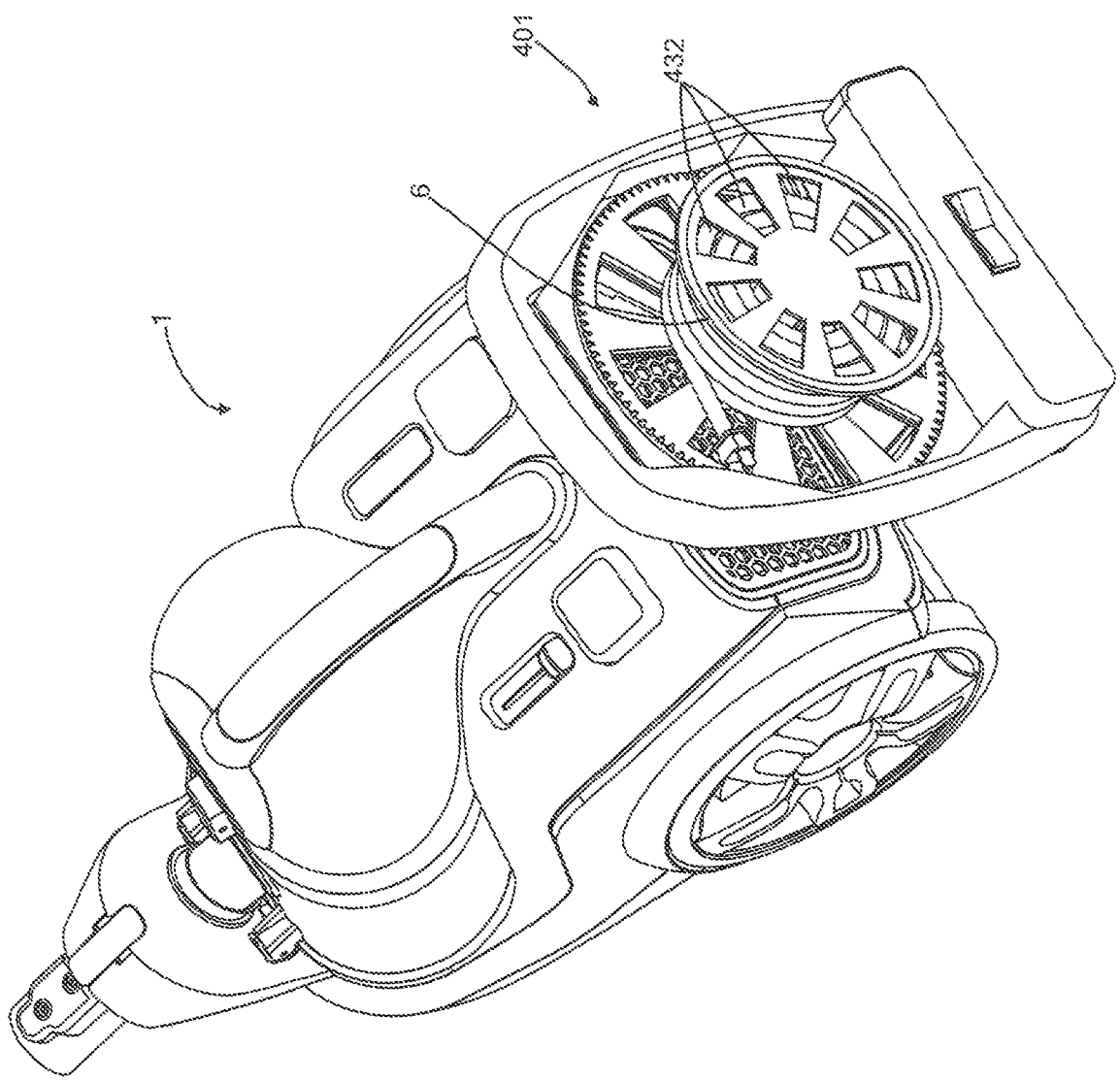

In the illustrated embodiment, in addition to the cord slot 410, the spindle 405 includes a central bore 418 that is configured to slidingly receive the anchor member 413a. To accommodate the triangular anchor member 413a, the bore 418 has three sides 119a-c. In other configurations, both the anchor member 413a and bore 418 may have a different, corresponding shape, including, for example, square, pentagon, hexagon, etc. Referring to FIG. 33, the anchor member 413a is shown inserted into bore 418. In this configuration, the anchor member 413a can also act as an alignment or keying member as it is configured to fit into the bore 418 in an orientation such that the cord 80 also passes through slots 410.

In some configurations, when the spindle 405 is rotated faces 119a-c may engage and exert forces on corresponding faces on the anchor member 413a. This may help reduce the amount of force exerted directly on the cord 80 by the reel 401, which may help reduce cord damage.

Figure 27B:
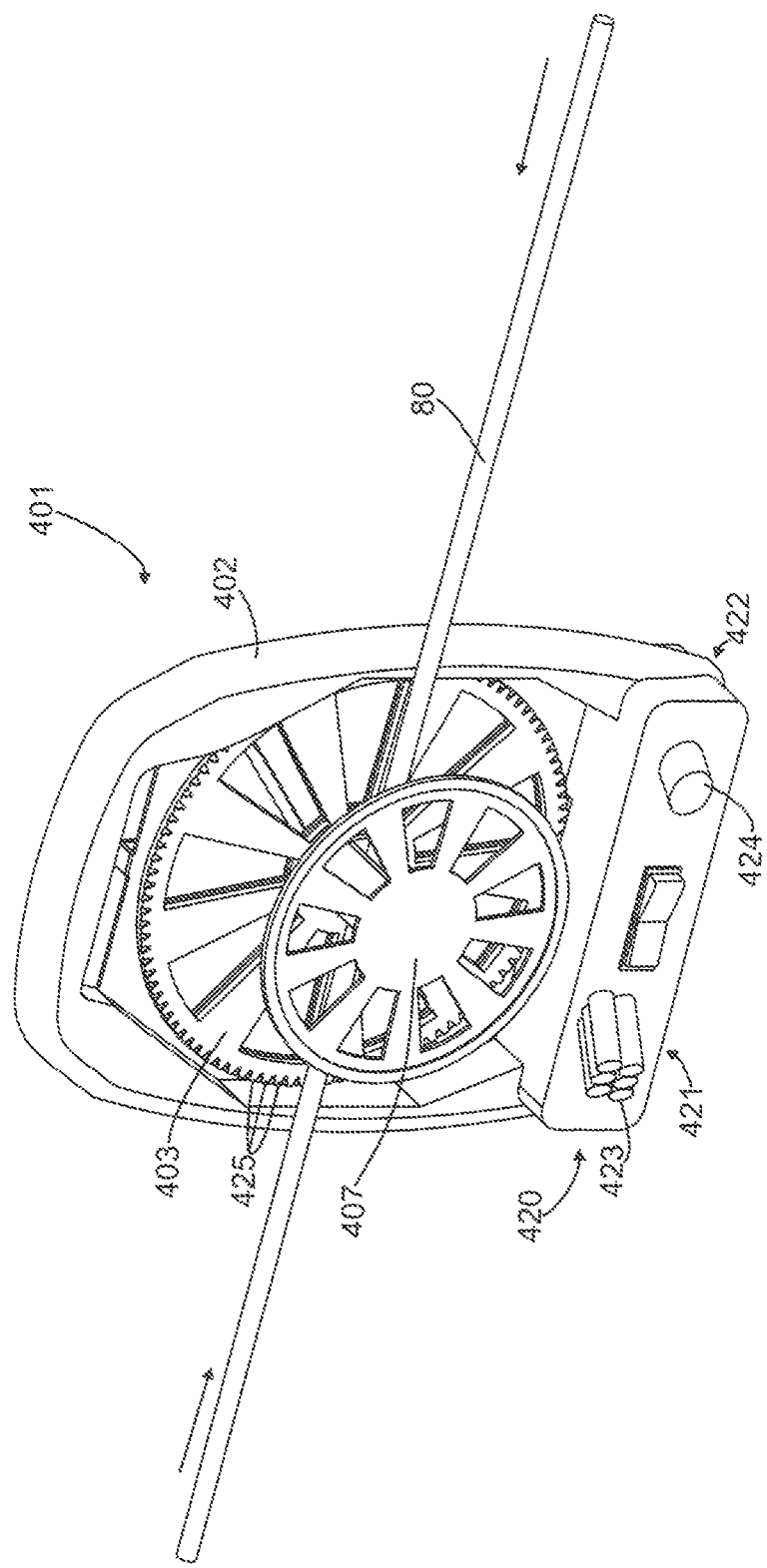

Referring to FIG. 27b, when the locating member (of any suitable configuration) is nested within the spindle 405, the outer sidewall 407 can be attached (for example snapped in place or attached using clips or other suitable means) to secure the cord 80 on the reel 401. The spindle 405 and sidewalls 403 and 407 can then be rotated using any suitable means to wind the cord 80 onto the reel 401. In the illustrated embodiment, both sides of the cord are drawn inwardly toward the reel 401 and wrapped around the spindle 405.

Referring to FIG. 27c, when the cord 80 is fully wound on the reel 401, both ends of the cord 80, female socket 414 and male prongs 415, can be pulled within the perimeter of the cord reel 401. In this embodiment, the prongs 415 are configured to connect to a standard wall socket, and the socket 414 is configured to detachably connect to a corresponding port/coupling on the surface cleaning apparatus. Alternatively, the female end of the cord 80 may be fixedly connected to the surface cleaning apparatus, and need not be detachable.

Figure 27D:
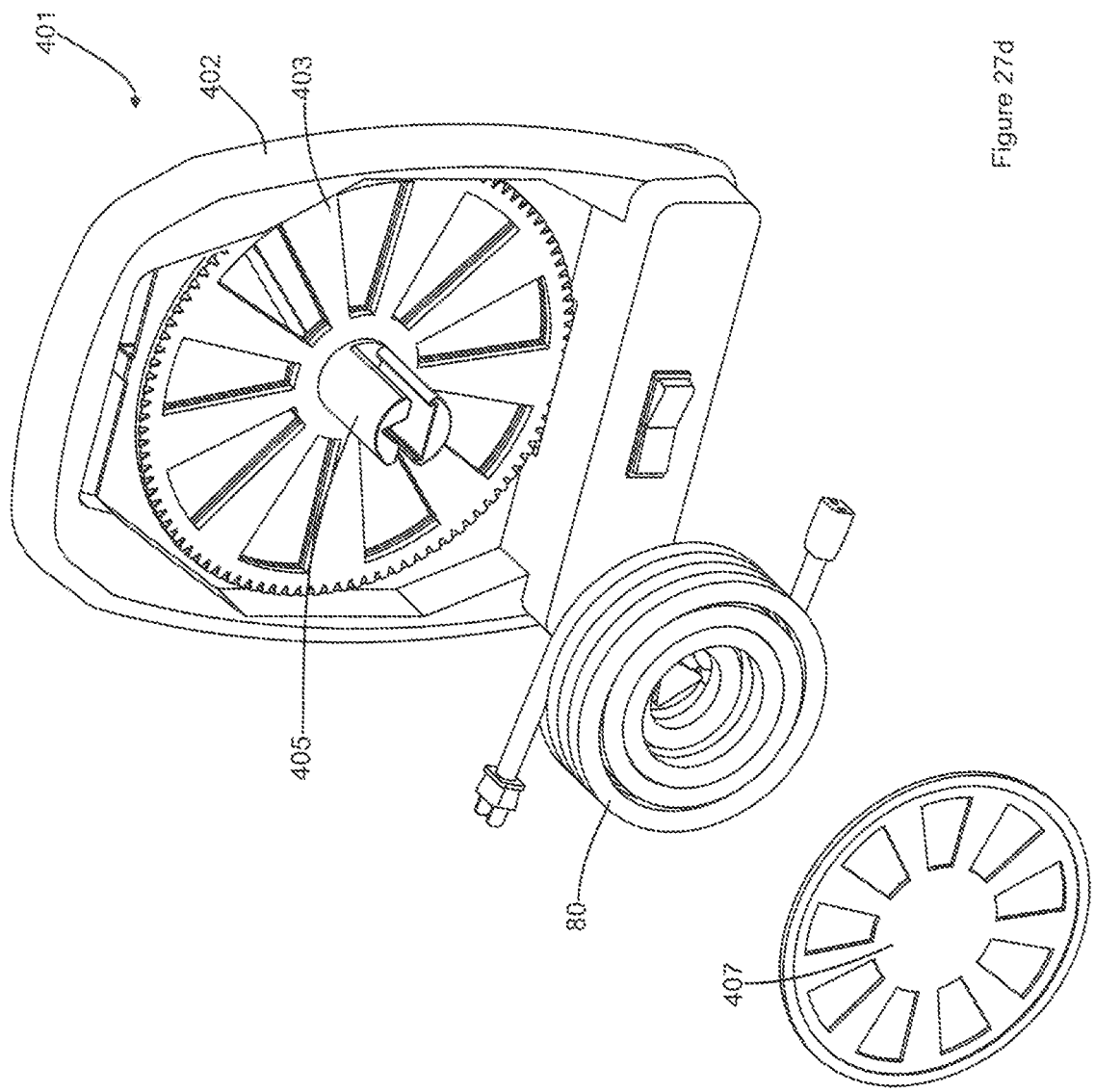

Referring to FIG. 27d, to remove the cord 80 from the reel 401, the user may unwind the reel or alternatively may remove outer sidewall 407 and then axially slide the coiled cord 80 off of the spindle 405. This may allow a user to quickly remove the entire cord 80 from the reel 401 without having to unwind its entire length.

The cord reel 401 may be driven (i.e. wound and/or unwound) using any suitable mechanism, including for example a manual crank and a powered motor. Optionally, the reel 401 may include more than one driving mechanism, which may allow the reel to be operated under a variety of conditions.

Referring to FIG. 27b, in the illustrated embodiment the cord reel 401 includes a drive module 420 provided at the lower end of the body 402. In this configuration, the drive module 420 is generally opposite the handle 406 and is positioned below the spindle 405. Preferably, the bottom surface 421 of the drive module 420 cooperates with the lower surface 422 of the rest of the body 402 to provide a base for the cord reel 401. More preferably, the base is configured to support the cord reel in a generally upright position if/when it is placed on a flat surface (such as the ground). This may allow the cord reel 401 to remain upright when detached from the surface cleaning apparatus and positioned on the ground.

The drive module 420 preferably includes an onboard energy storage member in the form of batteries 423 and an electric drive motor 424. The drive motor 424 can be connected to the spindle 405 in any suitable manner in order to drivingly rotate the spindle 405. In the illustrated embodiment, the perimeter of the inner sidewall 403 is provided with a plurality of gear teeth 425 which extend into the drive module 420. Inside the drive module 420, the motor 424 is connected to a driving pinion or gear with teeth that mesh with the teeth on the sidewall 425.

A switch 425 is wired between the batteries 423 and the motor 424 to control the operation of the motor 424, and the subsequent rotation of the spindle 405. The switch 425 may be any suitable type of switch, and in the example illustrated is a three-position switch. In this configuration, the switch can be moved into a "wind" position in which it causes the motor 424 and spindle 405 to rotate in one direction, an "unwind position" in which it causes the motor 424 and spindle 405 to rotate in the opposite direction, and an off position in which the motor 424 does not rotate. This may allow for powered winding and unwinding of the cord. Alternatively, or in addition, the drive mechanism may include a clutch or other suitable device so that in addition to being unwound using motor 424, the cord may be unwound simply by pulling on one or both of its ends, and the spindle 405 is allowed to rotate in response to such tension on the cord 80.

In addition to winding and unwinding, the motor 424 may be equipped with a torque sensor (e.g. current monitoring sensor) or other type of controller that can disengage or deactivate the motor 424 if the tension on the cord 80 exceeds a predetermined threshold (e.g. if the cord 80 is stuck or the 401 reel is jammed). This may help prevent damage to the motor 424, the cord 80 and the reel 401.

Figure 29:
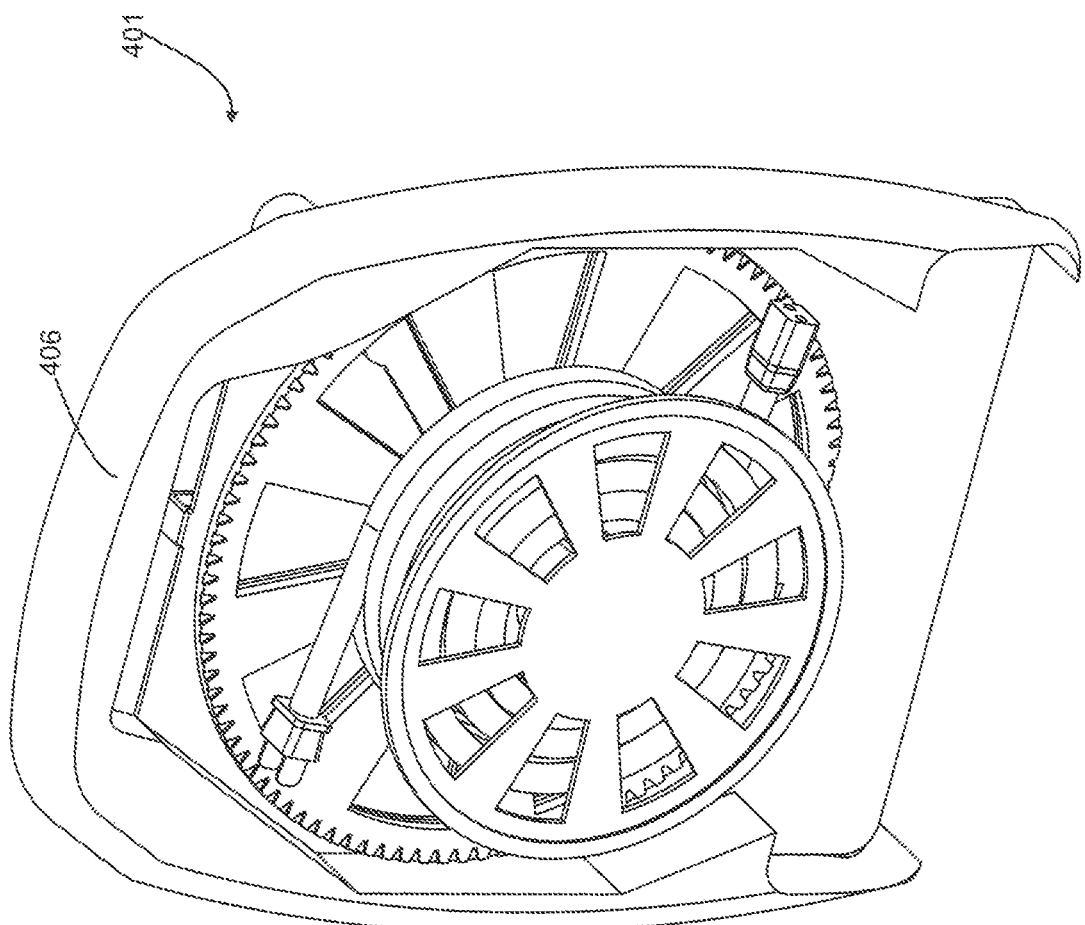
FIG. 29 is a front perspective view of the cord reel of FIGS. 27a-28a with a drive module removed.

Preferably, if batteries are provided on board the cord reel, they are preferably rechargeable. The batteries may be charged if the cord reel 401 is connected to the body of the surface cleaning apparatus which has an on board energy storage member, and/or by placing the drive module 420 on an independent charging station or by connecting it to an external power source (e.g. a wall socket). Optionally, referring to FIG. 29, the drive module 420 may be removable from the body 402. Removing the drive module 420 may help reduce the overall size and weight of the cord reel 401. It may also allow the drive module 420 (if it includes the batteries) to be charged separately from the cord reel 401, and/or to be serviced or replaced with a different drive module 420.

Figure 30:
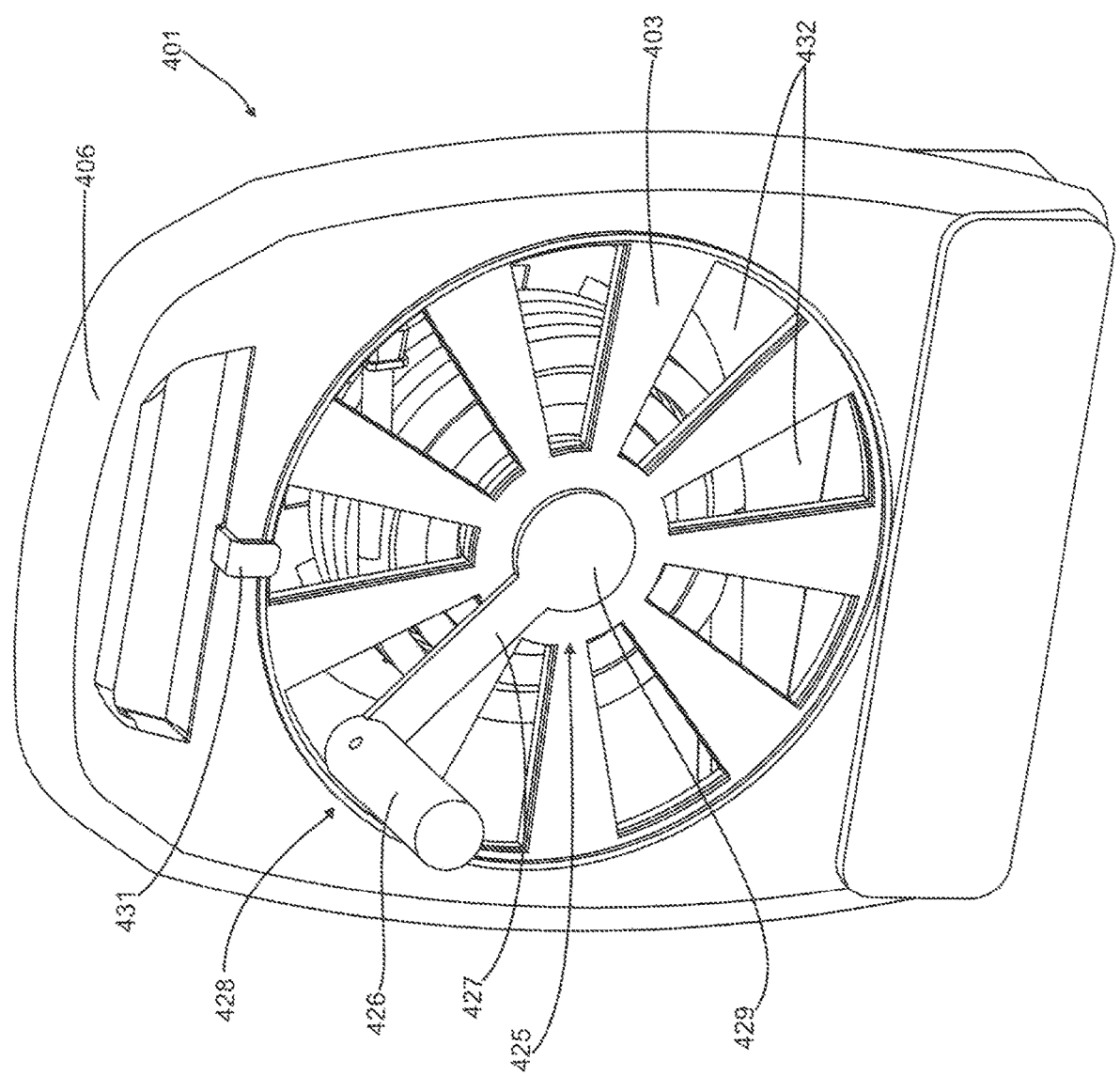
Figure 31:
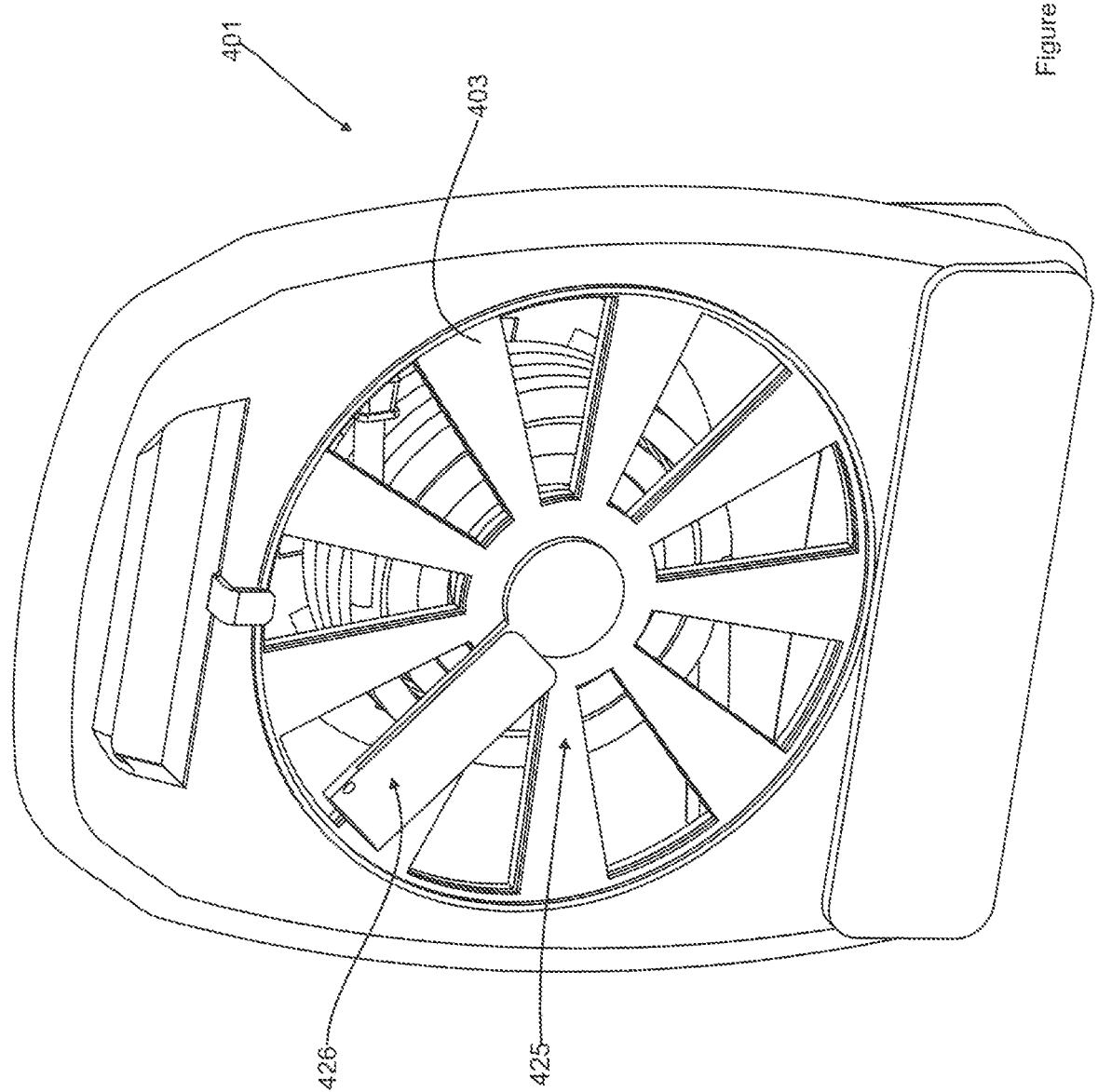

Referring to FIG. 30, as an alternative to the electric drive module 420 or as a supplement thereto, the cord reel 401 may also include a manual drive mechanism to wind the cord 80. This may be useful if the drive module 420 is removed and/or if the batteries 423 are dead. In the illustrated embodiment, the manual drive mechanism is provided in the form of a hand crank 425. The hand crank 425 includes a hand grip portion 426 and a linkage arm 427. The outer end 428 of the linkage arm is connected to the hand grip 426 and the inner end 429 is connected to the inner sidewall 403 and spindle 405. Rotating the hand crank 425 winds and unwinds the cord 80. When not in use, the hand grip portion 426 can be moved from a deployed position (FIG. 30) to a retracted position (FIG. 31), which may help reduce the overall size of the cord reel 401. Reducing the size of the cord reel 401 may help facilitate storing and/or mounting the cord reel 401 on a surface cleaning apparatus.

Figure 32:
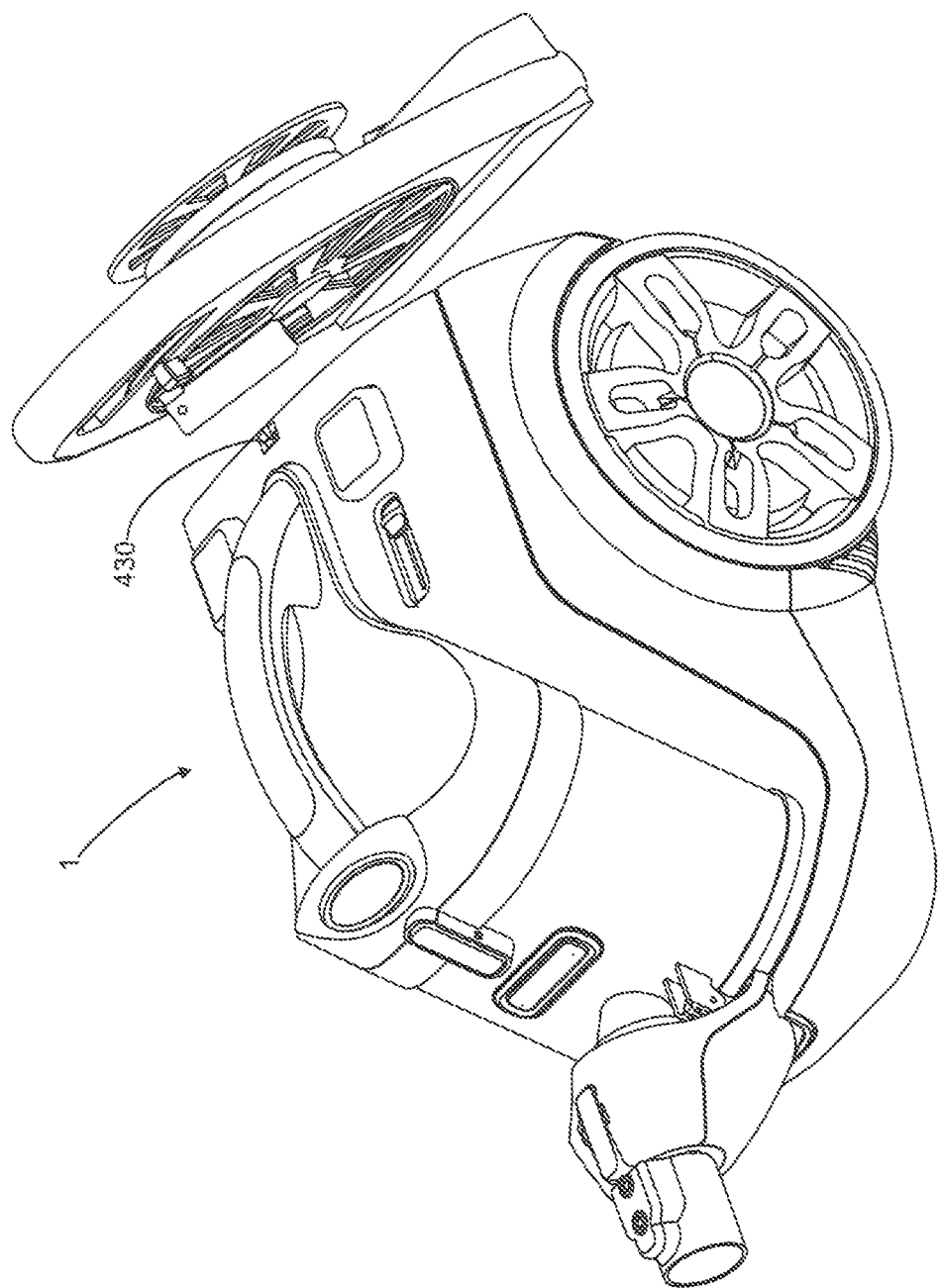
FIGS. 32-33 are perspective views of the cord reel of FIGS. 27a-28a in combination with a surface cleaning apparatus.

As exemplified in FIG. 32, the cord reel 401 may be configured to be mounted to, and carried on, the surface cleaning apparatus 1. To accommodate the external cord reel 401, the surface cleaning unit 4 may include a reel mount 430 and the cord reel 401 may include a complimentary mounting flange 431 provided on the back of the body 402

(FIG. 30). The mounting flange 431 may be configured to fit within the cord mount 430 and can be held in place by gravity, and/or the use of any suitable securing or locking members, including, latches, magnets, pins, detents, clips and other fasteners.

Preferably, in addition to providing a physical connection, the cord mount 430 and flange 431 can also include reciprocal electrical connectors (e.g. a mating socket and prongs). In this configuration, when the cord reel 401 is docked on the surface cleaning unit 4, and the surface cleaning unit 4 is powered (either by an external source or an on board source) the cord reel 401 can receive power from the surface cleaning unit 4, or vice versa. This may allow the batteries 423 to be charged when the cord reel 401 is mounted on the surface cleaning apparatus 1. Alternately, the reciprocal electrical connectors may be used to power the surface cleaning unit when the power cord is plugged into an electrical outlet.

Optionally, the cord reel 401 may carry the only cord 80 provided with the surface cleaning apparatus 1. In such a configuration, one end of the cord 80 is connectable to a port or connector on the surface cleaning apparatus 1. Alternatively, the cord reel 401 may carry an additional or supplemental cord 80, and the surface cleaning apparatus 1 may include at least one internal cord reel as well. In such a configuration, the cord 80 on the cord reel 401 may function as an extension cord, and one end of the cord may be connected to the wall socket while the other end of the cord is coupled to the free end of the electrical cord that is integral the surface cleaning apparatus.

In the illustrated embodiment, mounting the cord reel 401 onto the back side of the surface cleaning unit 4 could potentially interfere with the air flow exiting the clean air outlet 6. To help facilitate air flow, the inner sidewall 403 and outer sidewall 407 are provided with a plurality of air flow apertures 432 to allow air to flow through the cord reel 401.

In an alternate embodiment, the cord reel could produce a DC output, such as by having an on board power supply.

Figure 34:
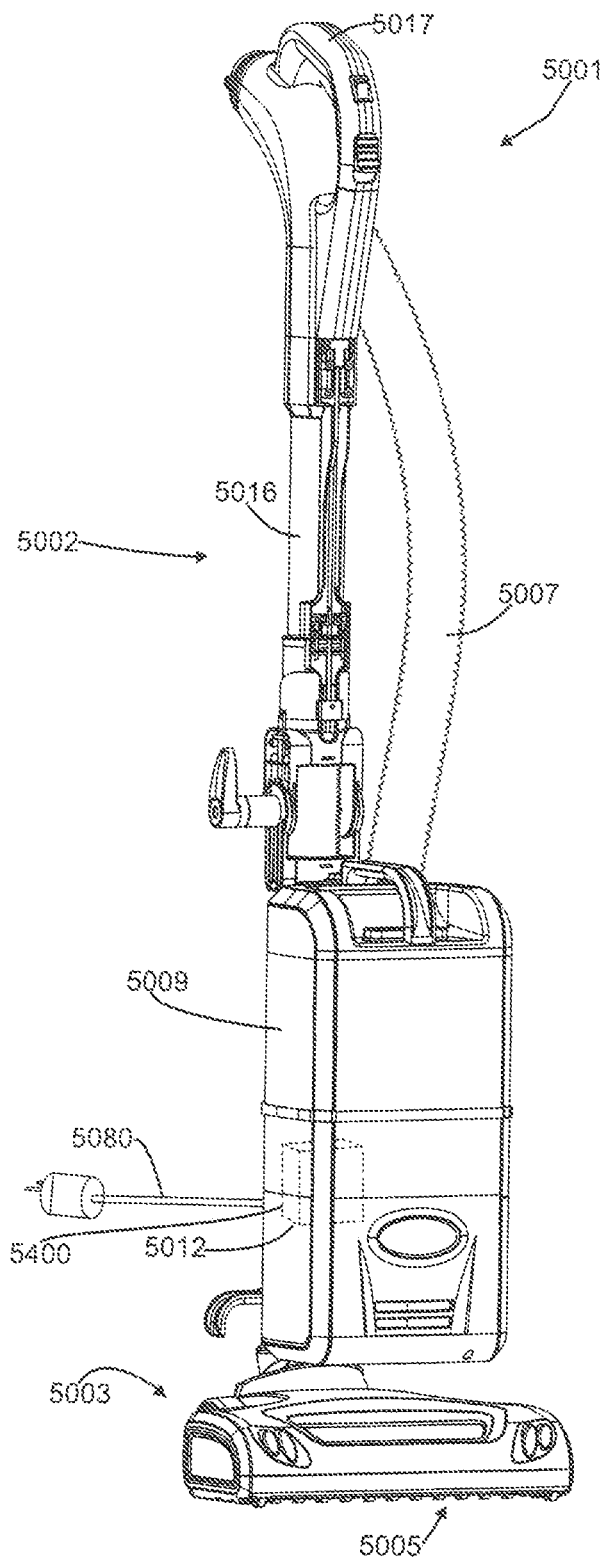
FIGS. 34-36 are front perspective views of another embodiment of a surface cleaning apparatus.

Any of the features of the cord reels disclosed herein may be used with any other type of surface cleaning apparatus. The following description exemplifies a number of the features of a cord reel disclosed herein in an upright-style surface cleaning apparatus. Referring to FIG. 34, another embodiment of an upright-style surface cleaning apparatus 5001 is shown. Surface cleaning apparatus 5001 is generally similar to surface cleaning apparatus 1, and analogous features are identified using like reference characters indexed by 5000.

Figure 35:
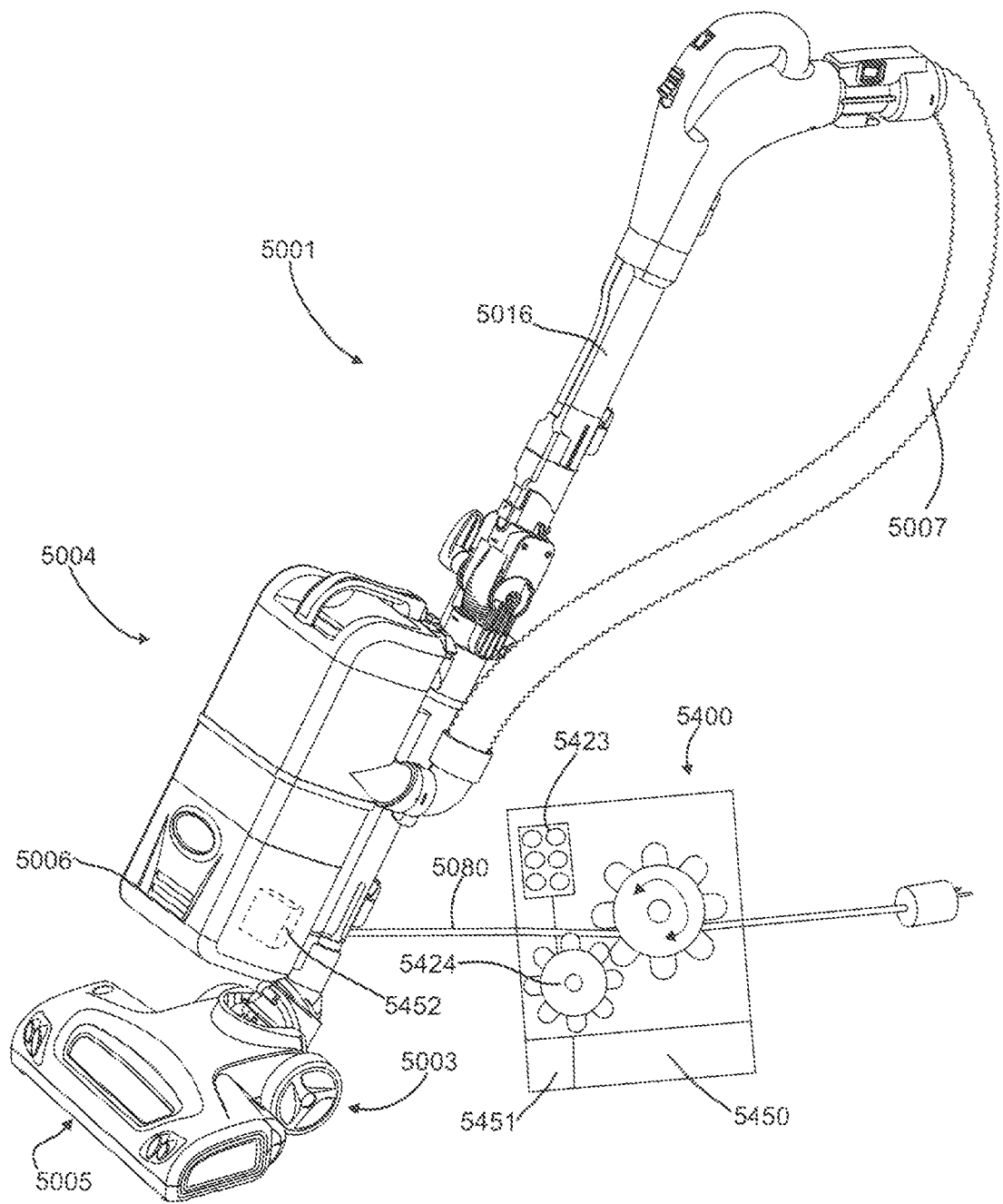
Figure 36:
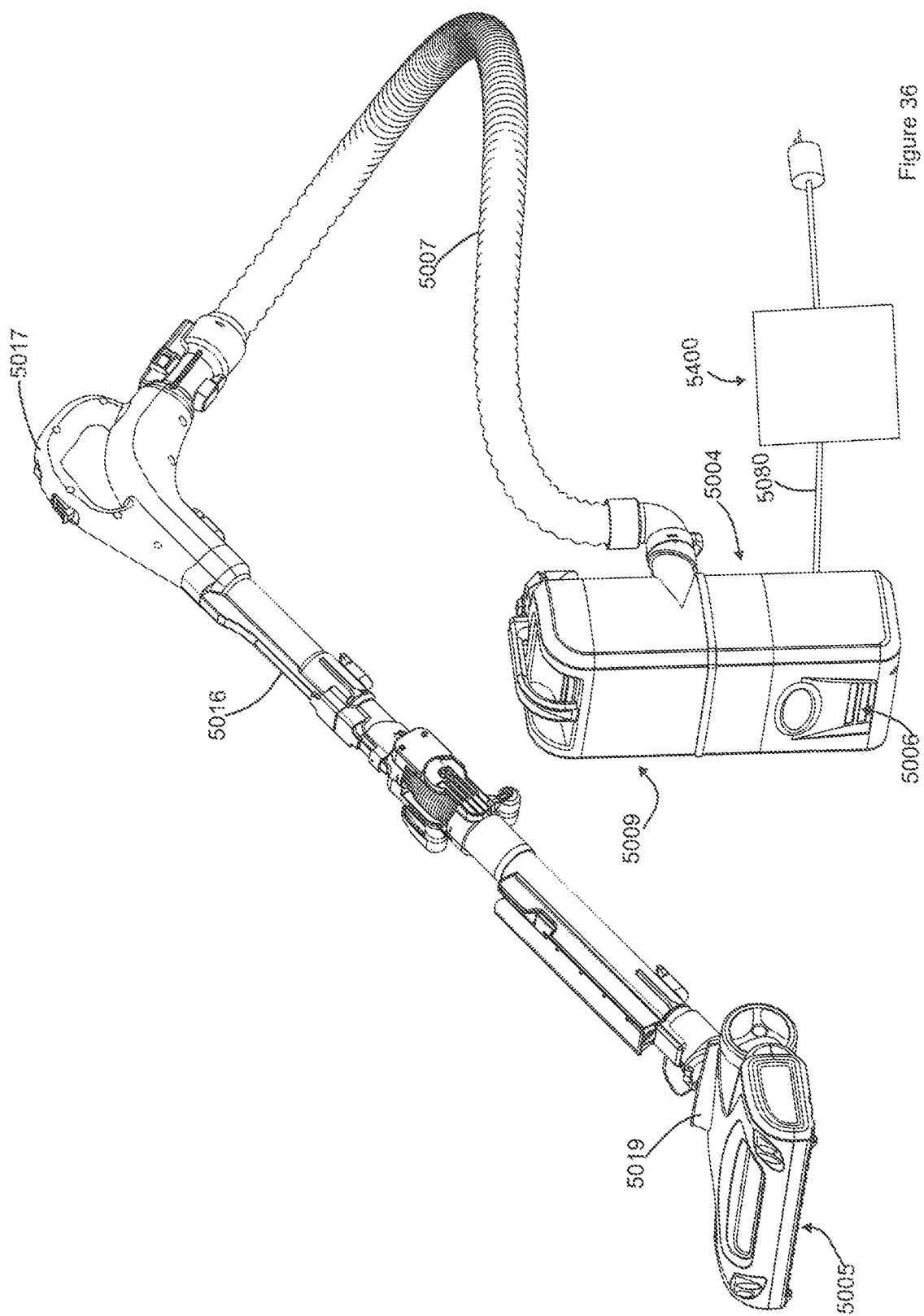

In this embodiment, the chassis portion 5002 is configured as the upper portion of the surface cleaning apparatus, and includes the rigid up flow duct 5016. In FIG. 34, the surface cleaning unit 5004 is illustrated including an optional internal cord reel 5400 that may include any of the features of the cord reels described herein. Referring to FIG. 35, the surface cleaning apparatus 5001 is illustrated with an external cord reel 5400 that includes a motor 5424, batteries 5423, controller 5450, sensor 5451 and transmitter 5452 as described herein. Optionally, some or all of these features may also be provided in the internal cord reel 5400 in FIG. 34. Preferably, the surface cleaning unit 5004 is detachable from the chassis portion 5002, which may allow the user to reconfigure the surface cleaning apparatus 5001 into a variety floor and above-floor cleaning modes.

Hand Carriable Surface Cleaning Apparatus

Figure 37:
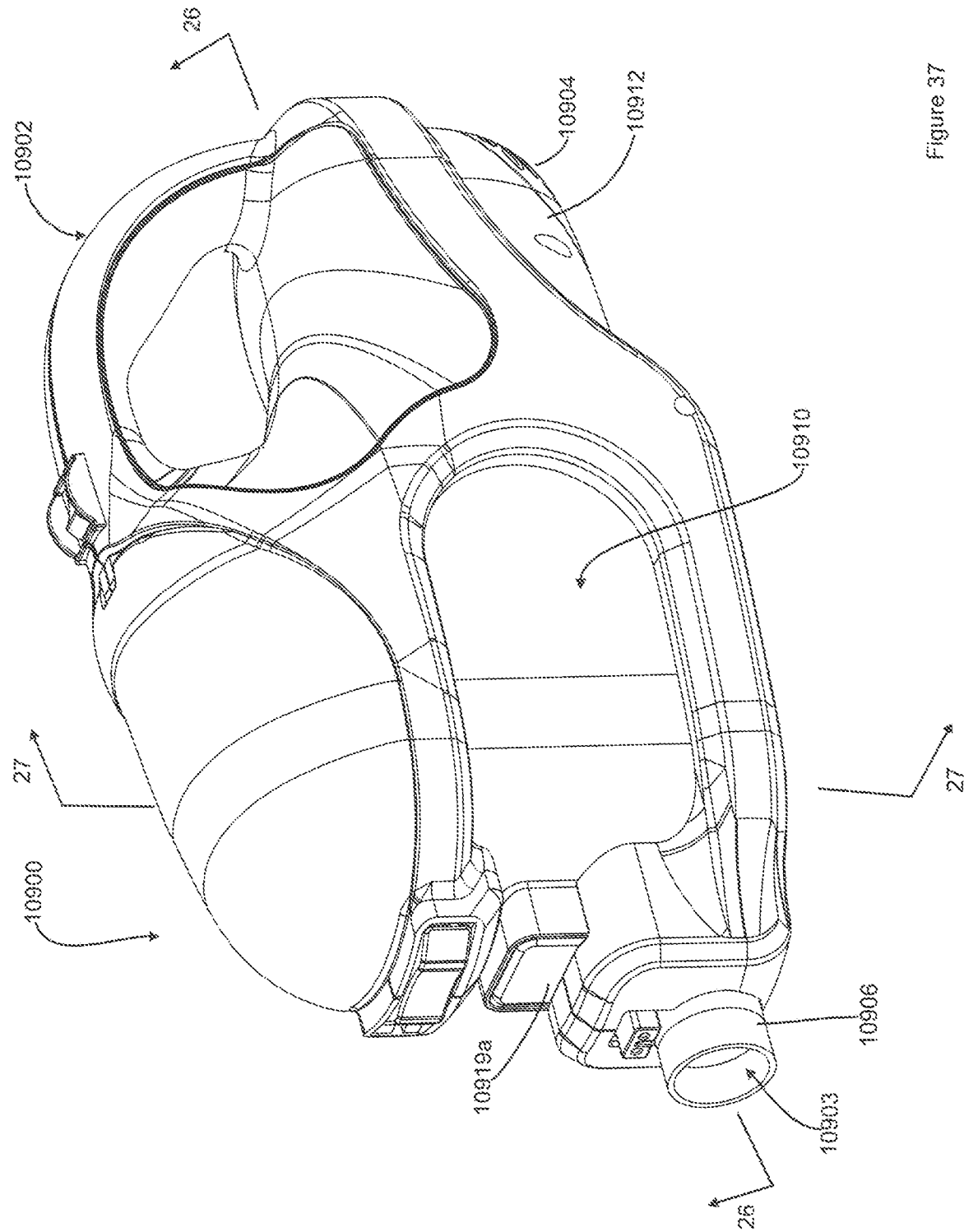
FIG. 37 is a perspective view from the front of another embodiment of a surface cleaning apparatus.

The following description exemplifies a number of the features disclosed herein in a hand carryable surface cleaning apparatus (e.g., a hand vacuum cleaner, a pod vacuum cleaner or any other surface cleaning apparatus that may be carried by a handle or a shoulder strap or the like). Referring to FIG. 37, another embodiment of a hand carryable surface cleaning apparatus 10900 is shown.

The surface cleaning apparatus 10900 includes a main body 10901 having a handle 10902, a dirty air inlet 10903, a clean air outlet 10904 (see for example FIG. 26) and an air flow path extending therebetween. In the embodiment shown, the dirty air inlet 10903 is the inlet end of connector 10906. Optionally, the inlet end 10905 can be used to directly clean a surface. Alternatively, the inlet end can be connected to the downstream end of any suitable cleaning tool or accessory, including, for example a wand, a nozzle and a flexible suction hose.

Figure 38:
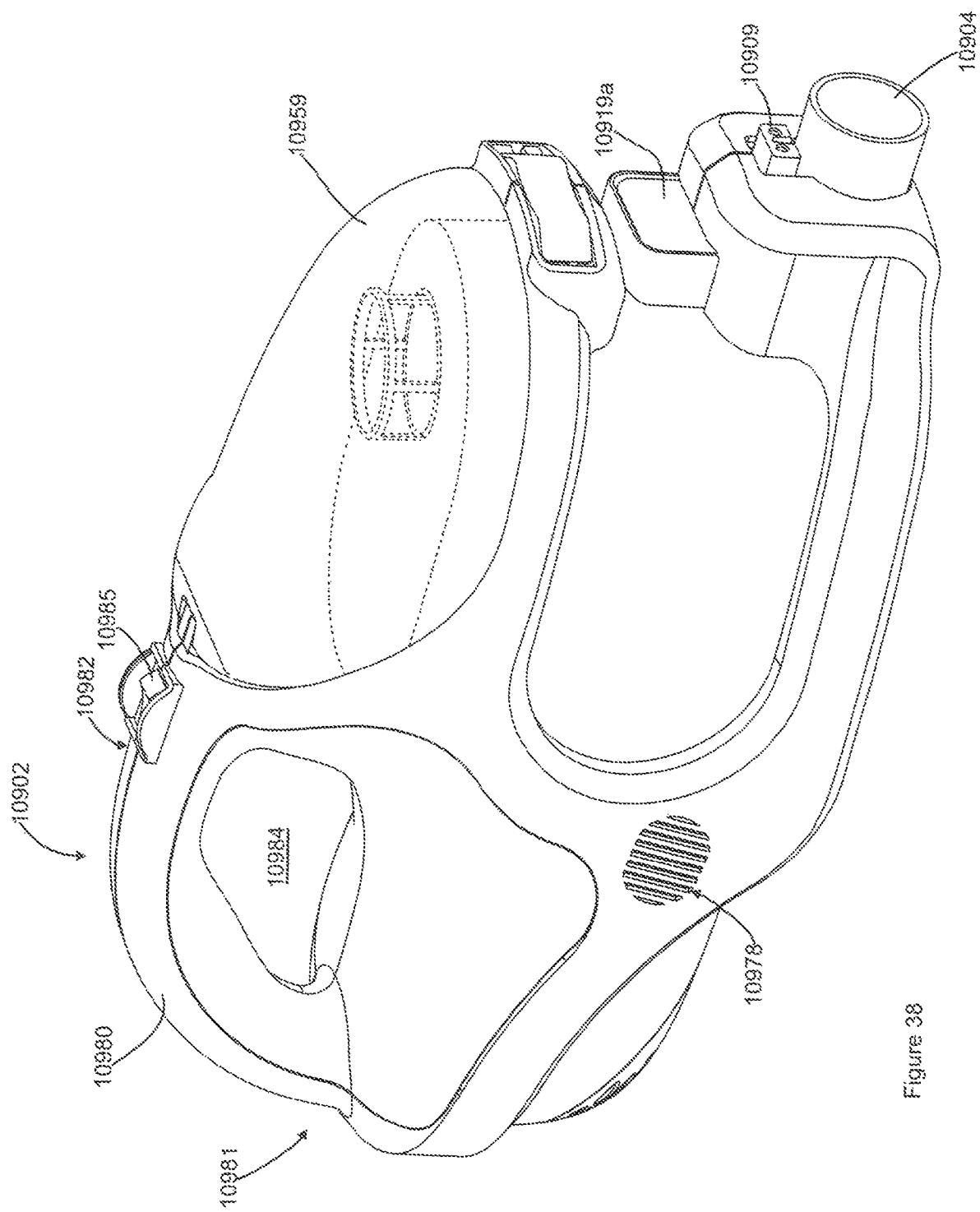
FIG. 38 is another perspective view from the rear of the surface cleaning apparatus of FIG. 37.

The connector 10906 may be any suitable connector that is operable to connect to, and preferably detachably connect to, a cleaning tool or other accessory. Optionally, in addition to provide an air flow connection, the connector may also include an electrical connection 10909 (FIG. 38). Providing an electrical connection 10909 may allow cleaning tools and accessories that are coupled to the connector 10906 to be powered by the surface cleaning apparatus 10900. For example, the surface cleaning unit 10900 can be used to provide both power and suction to a surface cleaning head, or other suitable tool. In the illustrated embodiment, the connector 10909 includes an electrical coupling in the form of a female socket member, and a corresponding male prong member may be provided on the cleaning tools and/or accessories. Providing the female socket on the electrified side of the electrical coupling may help prevent a user from inadvertently contacting the electrical contacts.

Figure 39:
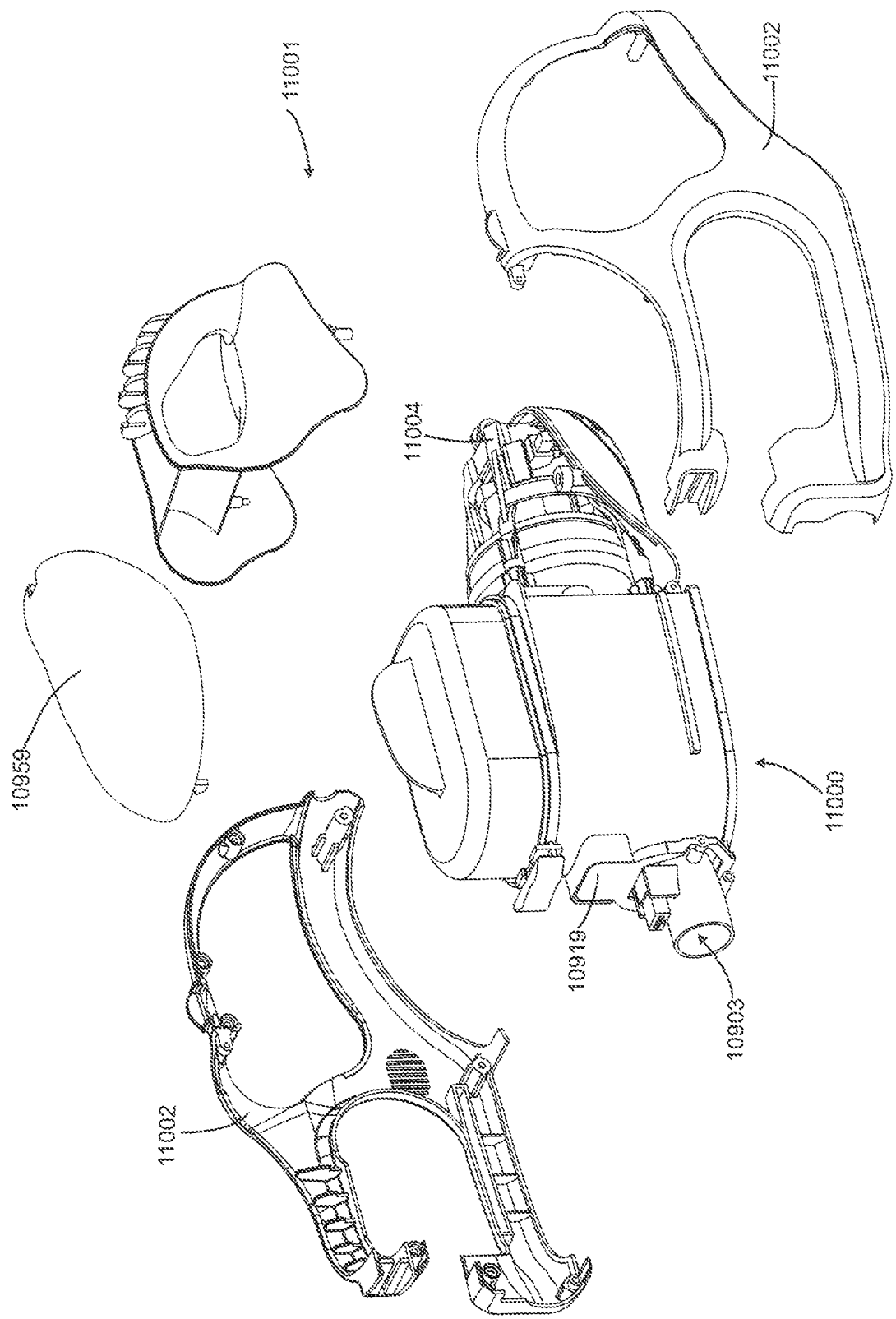
FIG. 39 is a partially exploded perspective view of the surface cleaning apparatus of FIG. 37.
Figure 40:
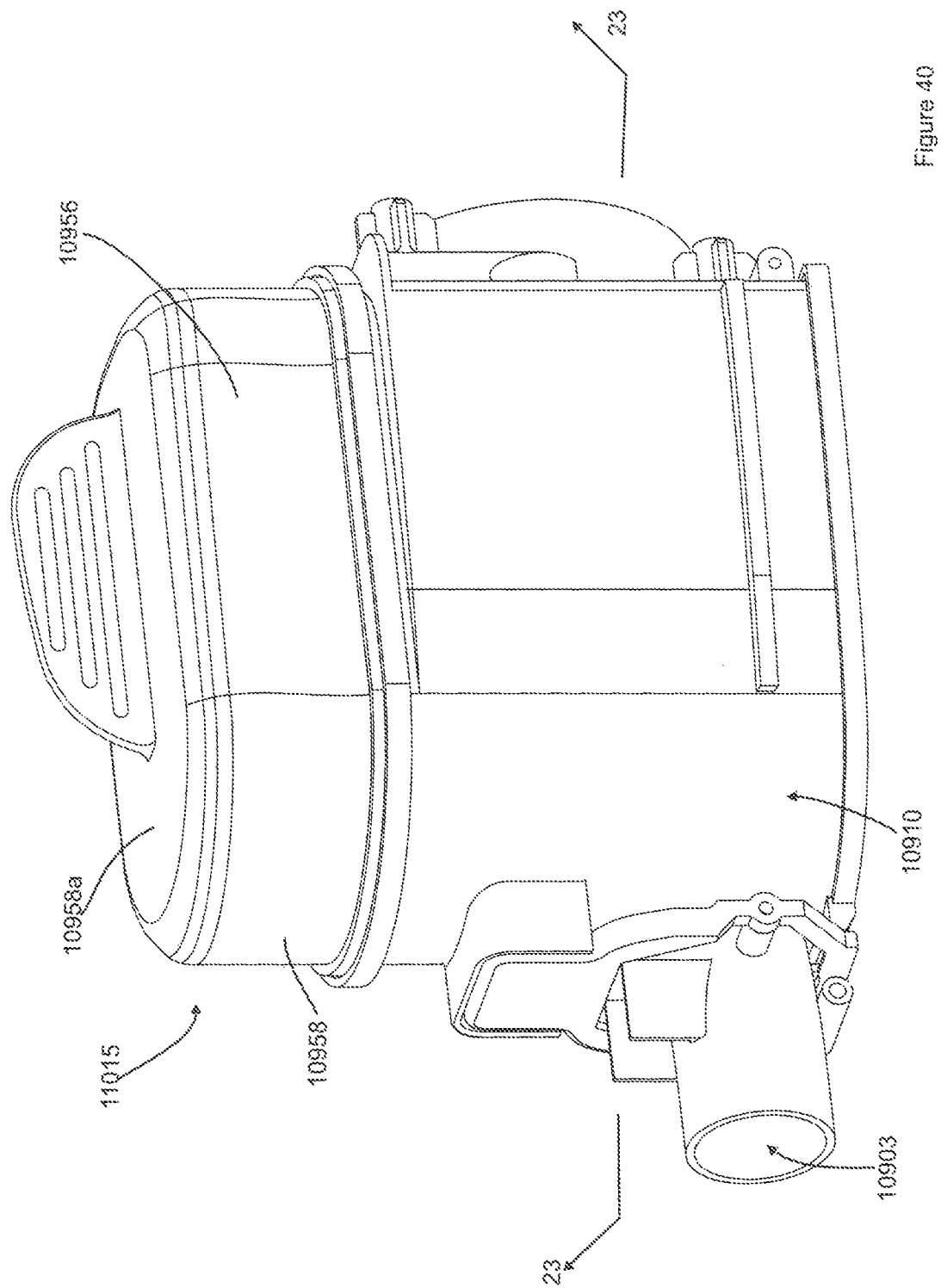
FIG. 40 is a perspective view of a portion of the surface cleaning apparatus of FIG. 37.

Referring to FIG. 39, a construction technique that may be used by itself or with any other feature disclosed herein is exemplified. In this embodiment, the main body portion 10901 of the surface cleaning apparatus includes a core cleaning unit 11000 and an outer shell 11001. In the illustrated example, the core cleaning unit 11000 is a generally, self-contained functional unit that includes the dirty air inlet 10903, air treatment member 10910, pre-motor filter chamber 10956, suction motor 10911 and clean air outlet 10904. The outer shell includes mating side panels 11002, the handle portion 11003 of the surface cleaning apparatus (including the primary power switch 10985) and an openable pre-motor filter chamber cover 10959. When the outer shell 11001 is assembled around the core cleaning unit 11000 the exposed outer surfaces of the surface cleaning apparatus 10900 are formed from a combination of portions of the core cleaning unit 11000 and the outer shell 11001. For example, the external suction motor housing 10912 and handle 10902 are provided by the outer shell 11001, whereas the shell is shaped so that portions of the cyclone bin assembly 10910 sidewalls remain visible in the assembled configuration. If these portions are at least partially transparent, they can allow a user to see into the dirt collection chamber 10914 to determine if the dirt collection chamber 10914 is getting full.

From the dirty air inlet 10903, the air flow path extends through the cyclone bin assembly 10910 which forms part of the main body of the surface cleaning apparatus. A suction motor 10911 (see FIG. 44) is mounted within a motor housing frame 11004 (FIG. 39) of the core cleaning unit 11000 and is in fluid communication with the cyclone bin assembly 10910. In this configuration, the suction motor 10911 is downstream from the cyclone bin assembly 10910 and the clean air outlet 10904 is downstream from the suction motor 10911.

Figure 41:
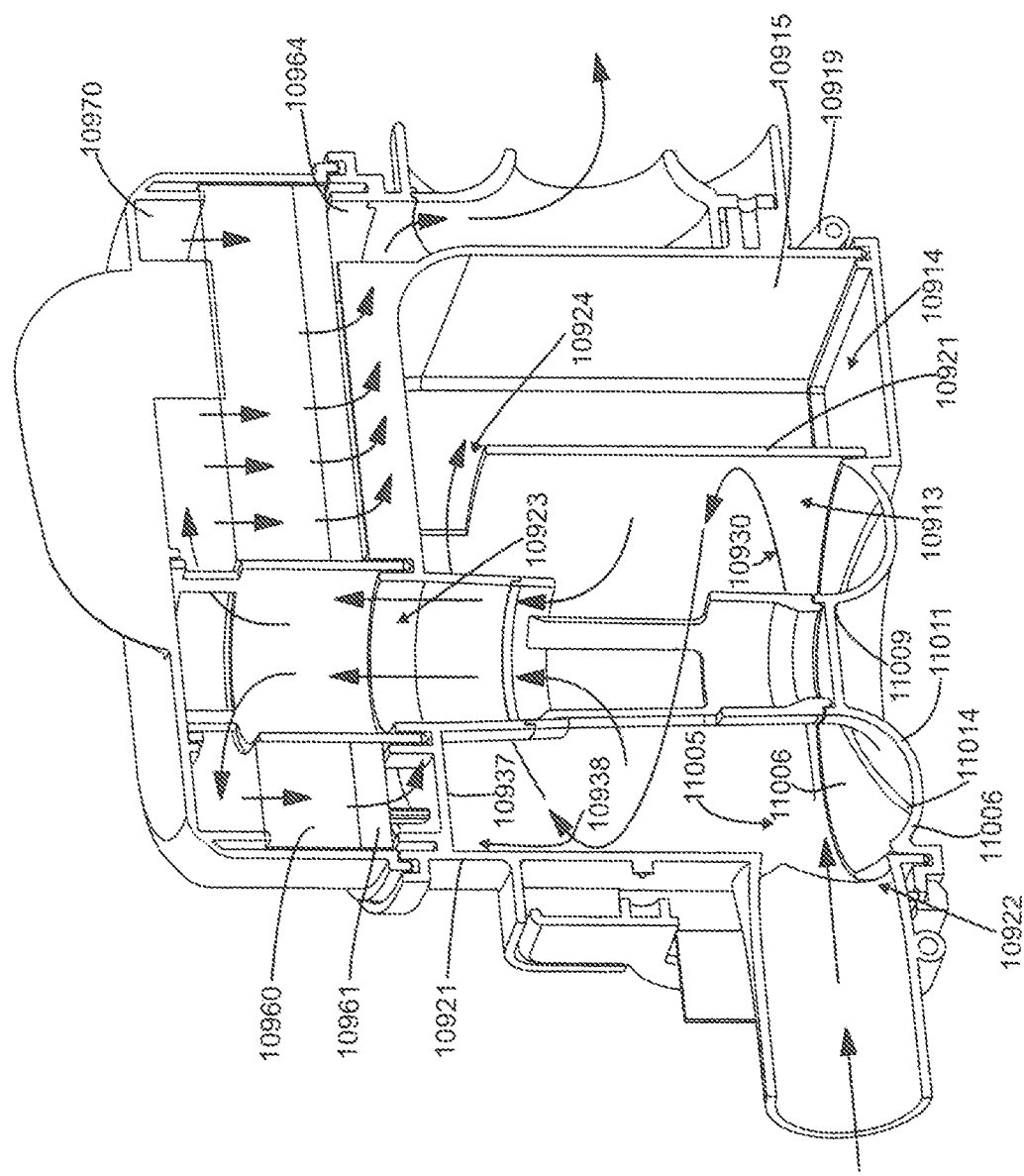
FIG. 41 is a cross sectional view of FIG. 40, taken along line 23-23 in FIG. 40.
Figure 42:
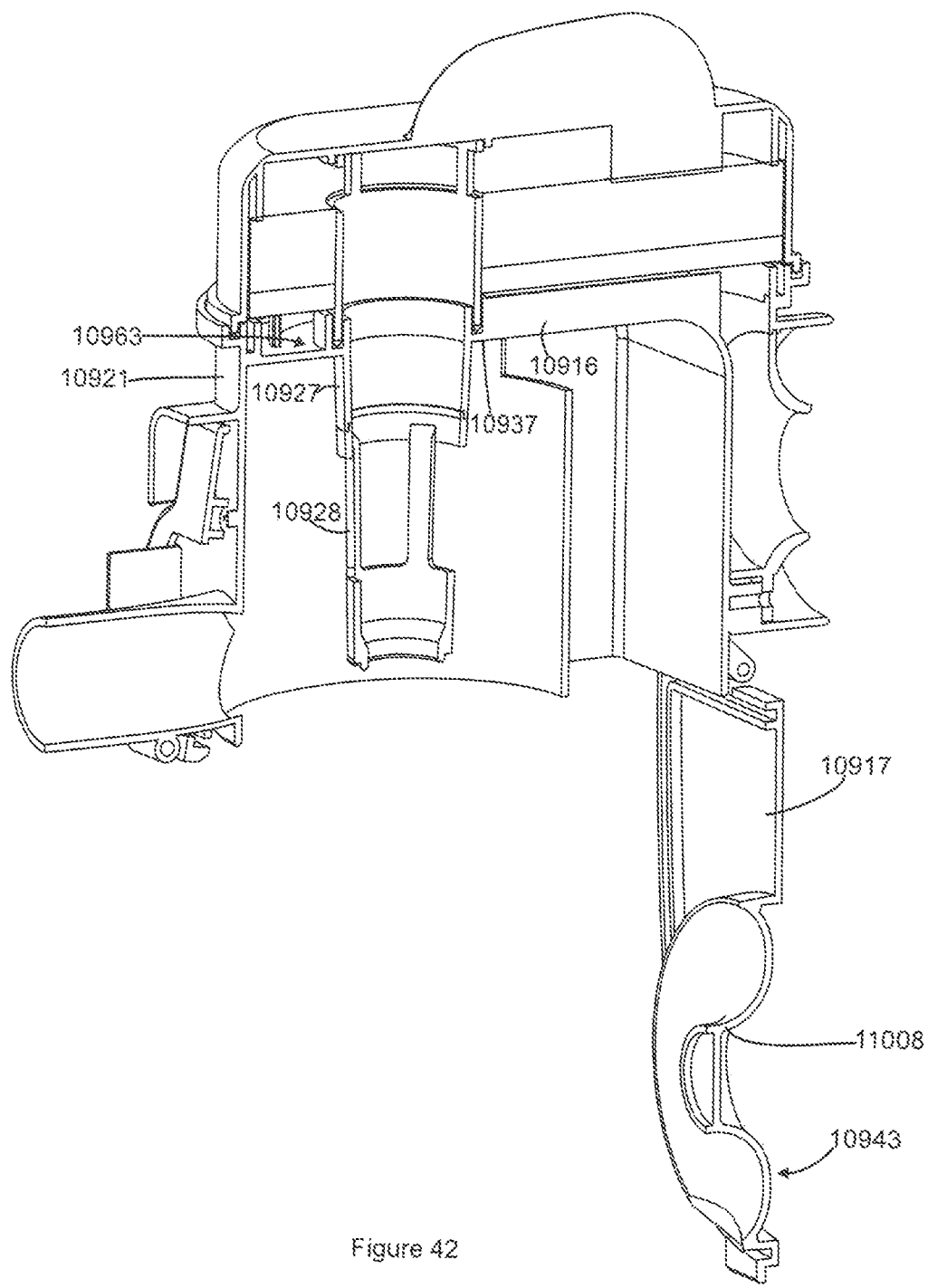
FIG. 42 is the cross sectional view of FIG. 41 with a bottom door in an open position.
Figure 43:
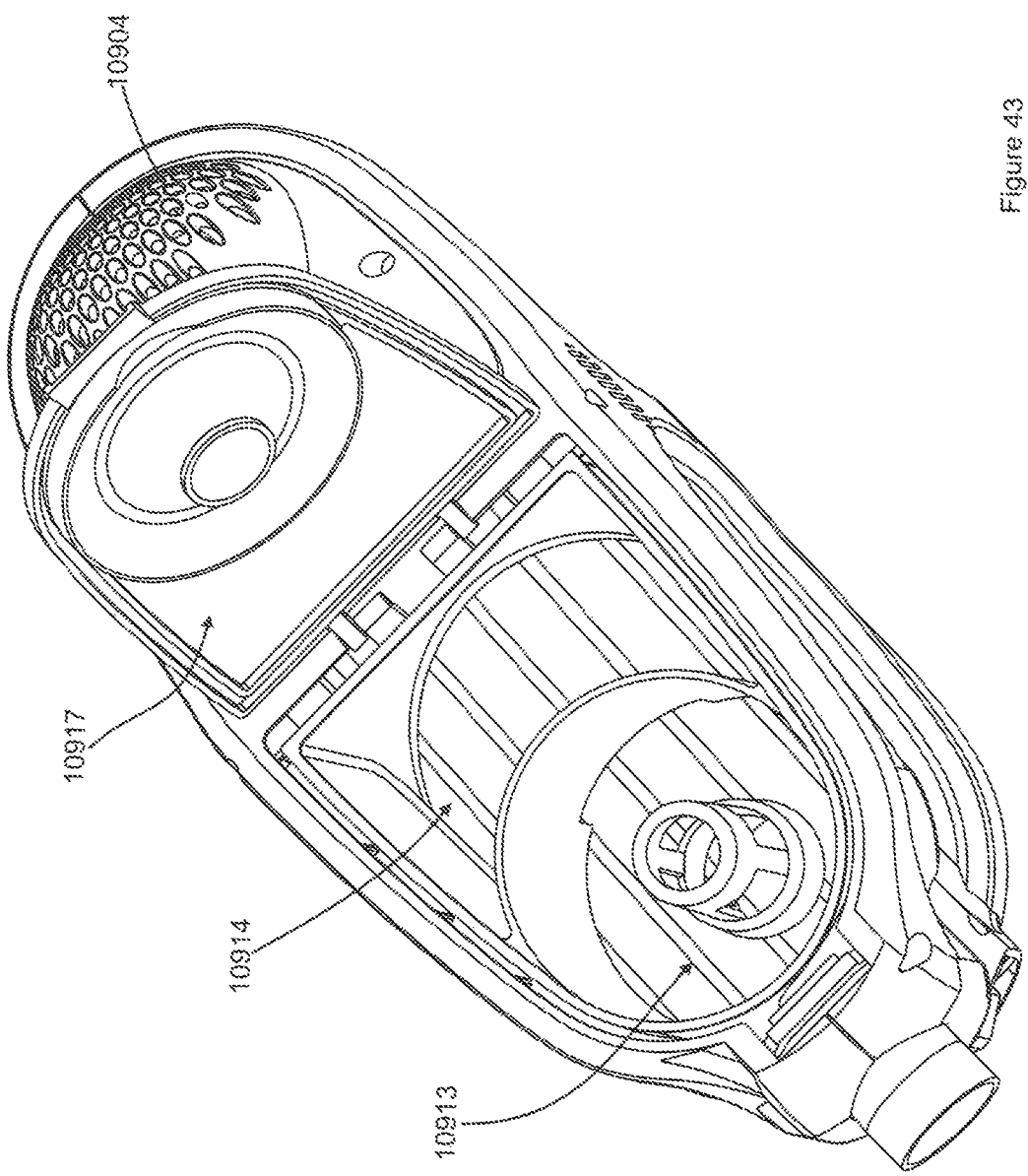
FIG. 43 is a bottom perspective view of the surface cleaning apparatus of FIG. 37.
Figure 44:
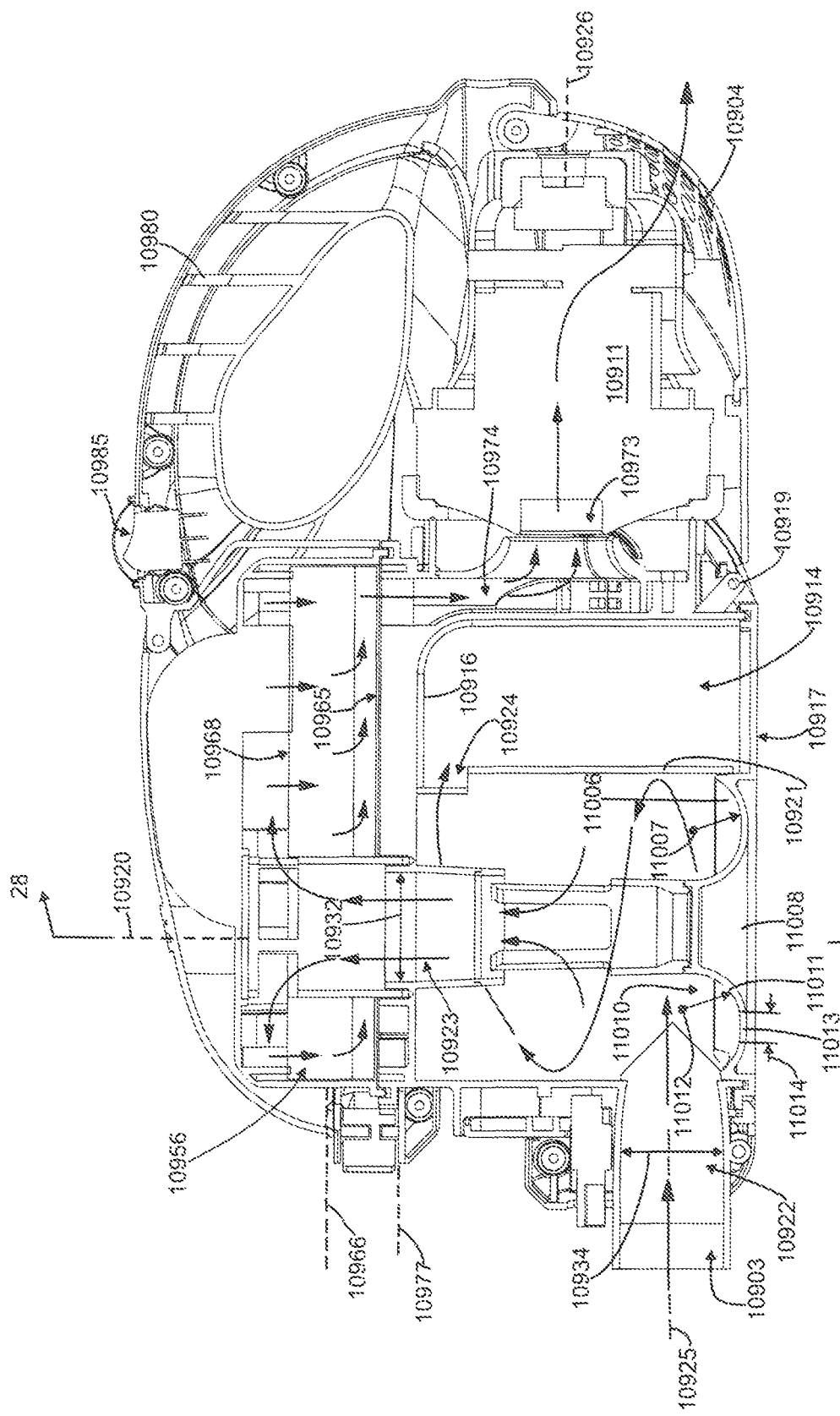
FIG. 44 is a cross sectional view of the surface cleaning apparatus of FIG. 37, taken along line 26-26 in FIG. 37.

Referring to FIGS. 41 and 44, a uniflow cyclone and/or a cyclone with rounded junctures, and/or a cyclone with an insert member any of which may be used by itself or with any other feature disclosed herein is exemplified. In the illustrated embodiment, the cyclone bin assembly 10910 includes a cyclone chamber 10913 and a dirt collection chamber 10914. The dirt collection chamber 10914 comprises a sidewall 10915, a first end wall 10916 and an opposing second end wall 10917. The dirt collection chamber 10914 may be emptyable by any means known in the art and is preferably openable concurrently with the cyclone chamber 10913. Preferably, the second dirt collection chamber end wall 10917 is pivotally connected to the dirt collection chamber sidewall by hinge 10919. The second dirt collection chamber end wall 10917 functions as an openable door to empty the dirt collection chamber 10914 and can be opened (FIGS. 42 and 43) to empty dirt and debris from the interior of the dirt collection chamber 10914. The second dirt collection chamber end wall 10917 can be retained in the closed position by any means known in the art, such as by a releasable latch 10919a. In the illustrated example, the hinge 10919 is provided on a back edge of the end wall 10917 and the latch 10919a is provided at the front of the end wall 10917 so that the door swings backwardly when opened. Alternatively, the hinge 10919 and latch 10919a may be in different positions, and the door 10917 may open in a different direction or manner. Optionally, instead of being openable, the end wall 10917 may be removable.

In the embodiment shown, the cyclone chamber 10913 extends along a cyclone axis 10920 and is bounded by a sidewall 10921. The cyclone chamber 10913 includes an air inlet 10922 and an air outlet 10923 that is in fluid connection downstream from the air inlet 10922 and one dirt outlet 10924 in communication with the dirt collection chamber 10914. In this embodiment, the dirt collection chamber 10914 is positioned adjacent the cyclone chamber 10913 and at least partially surrounds the cyclone chamber 10913 in a side-by-side configuration.

Preferably, the air inlet 10922 is generally tangentially oriented relative to the sidewall 10921, so that air entering the cyclone chamber will tend to swirl and circulate within the cyclone chamber 10913, thereby dis-entraining dirt and debris from the air flow, before leaving the chamber via the air outlet 10923. The air inlet 10922 extends along an inlet axis 10925 that is generally perpendicular to the cyclone axis 10920, and in the illustrated example is generally parallel to and offset above the suction motor axis 10926.

In the illustrated example, the cyclone air outlet 10923 includes a vortex finder 10927. Optionally, a screen 10928 can be positioned over the vortex finder 10927 to help filter lint, fluff and other fine debris. Preferably, the screen 10928 can be removable.

The air inlet 10922 has an inlet diameter 10934, and a related inlet flow cross-sectional area (measure in a plane perpendicular to the inlet axis). Preferably, the air outlet 10923 is sized so that the diameter 10932 of the air outlet 10923, and therefore the corresponding flow area of the air outlet 10923, is the same as the diameter of the air inlet. Alternatively, the air outlet diameter 10932 may be between about 50% and about 150%, and between about 85-115% of the air inlet diameter 10925.

In the example illustrated the cyclone bin assembly 10910, and the cyclone chamber 10913 are arranged in a generally vertical, uniflow cyclone configuration. In a uniflow cyclone, the air inlet is located toward one end of the cyclone chamber and the air outlet is provided toward the other end of the cyclone chamber. In this configuration, air enters one end of the cyclone chamber and generally exits via the other end of the cyclone chamber, as opposed to the cyclone chamber illustrated in the embodiment of FIGS. 1 to 18, in which air enters and exits the cyclone chamber via the same end. In the illustrated example, the air inlet 10922 is provided toward the lower end of the cyclone chamber 10913 and the air outlet 10923 is provided toward the upper end of the cyclone chamber 10913, such that air flows into the bottom of the cyclone chamber 10913 and exits at the top of the cyclone chamber 10913. Alternatively, the locations of the air inlet and outlet can be reversed.

Optionally, instead of a vertical configuration, the cyclone bin assembly 10910 and cyclone chamber 10913 can be provided in another orientation, including, for example, as a horizontal cyclone.

Figure 51:
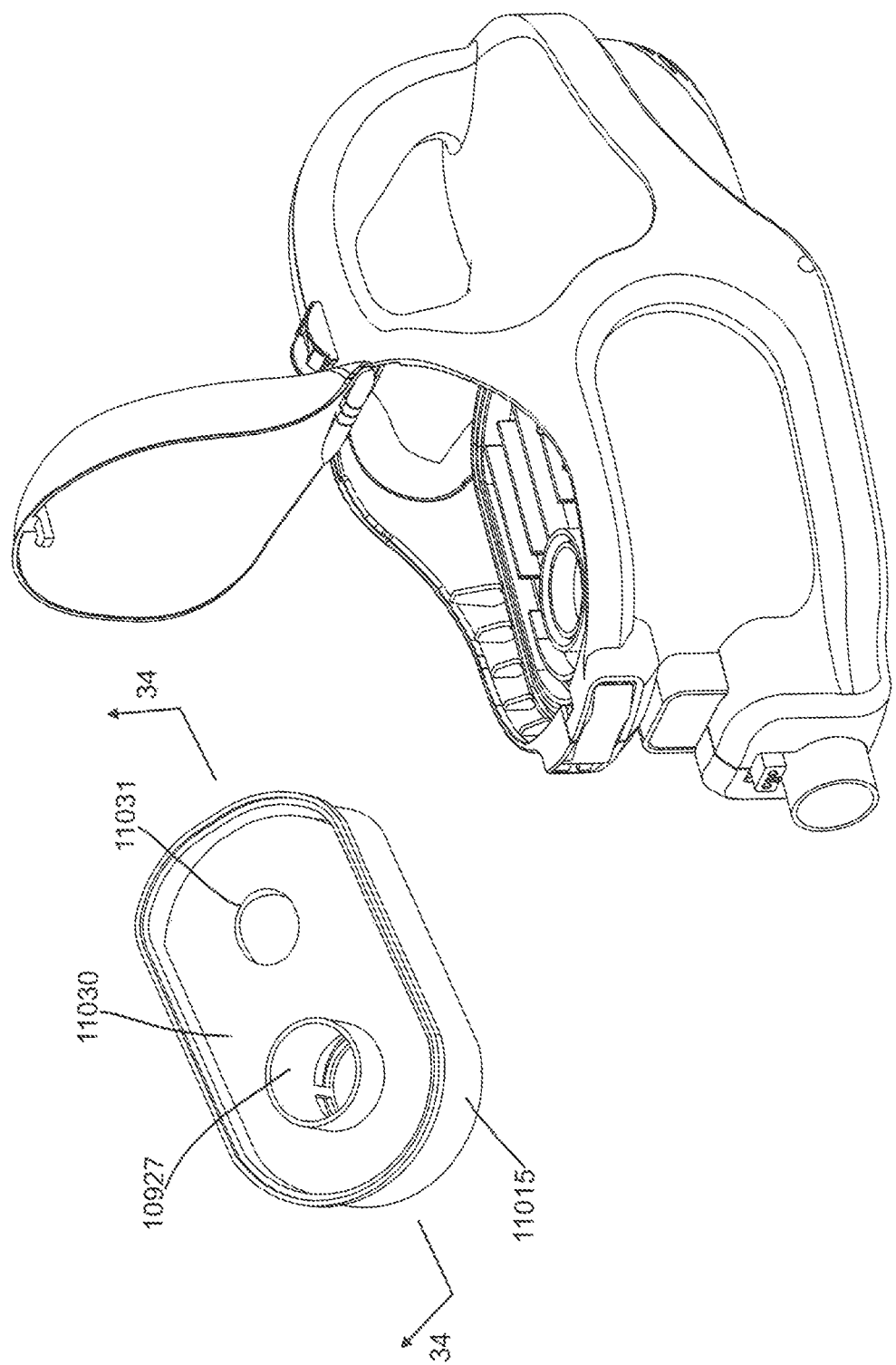
FIG. 51 is the perspective view of FIG. 47 with a different embodiment of a filter cartridge.

Optionally, some or all of the cyclone sidewall 10921 can coincide with portions of the external sidewalls of the cyclone bin assembly 10910 and the dirt collection chamber sidewall 10915. Referring to FIG. 51, in the illustrated embodiment the front portion of the cyclone chamber sidewall 10921 is coincident with the outer sidewall of the cyclone bin assembly 10910, and the rear portion of the cyclone sidewall 10921 helps separate the cyclone chamber 10913 from the dirt collection chamber 10914. This may help reduce the overall size of the cyclone bin assembly 10910. Alternative, the sidewall 10921 may be distinct from the sidewalls 10915. In alternative embodiments, the cyclone chamber 10913 may include only two dirt outlets 10924, or more than two dirt outlets.

In the illustrated embodiment, the cyclone chamber 10913 includes a first or upper end wall 10937 (FIG. 51) and a second or lower end wall 10943. The upper end wall 10937 is connected to the upper end of the sidewall 10921. In the illustrated example, a juncture 10938 between the end wall 10937 and the side wall 10921 is a relatively sharp corner that does not include any type of angled or radiused surface. In contrast, the lower end wall 10943 meets the lower end of the cyclone sidewall 10921 at a juncture 11005 that includes a curved juncture surface 11006 (see also FIG. 45). The radius 11007 of the curved surface 11006 may be selected based on the radius of the air inlet (e.g. half of the diameter 10934), and optionally may be the selected so that the juncture surface 11006 has the same radius as the air inlet 10922.

The curved juncture surface can be provided as a portion of the sidewall or as a portion of the end wall. In the illustrated embodiment, the curved juncture surface 11006 is provided as part of an insert member 11008 that is provided on the bottom end wall and extends upward into the interior of the cyclone chamber 10913. The insert member also includes an upwardly extending projection member 11009 that extends into the interior of the cyclone chamber and engages the distal end 10930 of the screen (FIG. 51). Together, the vortex finder 10927, screen 10928 and projection member 11009 form a generally continuous internal column member that extends between the first and second end walls 10937 and 10943 of the cyclone chamber 10910. Providing the projection member 11009 may help direct air flow within the cyclone chamber, and may help support and/or stabilize the distal end 10930 of the screen 10928.

Optionally, the juncture 11010 between the end wall 10943 and the projection member 11009 may include a curved surface 11011 (see FIGS. 41 and 44), and preferably is sized so that the surface 11011 has a radius 11012 that is the same as radius 11007. Providing curved surfaces 11006 and 11011 at the junctures between the end wall 10943 and the sidewall 10921, may help reduce backpressure and may help improve cyclone efficiency. Preferably, the two curved juncture surfaces 11006 and 11011 are separated by a generally flat, planar transition surface 11013, having a width 11014. Providing a flat transition surface 11013 may help improve air flow, and/or reduce back pressure to help improve cyclone efficiency.

In the illustrated embodiment, the second end wall 10943 of the cyclone chamber 10913, and the insert member 11008 provided thereon, is integral with the openable bottom door 10917 that provides the bottom wall of the dirt collection chamber 10914. In this configuration, opening the door simultaneously opens the cyclone chamber 10913 and the dirt collection chamber 10914 (see for example FIGS. 42 and 43) for emptying.

In the illustrated embodiment, the dirt outlet 10924 is in the form of a slot having bottom and side edges provided by the cyclone chamber sidewall 10921, and a top edge provided by the upper end wall 10937. Alternatively, all four edges of the slot 10924 may be provided by the cyclone chamber sidewall 10921. The dirt slot 10924 is positioned at the back of the cyclone chamber 10921 and is generally opposite the air inlet 10922. In the illustrated embodiment, the upper wall 10937 of the cyclone chamber is integral with the upper wall 10916 (FIGS. 41 and 44) of the dirt collection chamber 10914.

Optionally, one or more pre-motor filters may be placed in the air flow path between the cyclone bin assembly 10910 and the suction motor 10911. Alternatively, or in addition, one or more post-motor filters may be provided downstream from the suction motor.

Figure 45:
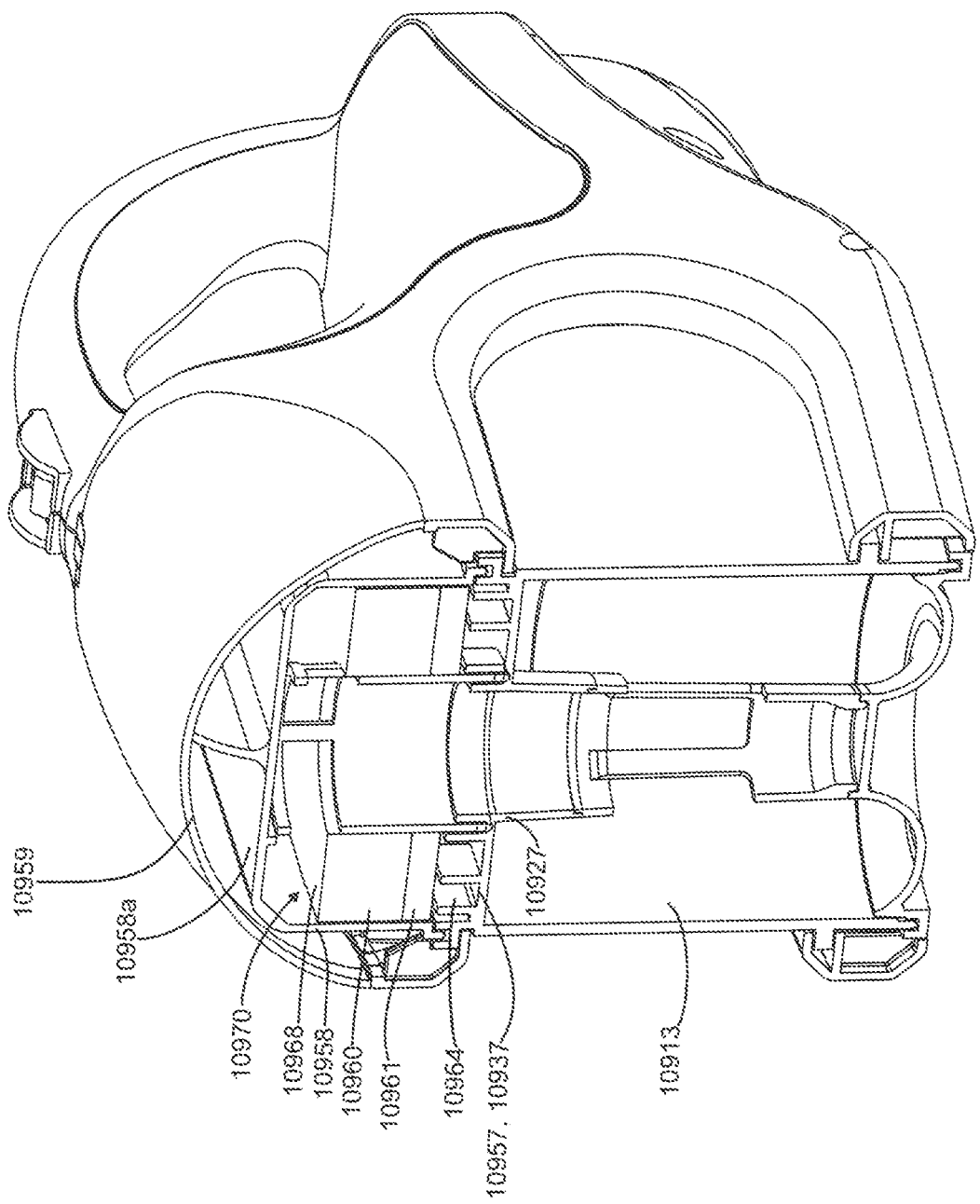
FIG. 45 is a cross sectional view taken along line 27-27 in FIG. 37.
Figure 46:
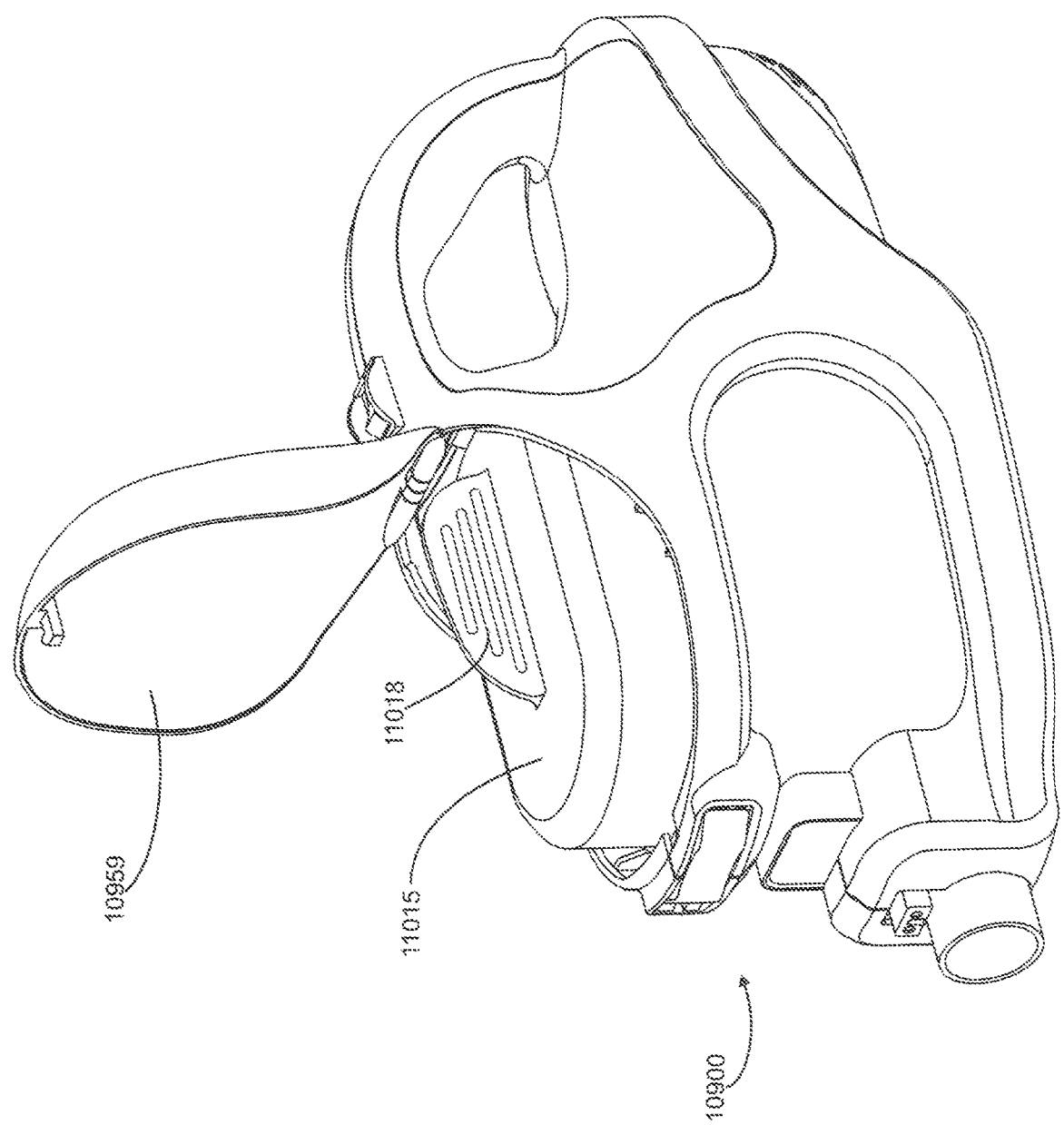
FIG. 46 is a perspective view of the surface cleaning apparatus of FIG. 19 with a cover open.
Figure 47:
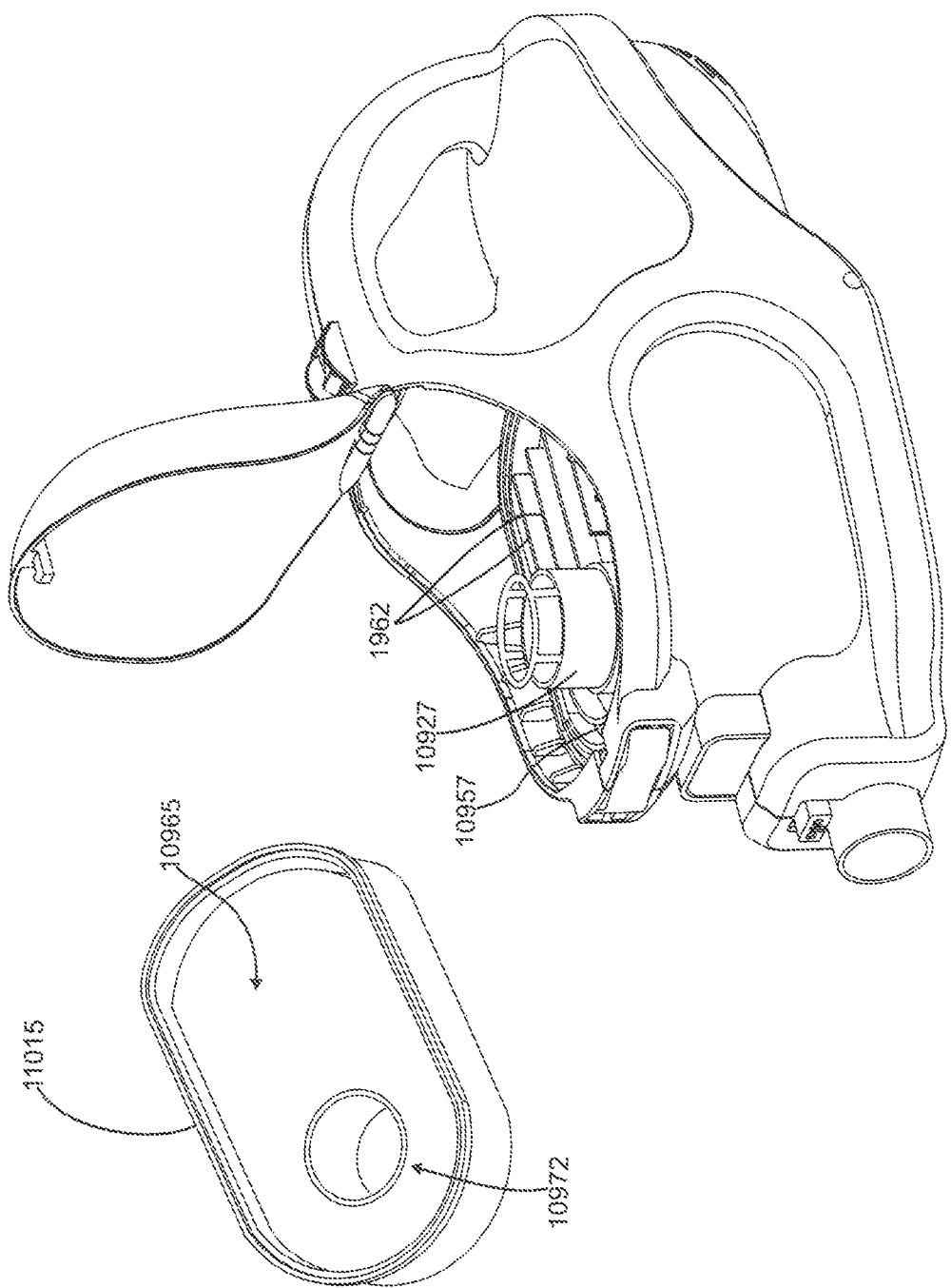
FIG. 47 is the perspective view of FIG. 46 with a filter cartridge removed.
Figure 48:
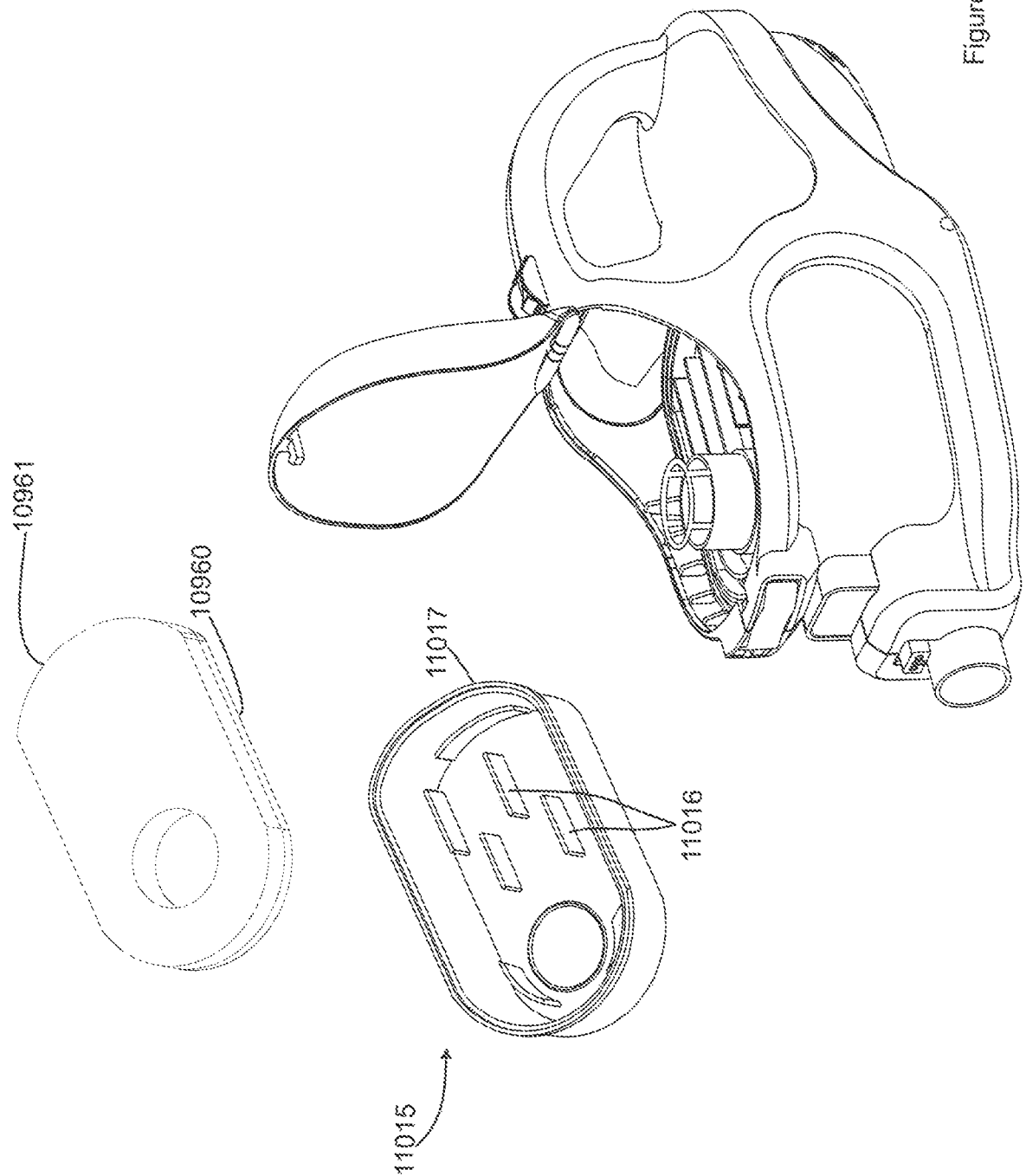
FIG. 48 is the perspective view of FIG. 47 with a filter removed from the filter cartridge.

Referring to FIG. 45, a filter housing construction that may be used by itself or with any other feature disclosed herein is exemplified. In the illustrated embodiment a pre-motor filter chamber or housing 10956 is provided between the upper walls 10937, 10916 of the cyclone 10913 and dirt collection chambers 10914 and the openable cover 10959. In this configuration, the bottom wall 10957 of the pre-motor filter chamber 10956 is integral with the upper walls 10937, 10916 of the cyclone 10913 and dirt collection chambers 10914, and the upper wall 10958a and sidewall 10958 of the pre-motor filter chamber 10956 are provided via a filter cartridge housing 11015 (see also FIG. 46). The filter cartridge housing 11015 is separate from the openable cover 10959. One or more filters may be positioned within the pre-motor filter chamber to filter fine particles from the air stream exiting the air outlet, before it flows into inlet of the suction motor. The filters may be of any suitable configuration and formed from any suitable materials. In the illustrated embodiment, a foam filter 10960 and a felt filter 10961 (FIG. 30) are positioned within the pre-motor filter chamber 10956.

Referring to FIGS. 45-48, the filter cartridge is a generally dome shaped member that includes an upper wall 10958a and a sidewall 10958 extending downwardly from the upper wall to surround the pre-motor filters 10960, 10961. The pre-motor filters 10960, 10961 are shaped to fit within the cartridge member 11015, and when inserted within the cartridge member (FIG. 47) the downstream side 10965 of the felt filter 10961 forms the bottom surface of the filter cartridge 11015. When the filter cartridge 11015 is inserted in its use position (FIG. 46) the downstream side 10965 of the pre-motor filter rests on the support ribs 10962 (see FIG. 47) on the bottom wall 10957, and the downstream headspace 10964 (FIG. 45) is defined between the downstream side 10965 of the filter 10961 and the bottom wall 10957.

In this embodiment, the upstream headspace 10970 (FIG. 35) is provided between the upstream side 10968 of the pre-motor filter 10960 and the upper wall 10958a of the cartridge housing 11015 (instead of being formed by the cover 10959). To provide air into the upstream headspace 1970, the vortex finder 10927 projects upwardly from the bottom wall 10957 and the filters 10960 and 10961 are provided with a corresponding aperture 10972 to receive the vortex finder 10927. Preferably, a plurality of spacing ribs 11016 (FIG. 48) are provided on the inner surface of the upper wall 10958a to keep the upstream surface 10968 of the filter 10960 spaced apart from the inner surface of the upper wall 10958a to maintain the upstream headspace 10970.

The lower rim 11017 of the filter cartridge 11015 housing is configured to seal against the bottom wall 10957 (for example via snap fit or by using any type of suitable gasket or sealing member) to provide a generally air tight pre-motor filter chamber 10956. The sealed chamber 10956 is then covered by openable chamber cover 10959. As the filter cartridge housing 11015 provides a sufficiently air tight connection to the bottom wall, the chamber cover 10959 need not be air tight. Preferably, at least a portion of both the chamber cover 10959 and the filter cartridge 11015 housing is transparent so that a user can inspect the upstream side 10968 of the pre-motor filter 10960 without having to remove it from the chamber 10956. Optionally, both the chamber cover 10959 and filter cartridge housing 11015 may be formed from transparent plastic.

When a user wishes to remove, clean, change or otherwise access the pre-motor filter 10960, 10961 he/she may open the chamber cover 10959 (FIG. 48) to expose the filter cartridge housing 11015. The user may then detach the filter cartridge housing 11015 and separate it from the bottom wall 10957. Preferably, the pre-motor filters 10960, 10961 are snugly received within the filter cartridge housing 11015 (or otherwise retained therein) so that the filters 10960, 10961 are removed with the filter cartridge housing 11015 and remain inside the filter cartridge housing 11015 until removed by a user. In this embodiment, the dirty, upstream side 10968 of the filter 10960 remains enclosed by the filter cartridge housing 11015 when separated from the core cleaning unit 11000, and only the relatively clearer downstream side 10965 of the filter 10961 is exposed. This may help prevent dirt on the upstream side 10968 of the filter 10960 from spilling or from otherwise contacting the user. When at a desired location, for example at a trash receptacle or a sink, a user can grasp the clean, downstream side 10965 of the filter and remove it from the filter cartridge housing 11015. The upstream side 10968 of the filter can then be cleaned and inspected as desired.

To assist a user, the upper side 1958a of the filter cartridge housing 11015 may be provided with a grip member, for example the flange 11018 in the illustrated embodiment (FIG. 46), which may allow a user to firmly grasp and manipulate the filter cartridge housing 11015. The grip member 11018 may be of any suitable configuration and optionally may be provided on other portions of the filter cartridge housing (for example as a ridge or groove in the sidewall). Alternatively, the filter cartridge housing 11015 need not include a separate grip member.

To help reduce the overall size of the surface cleaning apparatus, in the illustrated embodiment the pre-motor filter chamber 10956, and the filters therein, is positioned above the cyclone chamber 10913 and covers the upper end of the cyclone chamber 10913. In this configuration, a plane 10966 (FIG. 44) containing the foam filter 10960 is generally parallel and spaced above a plane 10977 containing the air outlet 10923 of the cyclone chamber 10913, and both planes 10966, 10967 are generally perpendicular to the cyclone axis 10920. Arranging the filters 10960, 10961 in this configuration results in the upstream side of the pre-motor filter (in this example the upper side 10968 of the foam filter 10960) being spaced further apart from the cyclone chamber 10913 than the downstream side of the pre-motor filter (in this example the lower surface 10965 of the felt filter 10961). Alternatively, in other embodiments, the pre-motor filter chamber 10956 may cover only a portion of the upper end of the cyclone chamber and/or may be laterally spaced apart from the cyclone chamber.

When the surface cleaning apparatus is in use, air exiting the cyclone chamber 10913 can flow into the upstream head space 10970 via the vortex finder 10927. Within the upstream headspace 10970 the air can flow laterally across the upstream surface 10968 of the foam filter 10960, and down through the filters into the downstream head space 10964. From the downstream head space 10964, the air can flow to the inlet 10973 of the suction motor via an internal air conduit 10974 (FIG. 44) formed within the body 10901. In the illustrated embodiment, the internal air conduit 10974 is formed within the main body 10901 and is external the cyclone chamber 10913 and the dirt collection chamber 10914 and is partially bounded by an exterior surface exterior surface of the dirt collection chamber sidewall 10915. The air conduit 10974 extends generally vertically between the pre-motor filter chamber 10956 and the suction motor 10911, and is positioned laterally intermediate the suction motor 10911 and the cyclone chamber 10913. The suction motor 10911 is positioned at an elevation where its air inlet 10973 is vertically between the upper and lower ends of the cyclone chamber 10913, and the motor axis passes 10926 through the cyclone chamber 10913 and the dirt collection chamber 10914.

Figure 52:
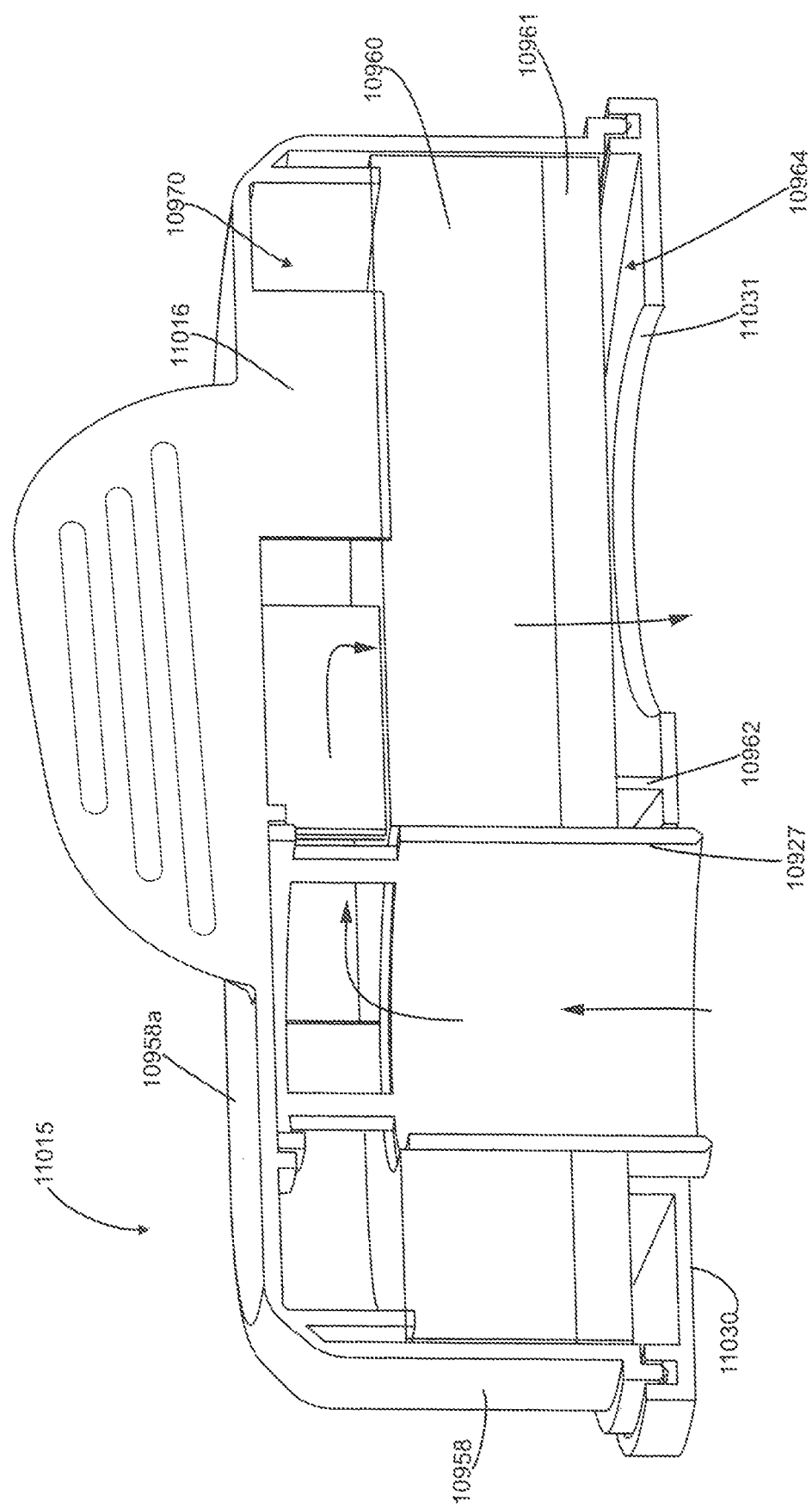
FIG. 52 is a cross sectional view of the filter cartridge taken along line 34-34 in FIG. 51 with the filter cartridge in the surface cleaning apparatus.

Optionally, the cartridge member 11015 can be provided with a bottom cover 11030 to encase the filters 10960 and 10961 and to provide a self-contained pre-motor filter chamber 10956. Referring to FIGS. 51 and 52, in such a configuration, the bottom cover 11030 may provide the bottom wall 10957 of the pre-motor filter chamber 10956, and may be provided with internal ribs 10962 to support the filters 10960, 10961 and to provide the downstream headspace 10964. An outlet port 11031 provided in the bottom cover 11030 allows air to exit the cartridge enclosure 11015 and flow into conduit 10974. Providing a sealed cartridge may help further contain dirt within the cartridge prior to emptying, and may help keep the filters 10960 and 10961 in position.

Referring to FIG. 38, in the illustrated embodiment, handle 10902 has a first or bottom end 10981 that is adjacent the suction motor housing 10912, a second or upper end 10982 that is spaced above from the lower end 1981 and a grip portion 10980 extending therebetween. When grasping the hand grip portion 10980, a user's fingers may pass through an opening 10984.

Figure 49:
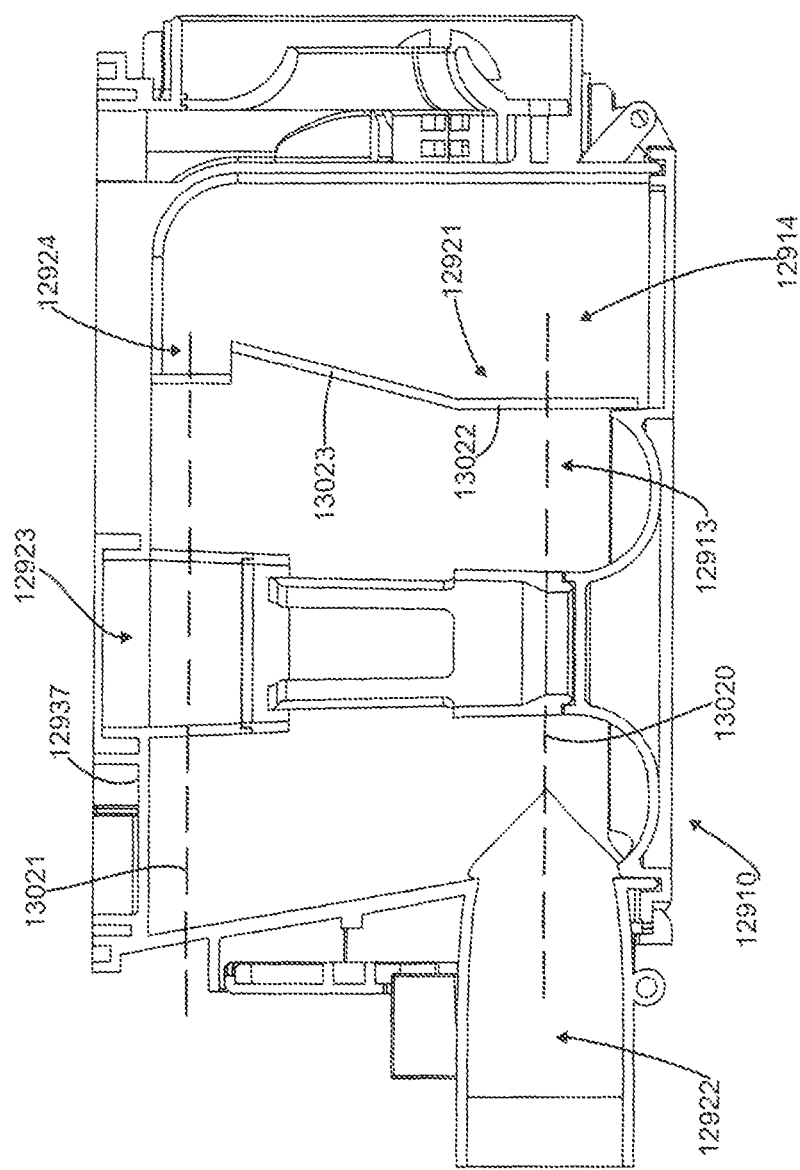
FIG. 49 is a cross sectional view of a portion of another embodiment of a surface cleaning apparatus.

Referring to FIG. 49, a sectional view of an alternate embodiment cyclone bin assembly portion 12910 of a core cleaning unit 13000 that may be used by itself or with any other feature disclosed herein is exemplified. The cyclone bin assembly 12910 is similar to bin assembly 10910, and like features are identified using like reference numerals indexed by 2000. The cyclone bin assembly 12910 is illustrated in isolation with the outer shell, filter cartridge member and the suction motor removed. In this embodiment the cyclone chamber 12913 is flared such that the cross-sectional area taken in a plane 13020 that passes through the air inlet 12922 (toward the bottom of the cyclone chamber 12913) is smaller than the cross-sectional area taken in a plane 13021 that passes through the dirt outlet 12924, and is smaller than the cross-section area of the upper end wall 12937 of the cyclone chamber 12913 (which includes the air outlet 12923). In this configuration, the cyclone chamber sidewall 12921 includes a vertical portion 13022 and a generally frusto-conical portion 13023 positioned above the vertical portion 13022. In this embodiment the volume of the cyclone chamber 12913 increases toward the top to the cyclone chamber, which may help improve cyclone efficiency and/or may help dis-entrained dirt exit via the dirt outlet.

Cyclone Bin Assembly

The following is a description of alternate cyclone bin assemblies, which may be used by itself or in any surface cleaning apparatus or in any combination or sub-combination with any other feature or features disclosed herein.

Figure 50:
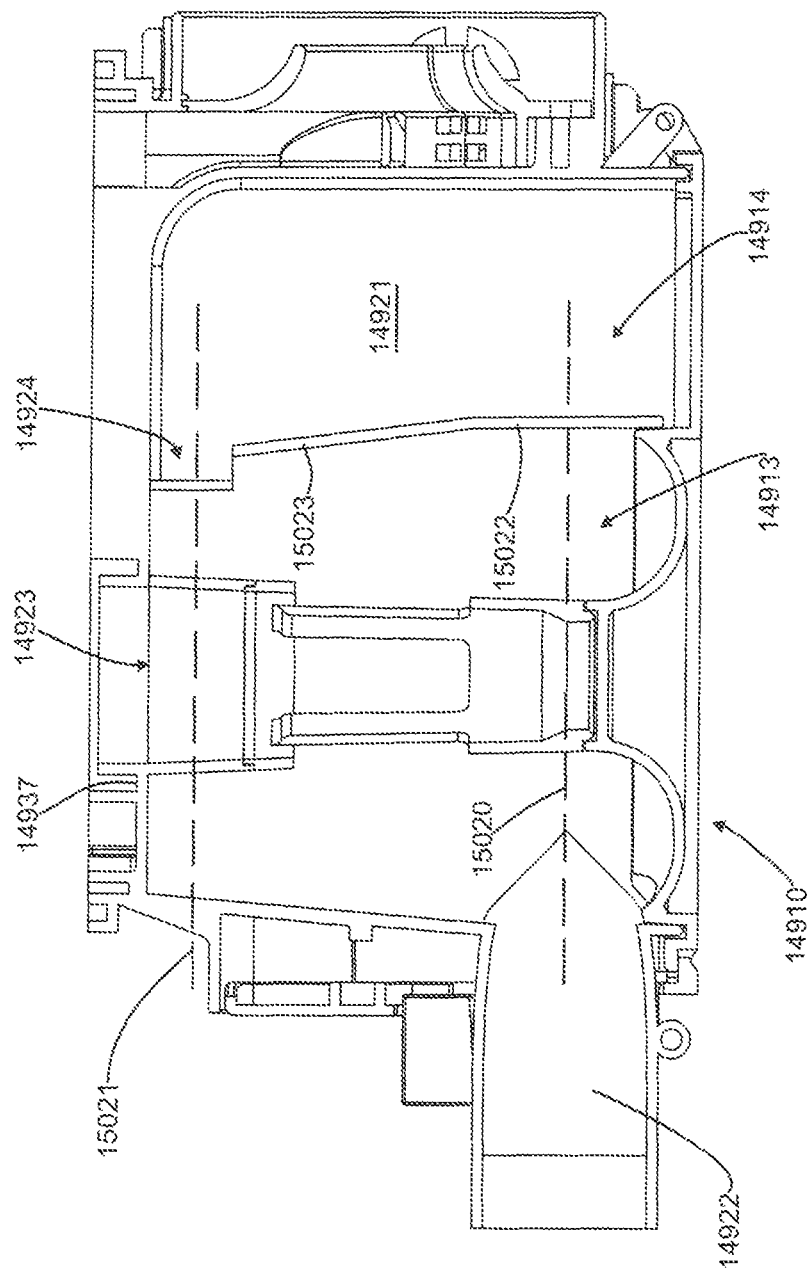
FIG. 50 is a cross sectional view of a portion of another embodiment of a surface cleaning apparatus.

Referring to FIG. 50, a sectional view of an alternate embodiment cyclone bin assembly 14910 portion of the core cleaning unit 15000 that may be used by itself or with any other feature disclosed herein is exemplified. The cyclone bin assembly 14910 is similar to cyclone bin assembly 10910, and like elements are represented using analogous reference numbers indexed by 4000. The cyclone bin assembly 14910 is illustrated in isolation with the outer shell, filter cartridge member and the suction motor removed. In this embodiment the cyclone chamber 14913 is tapered such that the cross-sectional area taken in a plane 15020 that passes through the air inlet 14922 (toward the bottom of the cyclone chamber 14913) is larger than the cross-sectional area taken in a plane 15021 that passes through the dirt outlet 14924, and is larger than the cross-section area of the upper end wall 14937 of the cyclone chamber 14913 (which includes the air outlet 14923). In this configuration, the cyclone chamber sidewall 14921 includes a vertical portion 15022 and a generally inwardly-tapering frusto-conical portion 15023 positioned above the vertical portion. In this embodiment the volume of the cyclone chamber 14913 decreases toward the top to the cyclone chamber, which may help improve cyclone efficiency and/or may help dis-entrained dirt exit via the dirt outlet.

Figure 53:
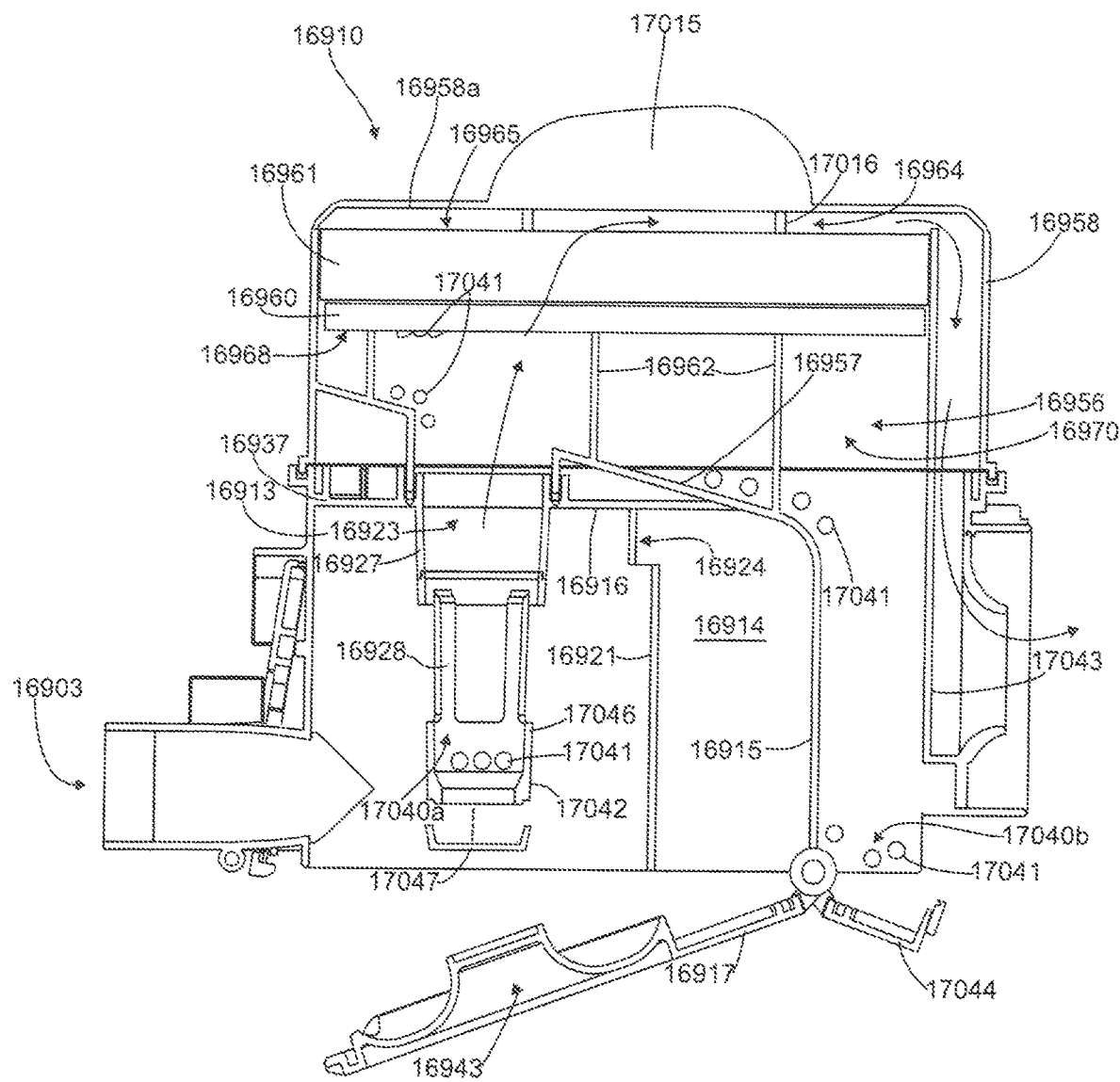
FIG. 53 is a cross sectional view of another embodiment of a portion of a surface cleaning apparatus.

Referring to FIG. 53, a sectional view of an alternate embodiment cyclone bin assembly portion 16910 of a core cleaning unit 17000 that may be used by itself or with any other feature disclosed herein is exemplified. The cyclone bin assembly 16910 is similar to cyclone bin assembly 10910, and like elements are represented using analogous reference numbers indexed by 6000. In this Figure, a pre-motor filter housing construction that may be used by itself or with any other feature disclosed herein is exemplified.

In the illustrated embodiment, a pre-motor filter chamber or housing 16956 is provided between the upper walls 16937, 16916 of the cyclone and dirt collection chambers 16913, 16914 and the openable cover (not shown). In this configuration, the bottom wall 16957 of the pre-motor filter chamber 10956 is integral with the upper walls 10937, 10916 of the cyclone 10913 and dirt collection chambers 10914, and the upper wall 10958a and sidewall 10958 of the pre-motor filter chamber 10956 are provided via a filter cartridge housing 17015. One or more filters may be positioned within the pre-motor filter chamber to filter fine particles from the air stream exiting the air outlet, before it flows into inlet of the suction motor. The filters may be of any suitable configuration and formed from any suitable materials. In the illustrated embodiment, a foam filter 16960 and a felt filter 16961 are positioned within the pre-motor filter chamber 16956.

The pre-motor filters 16960, 16961 are shaped to fit within the cartridge member 17015, and when inserted within the cartridge member the upstream side 16968 of the felt filter 16961 forms the bottom surface of the filter cartridge 11015. When the filter cartridge 17015 is inserted in its use position (as shown) the upstream side 16968 of the pre-motor filter rests on the support ribs 16962 on the bottom wall 16957, and the upstream headspace 16970 is defined between the upstream side 16968 of the filter 16960 and the bottom wall 16957.

In this embodiment, the downstream headspace 16964 is provided between the downstream side 16965 of the pre-motor filter 16961 and the upper wall 10958*a* of the cartridge housing 11015. Optionally, a plurality of spacing ribs 17016 can be provided on the inner surface of the upper wall 16958*a* to keep the downstream surface 16965 of the filter 16961 spaced apart from the inner surface of the upper wall 16958*a* to maintain the downstream headspace 16964.

When the cyclone bin assembly 16910 is in use the upstream side 16968 of the filter 16960 may become soiled and/or partially blocked by dust and other relatively fine debris that is carried out of the cyclone chamber 16913. If the upstream side 16968 becomes sufficiently blocked, airflow through the filter 16960 may be compromised and efficiency of the surface cleaning apparatus may decrease.

One method of cleaning the upstream side 16968 of the filter 16960 is for a user to remove the filter 16960 as described above, clean the surface 16968 and replace the filter 16960 within the pre-motor filter chamber 16956. Alternatively, instead of removing the filter 16960 form the pre-motor filter chamber 16956, the surface cyclone bin assembly 16910 may be configured to allow the filter 16960, particularly the upstream side 16986, to be cleaned in situ, without removing the filter 16960 from the pre-motor filter chamber 16956. Dirt and debris may be extracted from the upstream side 16968 using any suitable mechanism, including, for example, banging to tapping the sides of the pre-motor filter chamber 16956 to dislodge the dirt and using a mechanical and/or electro-mechanical mechanism to help dislodge the debris. Examples of such mechanisms may include, for example, a scraper or other mechanical member that contacts and cleans the surface 16968 and a shaker or beater type of mechanism that can shake the filter 16960 to help dislodge the debris.

Optionally, the pre-motor filter chamber 16956 may be configured to receive fine dirt and debris from the upstream side 16968 and direct the debris into a fine particle collection chamber or pre-motor filter dirt chamber that can collect the dislodged debris. The fine particle collection chamber may be a portion of the primary dirt collection chamber 16914, or may be provided as a separate chamber.

In the illustrated embodiment, the cyclone bin assembly 16910 includes a two pre-motor filter dirt chambers 17040*a* and 17040*b* for receiving debris 17041 that is dislodged from the upstream upside 16968 of filter 16960. In the illustrated embodiment, the first dirt chamber 17040*a* is located within an extension member 17042, which is inside the cyclone chamber 16913. In this configuration, there is no communication between the first dirt chamber 117040*a* and the dirt chamber 16914, nor do they share any walls or components in common.

The second dirt chamber 17040*b* is provided outside and adjacent the dirt chamber. The second dirt chamber 17040*b* is partially bounded by the sidewall 16915 of the primary dirt collection chamber 16914, but is external the chamber 16914 and includes a sidewall 17043. The second dirt collection chamber 17040*b* has a bottom wall 17044 that is pivotally connected to the cyclone bin assembly 16910. The bottom wall 17044 can be opened and closed independently of the bottom walls 16917 and 16943 of the dirt collection chamber 16914 and cyclone chamber 16913 respectively.

In the illustrated example, the bottom wall 16957 of the pre-motor filter chamber 16956 (which is coincident with the upper wall 39 of the cyclone chamber 10 in this example) is inclined from left to right as illustrated. Sloping the wall 16957 in this manner may help guide the debris 17041 that falls from the left side of the filter 16960 (as illustrated) toward the air outlet 16923, and may guide debris that is positioned to the right of the air outlet 16923 (as illustrated) toward to second dirt chamber 17040*b*. When the air flow through the cyclone chamber 16913 is off (i.e. when the cyclone bin assembly 16910 is removed and/or when the surface cleaning apparatus is off), some of the debris 17041 may fall downwardly though the vortex finder 16927, through air outlet 16923, pass through the interior of the screen 16928 and fall into the dirt chamber 17040*a*. Because the dirt chamber 17040*a* is positioned below the air flow openings in the screen 16928 it may be a relatively low air flow region when the surface cleaning apparatus is in use. This may allow debris 17041 that has accumulated dirt chamber 17041 to remain in the dirt chamber 17040*a* if the surface cleaning apparatus is used prior to emptying the dirt chamber 17040*a*, as it is unlikely that the debris 17041 will be re-entrained in the air flowing into the screen 16928 and upwardly though the air outlet 16923.

Similarly, in the absence of strong air flow, some of the debris 17041 may collect at the bottom of dirt chamber 17040*b*. Like chamber 17040*a*, chamber 17040*b* is provided below and generally outside the primary air flow path through the cyclone bin assembly 16910. This may allow debris 17041 to remain contained in dirt chamber 17040*b* if the cyclone bin assembly 16910 is operated before emptying dirt chamber 17040*b*.

The dirt chamber 17040*a* includes a sidewall 17046 and a bottom wall 17047. The top of the chamber 17040*a* is open to receive the debris 17041. In the illustrated embodiment the bottom wall 17047 of the dirt chamber 17040*a* is a cap member that is distinct from the floor 16943 of the cyclone chamber 16913. In this configuration, opening the door 16943 simultaneously opens the cyclone chamber 16913, the dirt chamber 16914 but does not automatically open the pre-motor filter dirt chamber 17040*a*. To empty the dirt chamber 17040*a*, the user can remove the bottom wall 17047. This allows a user to decide when to empty the dirt chamber 17040*a* independently from the cyclone chamber 16913 and the dirt chamber 16914. Alternatively, the dirt chamber 17040*a* need not include a separate bottom wall member 17047, and the bottom of the dirt chamber 17040*a* can be sealed by the bottom wall 16943 of the cyclone chamber 16913. In such a configuration, the dirt chamber 17040*a* would be opened with the cyclone chamber 16913. The bottom wall 17044 is not operatively connected to the bottom walls 16917 and 16943, and therefore chamber 17040*b* is openable independently from dirt chamber 17040*a*, cyclone chamber 16913 and dirt chamber 16914.

Figure 54:
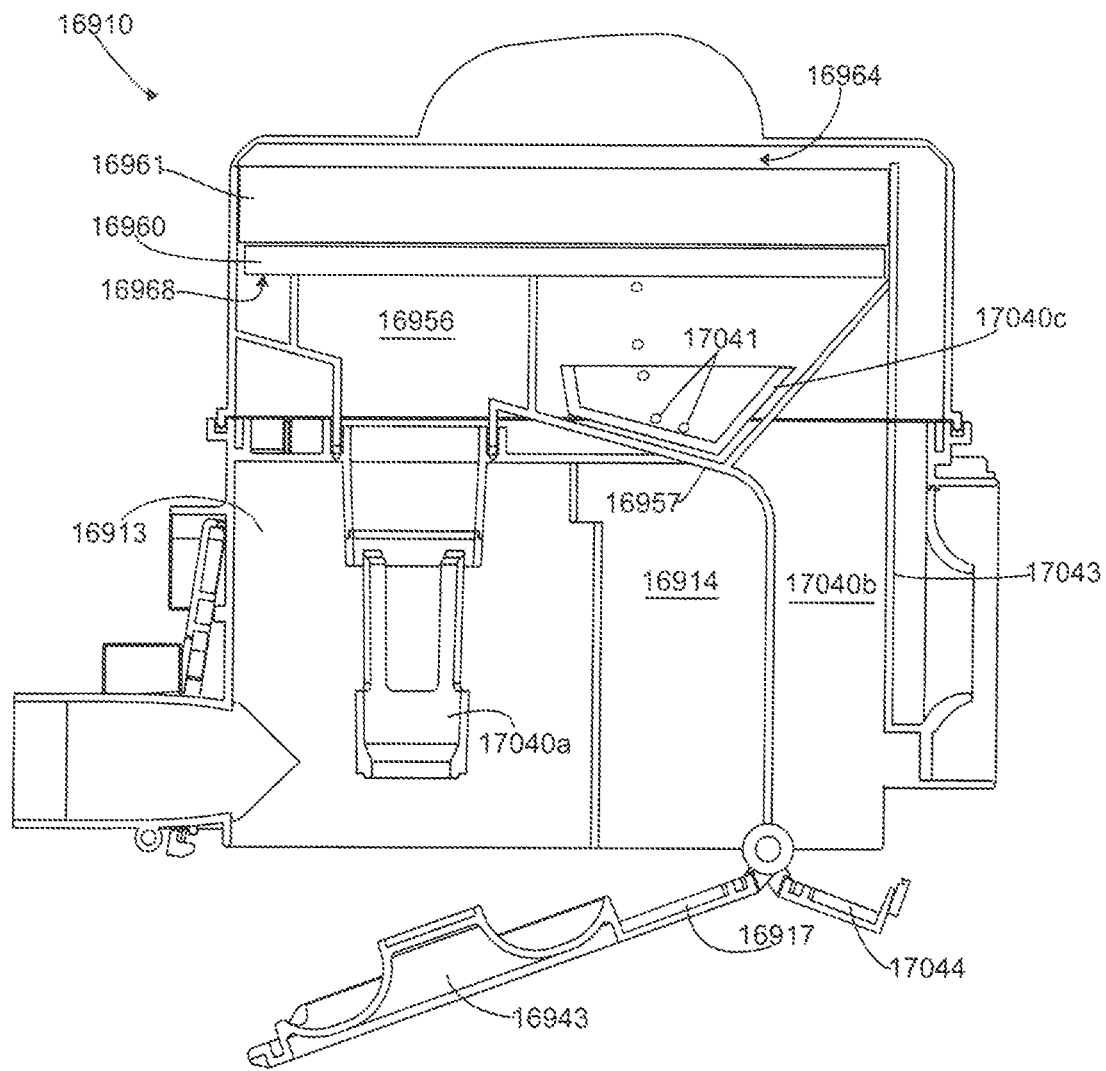
FIG. 54 is a cross sectional view of an alternate configuration of the portion of the surface cleaning apparatus of FIG. 53.

Optionally, the cyclone bin assembly 16910 may include an additional dirt collection chamber that is positioned within the pre-motor filter chamber 16956. Referring to FIG. 54, the cyclone bin assembly 16910 is illustrated containing a removable dirt collection chamber 17040*c* positioned within the pre-motor filter chamber 16956. The dirt collection chamber 17040*c* is a cup-like member that can collect a portion of the debris 17041 that falls from the filter 16960. Providing a third chamber 17040*c* may help reduce the amount of debris that accumulates within chambers 7040a and 17040b. In the illustrated configuration, the dirt chamber 17040c is not emptyable like chambers 17040a and 17040b and does not include any type of openable door. Instead, the dirt chamber 17040c is removably seated within the pre-motor filter chamber 16956 and can be removed for emptying when the filters 16960 and 16961 are removed by the user.

In these examples, debris 17041 may be dislodged from the filter 16960 by shaking or banging the cyclone bin assembly 16910. Alternatively, a filter cleaning mechanism can be included within the pre-motor filter chamber 16956.

Figure 55:
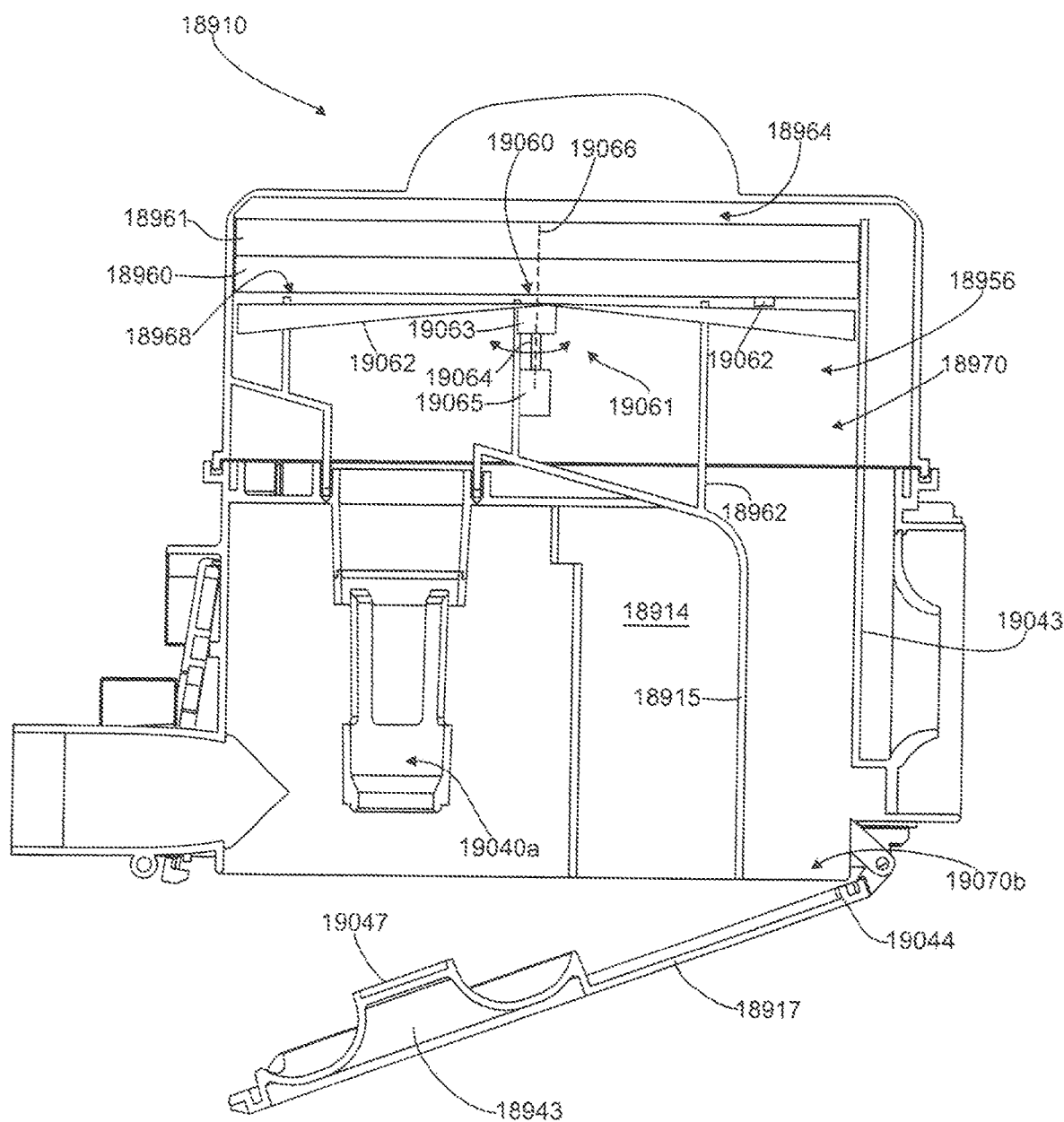
FIG. 55 is a cross sectional view of another embodiment of a portion of a surface cleaning apparatus; and, FIG. 56 is a cross sectional view of an alternate configuration of the portion of the surface cleaning apparatus of FIG. 55.

Referring to FIG. 55, another embodiment of a cyclone bin assembly 18910 is exemplified having an example of a filter cleaning mechanism 19060, which may be used in combination with any other suitable cyclone bin assembly described herein. In the illustrated embodiment, the filter cleaning mechanism 19060 is provided in the form of a rotating sweeper apparatus 19061 that includes a pair of sweeper arms 19062 that can scrape the upstream surface 18968 of the filter 18960. The sweeper arms 19062 may be of any suitable configuration, and may be formed from any suitable material including, for example, plastic and metal.

The sweeper arms 19062 are connected to a central hub 19063 which is mounted to shaft 19064. Shaft 19065 is driven by electric motor 19065 and rotates about axis 19066. The motor 19065 is mounted to one of the support ribs 18962 within the upstream head space 18970. Additional ribs surrounding the filter cleaning mechanism 19060 may include cut-outs to allow the sweeper arms 19062 to pass. Alternatively, instead of completing full revolutions the motor 19065 may be configured to oscillate back and forth.

Providing the filter cleaning mechanism in the upstream headspace 18970 may be advantageous as it allows the sweeper arms 19062 to directly engage the upstream surface 18968.

The motor 19065 may be supplied with power from any suitable source, including the external power source and/or an onboard power storage device, such as batteries. Providing batteries may be advantageous as it may allow the filter cleaning mechanism 19069 to be operated when the surface cleaning apparatus is unplugged.

Alternatively, instead of providing a motor 19065, the shaft 19064 may be rotatably or pivotally supported by bearings or bushings within the pre-motor filter chamber 18956, but need not have a drive mechanism. In such a configuration, the sweeper arms 19062 may be moved across the surface 18968 of the filter 18960 when a user shakes or bangs the outside of the cyclone bin assembly 18910. In this configuration, the filter cleaning mechanism 19060 may amplify the user's input force and use that force to clean the filter 18960. In yet another alternative configuration, an external crank or actuator may be provided to allow a user to manually rotate the shaft 19064 and sweeper arms 19062.

Also of note in this embodiment, the bottom walls 19044 and 19047 of the pre-motor filter dirt chambers 19070b and 19070a are both integral with walls 18917 and 18943. In this configuration, the pre-motor filter chambers 19040a and 19040b, the cyclone chamber 18913 and dirt chamber 18914 are simultaneously openable.

Figure 56:
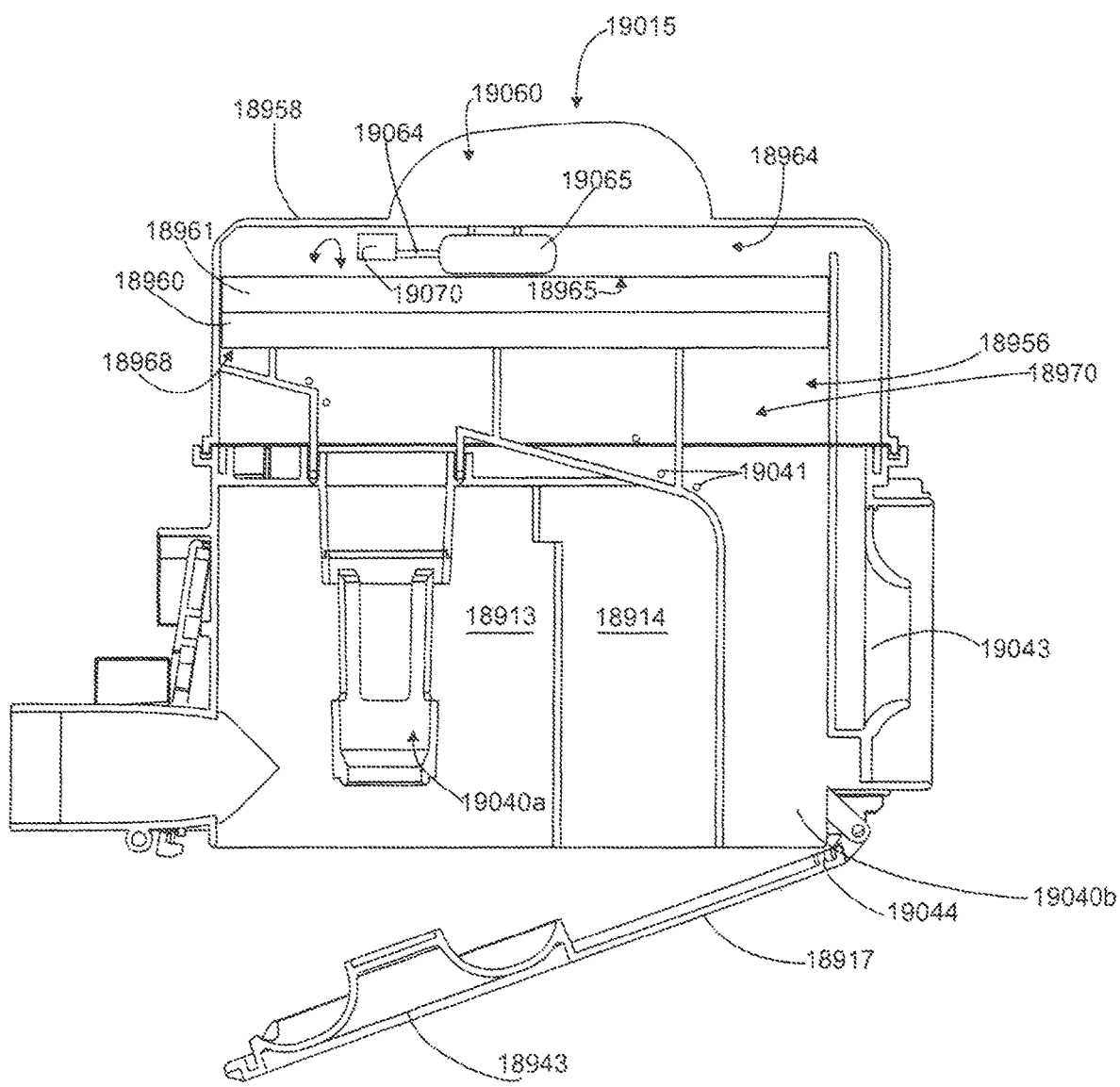

Referring to FIG. 56, the cyclone bin assembly 18910 is illustrated containing another embodiment of a filter cleaning mechanism 19060, which may be used in isolation or in combination with any other features herein. In this embodiment, the filter cleaning mechanism 19060 includes a motor 19065 that is mounted to the upper wall 18958 of the cartridge housing 19015 and is positioned within the downstream headspace 18964. The motor 19065 includes an output shaft 19064 that is coupled to an eccentrically mounted beating member 19070. The beating member 19070 can be formed from any suitable material (e.g. plastic and metal) and can be of any suitable shape.

In the illustrated embodiment the beating member is a generally cylindrical member mounted eccentrically on the shaft 19064. As the shaft rotates the beating member 19070 will periodically impact the downstream side 18965 of filter 18961. The impact on the surface of filter 18961 may produce vibrations in filter 18961, and the vibrations may be transferred to filter 18960. Vibrations in filter 18960 may tend to dislodge debris from the upstream side 18968 of the filter 18960, and into the dirt collection chambers 194040a and 19040b. The motor 19065 may be powered using any suitable source as described herein.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

What is claimed is:

1. A surface cleaning apparatus comprising:
   (a) an air treatment member having a first end, a longitudinally spaced apart second end, a longitudinal axis extending between the first and second opposed ends, an air inlet and an air outlet comprising an outlet conduit;
   (b) an air flow path extending from a dirty air inlet to a clean air outlet and including a suction motor and the air treatment member;
   (c) a pre-motor filter positioned in the air flow path downstream from the air treatment member, the pre-motor filter comprising a filter media having an upstream surface through which air enters the filter media and a downstream surface through which air exits the filter media, the downstream surface is spaced apart from the upstream surface in a flow direction as air passes through the pre-motor filter; and,
   (d) an agitation member positioned downstream of the pre-motor filter and an agitation motor having a drive shaft, the agitation member is eccentrically mounted to the drive shaft whereby the agitation member periodically impacts the pre-motor filter as the drive shaft rotates to impart a force in a direction generally parallel to the flow direction, wherein the agitation member is solely supported by the drive shaft.

2. The surface cleaning apparatus of claim 1 wherein the downstream surface is planar and wherein the drive shaft extends in a direction that is generally parallel to the downstream planar surface.

3. The surface cleaning apparatus of claim 1, wherein the agitation motor is on a downstream side of the pre-motor filter.

4. The surface cleaning apparatus of claim 1 further comprising an agitation motor operatively connected to the agitation member and the agitation member is eccentrically mounted to the agitation motor.

5. The surface cleaning apparatus of claim 1, wherein the air treatment member comprises a cyclone chamber having a cyclone axis of rotation, the pre-motor filter overlies the cyclone chamber whereby the agitation member imparts the force in the longitudinal axial direction.

6. The surface cleaning apparatus of claim 1, wherein the pre-motor filter comprises a foam filter.

7. The surface cleaning apparatus of claim 2, wherein the air treatment member comprises a cyclone chamber having a cyclone axis of rotation, the pre-motor filter overlies the cyclone chamber whereby the agitation member imparts the force in the longitudinal axial direction.

8. The surface cleaning apparatus of claim 7, wherein the pre-motor filter comprises a foam filter.

9. The surface cleaning apparatus of claim 6, wherein the agitation member imparts the force to the downstream surface of the filter media.

10. A surface cleaning apparatus comprising:
(a) an air treatment member having a first end, a longitudinally spaced apart second end, an air inlet and an air outlet comprising an outlet conduit;
(b) an air flow path extending from a dirty air inlet to a clean air outlet and including a suction motor and the air treatment member;
(c) a pre-motor filter positioned in the air flow path downstream from the air treatment member, the pre-motor filter comprising a filter media having an upstream surface through which air enters the filter media and a downstream surface through which air exits the filter media, the downstream surface is generally parallel to the upstream surface and spaced apart from the upstream surface in a spacing direction that is generally perpendicular to each of the upstream and downstream surfaces; and,
(d) an agitation member positioned downstream of the pre-motor filter and an agitation motor having a drive shaft, the agitation member is eccentrically mounted to the drive shaft whereby the agitation member impacts the filter media in an impact direction that is generally parallel to the spacing direction as the agitation member rotates about the axis of the drive shaft of the agitation motor.

11. The surface cleaning apparatus of claim 10, wherein the filter media comprises a foam filter.

12. The surface cleaning apparatus of claim 10, wherein the agitation member impacts the downstream surface of the filter media.

13. The surface cleaning apparatus of claim 10, wherein the drive shaft extends in a direction that is generally perpendicular to the spacing direction.

14. The surface cleaning apparatus of claim 10, wherein the agitation motor is on a downstream side of the pre-motor filter.

15. The surface cleaning apparatus of claim 10, wherein the agitation member is eccentrically mounted to an agitation drive member.

16. The surface cleaning apparatus of claim 10 further comprising an agitation motor operatively connected to the agitation member and the agitation member is eccentrically mounted to the agitation motor.

17. A surface cleaning apparatus comprising:
(a) an air treatment member comprising a cyclone having a first end, an axially spaced apart second end defining an axial direction, an air inlet and an air outlet comprising an outlet conduit;
(b) an air flow path extending from a dirty air inlet to a clean air outlet and including a suction motor and the air treatment member;
(c) a pre-motor filter positioned in the air flow path downstream from the air treatment member, the pre-motor filter comprising a filter media having an upstream surface through which air enters the filter media and a downstream surface through which air exits the filter media, the downstream surface is spaced apart from the upstream surface in the axial direction of the cyclone; and,
(d) an agitation member positioned downstream of the pre-motor filter and an agitation motor having a drive shaft, the agitation member is eccentrically mounted to the drive shaft whereby the agitation member periodically impacts the pre-motor filter as the drive shaft rotates to impart a force to the pre-motor filter generally in the axial direction, wherein the agitation member is solely supported by the drive shaft.

18. The surface cleaning apparatus of claim 17, wherein the agitation member impacts the downstream surface of the filter media.

19. The surface cleaning apparatus of claim 17, wherein the downstream surface generally defines a plane, wherein the drive shaft extends in a direction that is generally parallel to the plane.

* * * * *